(12) United States Patent
Shimizu et al.

(10) Patent No.: US 12,010,465 B2
(45) Date of Patent: Jun. 11, 2024

(54) PROJECTION VIDEO DISPLAY APPARATUS WITH VARIABLE LIGHT ADJUSTMENT FOR MULTISCREEN PROJECTION MODE

(71) Applicant: MAXELL, LTD., Kyoto (JP)

(72) Inventors: Takuya Shimizu, Osaka (JP); Shinji Onodera, Osaka (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/394,336

(22) Filed: Dec. 22, 2023

(65) Prior Publication Data

US 2024/0129441 A1    Apr. 18, 2024

Related U.S. Application Data

(63) Continuation of application No. 17/967,088, filed on Oct. 17, 2022, now Pat. No. 11,895,445, which is a
(Continued)

(51) Int. Cl.
*H04N 9/31* (2006.01)
*G03B 21/20* (2006.01)
*G06F 3/0482* (2013.01)

(52) U.S. Cl.
CPC ....... *H04N 9/3147* (2013.01); *G03B 21/2006* (2013.01); *G03B 21/206* (2013.01);
(Continued)

(58) Field of Classification Search
CPC .. H04N 9/3147; H04N 9/3182; H04N 9/3155; G03B 21/206; G03B 21/2006
See application file for complete search history.

(56) References Cited

U.S. PATENT DOCUMENTS 6,017,123 A * 1/2000 Bleha ............... H04N 9/3147
                                                        353/30
6,456,339 B1   9/2002 Surati et al.
(Continued)

FOREIGN PATENT DOCUMENTS

CN        101379545 A       3/2009
JP         05-19346 A       1/1993
(Continued)

OTHER PUBLICATIONS

Written Opinion and Search Report issued in corresponding International Patent Application No. PCT/JP2016/059809, dated Jun. 21, 2016.
(Continued)

*Primary Examiner* — Bao-Luan Q Le
(74) *Attorney, Agent, or Firm* — Mattingly & Malur, PC

(57) ABSTRACT

A projection video display apparatus includes a video input unit, a light source, a display element, a projection optical system, and a variable light adjusting function which changes the amount of light incident on the display element. Display modes using the variable light adjusting function are prepared, and one display mode of the display modes can be selected from a menu screen. Further, the display modes of the display video using the variable light adjusting function includes: a first display mode where the input video is displayed while changing a light adjusting amount in accordance with light adjusting control information, which is input from external equipment and is capable of controlling the variable light adjusting function in unit of frame of a projected video; and a second display mode where the input video is displayed while changing a light adjusting amount in accordance with the input video.

12 Claims, 35 Drawing Sheets

Related U.S. Application Data continuation of application No. 17/346,677, filed on Jun. 14, 2021, now Pat. No. 11,509,872, which is a continuation of application No. 16/850,326, filed on Apr. 16, 2020, now Pat. No. 11,064,169, which is a continuation of application No. 16/215,198, filed on Dec. 10, 2018, now Pat. No. 10,666,915, which is a continuation of application No. 15/510,160, filed as application No. PCT/JP2016/059809 on Mar. 28, 2016, now Pat. No. 10,205,920.

(52) U.S. Cl.
CPC ......... *H04N 9/3155* (2013.01); *H04N 9/3182* (2013.01); *G06F 3/0482* (2013.01)

(56) References Cited

U.S. PATENT DOCUMENTS

| | | | |
|---|---|---|---|
| 6,513,938 | B2 | 2/2003 | Kubota et al. |
| 6,811,264 | B2 | 11/2004 | Raskar et al. |
| 6,814,448 | B2 | 11/2004 | Ioka |
| 7,357,517 | B2 | 4/2008 | Hasegawa |
| 8,251,512 | B2 | 8/2012 | Adkins et al. |
| 8,994,757 | B2 | 3/2015 | Surati et al. |
| 9,039,194 | B2 | 5/2015 | Tannhauser et al. |
| 9,134,594 | B2 | 9/2015 | Kim |
| 9,160,891 | B2 | 10/2015 | Mizushiro |
| 9,261,762 | B2 | 2/2016 | Kim |
| 9,354,496 | B2 | 5/2016 | Sugiyama |
| 9,442,361 | B2 | 9/2016 | Kim |
| 9,560,327 | B2 | 1/2017 | Ehara |
| 9,602,788 | B2 | 3/2017 | Kim |
| 9,645,783 | B2 | 5/2017 | Ito |
| 9,906,761 | B2 | 2/2018 | Mori |
| 2001/0022651 | A1* | 9/2001 | Kubota ................. G03B 21/10 353/122 |
| 2002/0041364 | A1* | 4/2002 | Ioka ..................... G03B 21/005 353/69 |
| 2003/0227577 | A1 | 12/2003 | Allen et al. |
| 2004/0184010 | A1 | 9/2004 | Raskar et al. |
| 2005/0270268 | A1 | 12/2005 | Iisaka et al. |
| 2006/0181685 | A1 | 8/2006 | Hasegawa |
| 2007/0035702 | A1 | 2/2007 | Shimizu et al. |
| 2008/0246781 | A1 | 10/2008 | Surati et al. |
| 2009/0009464 | A1 | 1/2009 | Kohashikawa et al. |
| 2009/0147153 | A1 | 6/2009 | Hasegawa et al. |
| 2009/0168041 | A1 | 7/2009 | Sawai |
| 2011/0019108 | A1 | 1/2011 | Nelson et al. |
| 2011/0292080 | A1 | 12/2011 | Oka |
| 2011/0310354 | A1 | 12/2011 | Fujimori et al. |
| 2011/0320948 | A1 | 12/2011 | Choi |
| 2013/0016118 | A1 | 1/2013 | Mizushiro |
| 2013/0169888 | A1 | 7/2013 | Tannhauser et al. |
| 2013/0215138 | A1 | 8/2013 | Suzuki |
| 2013/0222386 | A1* | 8/2013 | Tannhauser .......... H04N 9/3147 345/428 |
| 2014/0016041 | A1 | 1/2014 | Kim et al. |
| 2014/0016101 | A1 | 1/2014 | Kim |
| 2014/0049698 | A1 | 2/2014 | Hirata |
| 2014/0078160 | A1 | 3/2014 | Yang et al. |
| 2014/0104582 | A1 | 4/2014 | Mori |
| 2014/0192331 | A1 | 7/2014 | Toyooka |
| 2014/0333905 | A1 | 11/2014 | Sugiyama |
| 2014/0340647 | A1 | 11/2014 | Kim |
| 2014/0354954 | A1 | 12/2014 | Kim |
| 2015/0062170 | A1 | 3/2015 | Kim |
| 2015/0097932 | A1 | 4/2015 | Lin |
| 2015/0138222 | A1 | 5/2015 | Imaizumi et al. |
| 2015/0195424 | A1 | 7/2015 | Mizushiro |
| 2015/0237317 | A1 | 8/2015 | Ehara |
| 2015/0281661 | A1 | 10/2015 | Surati et al. |
| 2015/0296191 | A1 | 10/2015 | Kim |
| 2016/0127711 | A1 | 5/2016 | Kim et al. |
| 2016/0139869 | A1 | 5/2016 | Ito |
| 2017/0064273 | A1 | 3/2017 | Nebashi et al. |
| 2017/0127032 | A1 | 5/2017 | Takahashi |
| 2017/0142382 | A1 | 5/2017 | Nishioka |
| 2017/0329208 | A1 | 11/2017 | Takahashi |
| 2017/0339379 | A1 | 11/2017 | Tanaka et al. |
| 2019/0373228 | A1 | 12/2019 | Okada |
| 2020/0272401 | A1 | 8/2020 | Okada |

FOREIGN PATENT DOCUMENTS

| | | |
|---|---|---|
| JP | 06-178336 A | 6/1994 |
| JP | 2003-029203 A | 1/2003 |
| JP | 2004-279989 A | 10/2004 |
| JP | 2005-159812 A | 6/2005 |
| JP | 2006-165949 A | 6/2006 |
| JP | 2007-178772 W | 7/2007 |
| JP | 2008-311898 A | 12/2008 |
| JP | 2009-145365 A | 7/2009 |
| JP | 2011-002666 A | 1/2011 |
| JP | 2011-028240 A | 2/2011 |
| JP | 2014-142467 A | 8/2014 |
| JP | 2015-097350 A | 5/2015 |
| JP | 2015-169940 A | 9/2015 |
| JP | 2017-211627 W | 11/2017 |
| WO | 2003/032080 A1 | 4/2003 |

OTHER PUBLICATIONS

Chinese Office Action issued in corresponding Chinese Patent Application No. 201680002093.9, dated Aug. 10, 2018, with English Translation.

Non-Final Office Action issued in related parent U.S. Appl. No. 15/510,160, dated Feb. 16, 2018.

Notice of Allowance issued in related parent U.S. Appl. No. 15/510,160, dated Oct. 15, 2018.

Written Submission of Certificate of Exception to Loss of Novelty submitted in Japanese Application No. 2016-102155 identifying information of Software published by Panasonic Corporation for a Video Display Apparatus, delivered/sold Feb. 25, 2016.

Written Submission of Certificate of Exception to Loss of Novelty submitted in Japanese Application No. 2016-102155 identifying an Operating Instructions Manual for a Video Display published by Panasonic Corporation, Nov. 24, 2015.

Written Submission of Certificate of Exception to Loss of Novelty submitted in Japanese Application No. 2016-102155 identifying information of sales and delivery by Panasonic Corporation of Projector and Operating Instructions between Nov. 24, 2015 and May 22, 2016.

Panasonic PT-RQ13K Operating Manual, 2015, URL: https://panasonic.biz/cns/projector/download/pdfs/manual/dlp/omrq13kj.pdf, Copyright Panasonic Corporation 2015.

English Translation of Operating Instructions Functional Manual, DLP Projector, Commercial Use, Model No. PT-RQ13K, Url: ftp://ftp.panasonic.com/projector/pt-rq13ku/PT-Q13KU_Operating_Instructions.pdf, Copyright Panasonic Corporation 2015.

* cited by examiner

<<PROJECTION VIDEO DISPLAY APPARATUS OF BASIC EXAMPLE>>

<<MENU SCREEN IN BASIC EXAMPLE>>

FIG. 17

<<MENU SCREEN IN MODIFICATION EXAMPLE 1>>

INPUT-VIDEO-INTERLOCKED VARIABLE LIGHT
ADJUSTING FUNCTION MODE MENU

○ INPUT-VIDEO-INTERLOCKED VARIABLE LIGHT ADJUSTING
FUNCTION OFF

○ SINGLE DISPLAY MODE [SECOND DISPLAY MODE]

○ MULTI-SCREEN PROJECTION MODE [FIRST DISPLAY MODE]

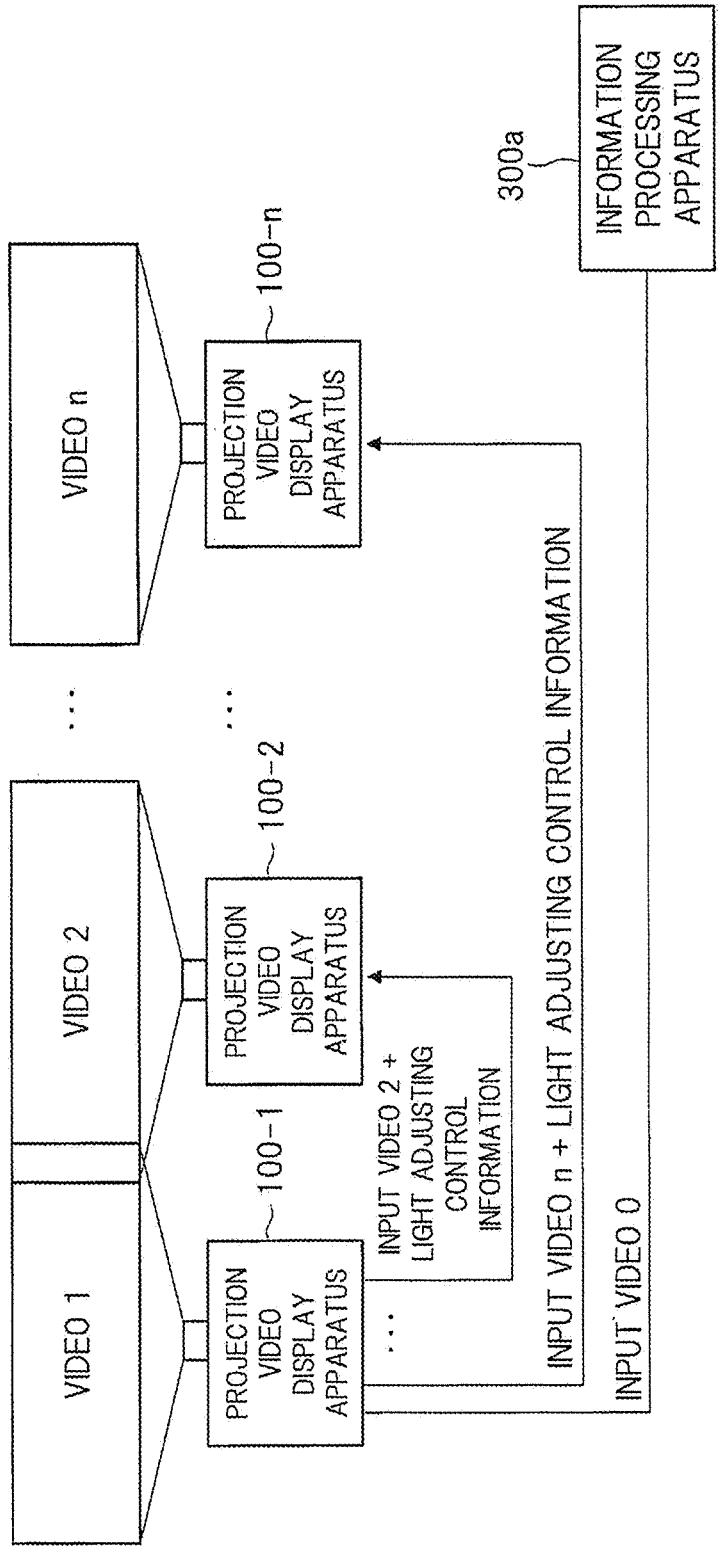

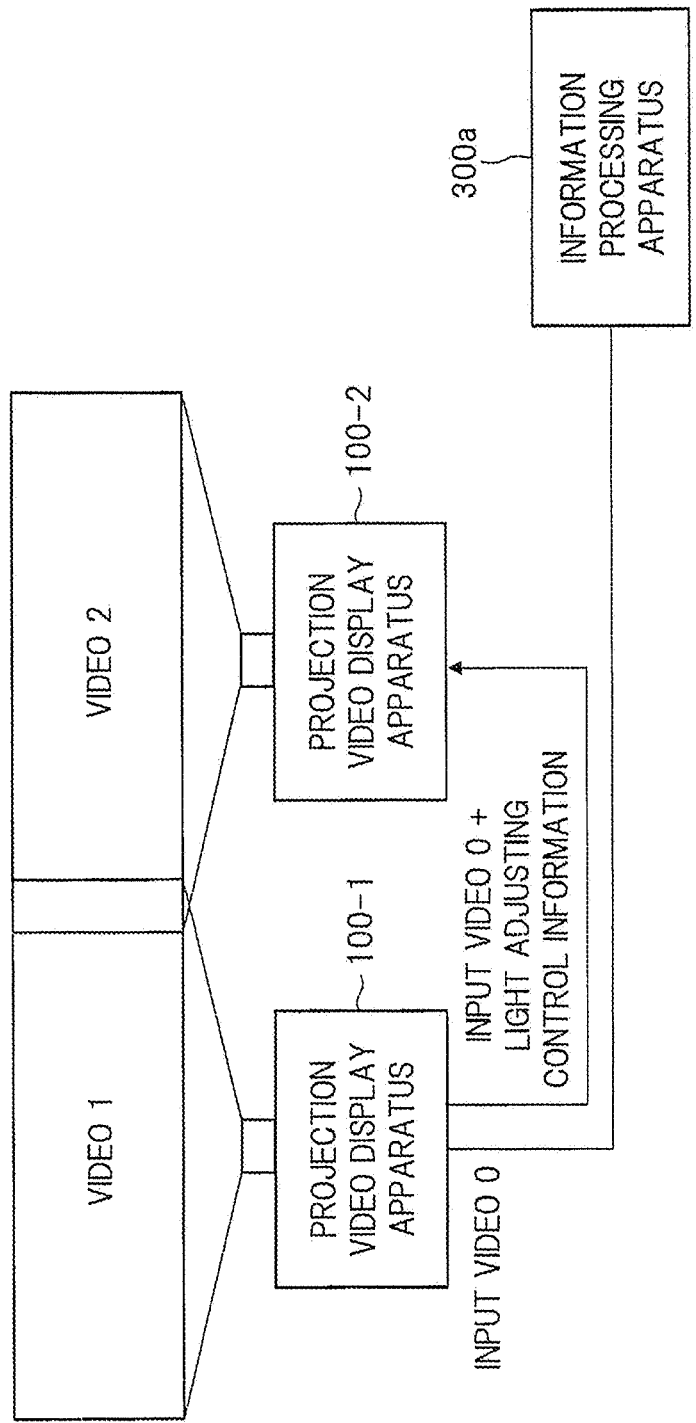

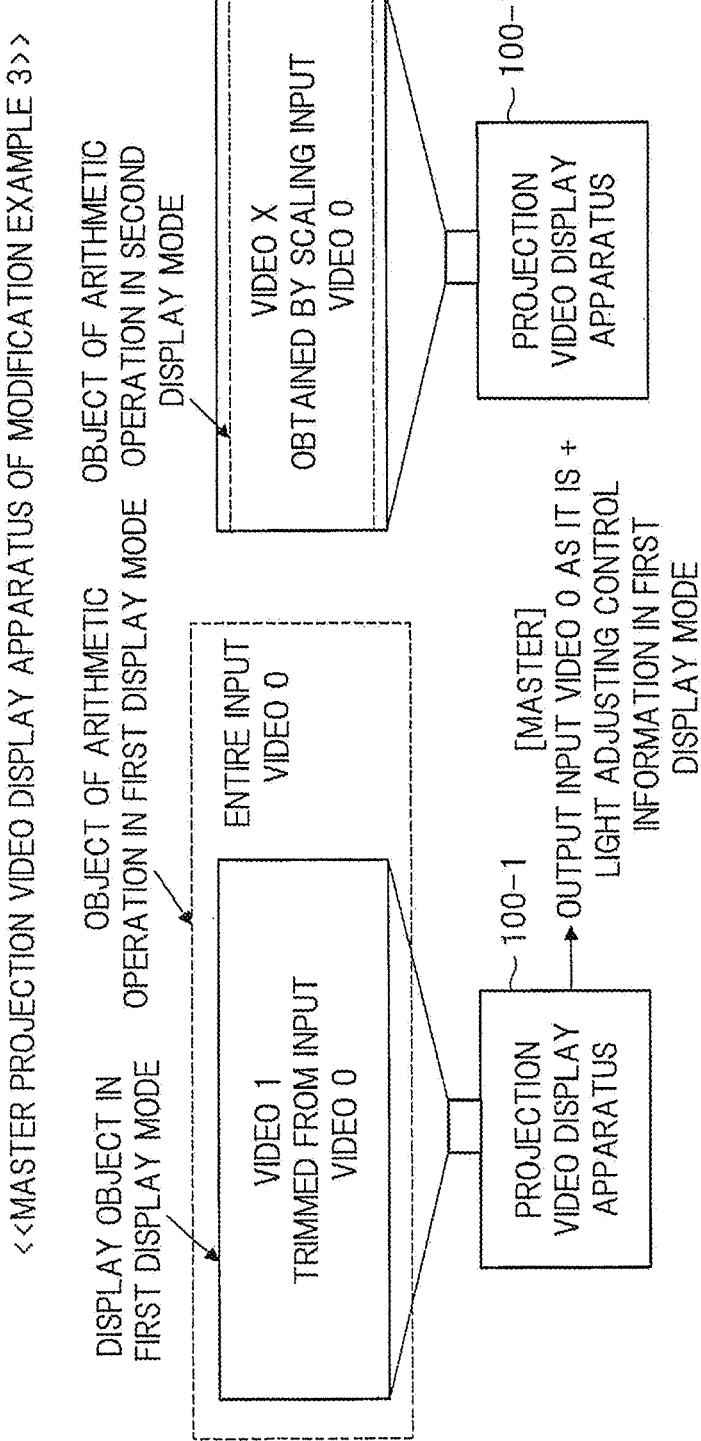

*FIG. 27*

<<SLAVE PROJECTION VIDEO DISPLAY APPARATUS OF MODIFICATION EXAMPLE 3>>

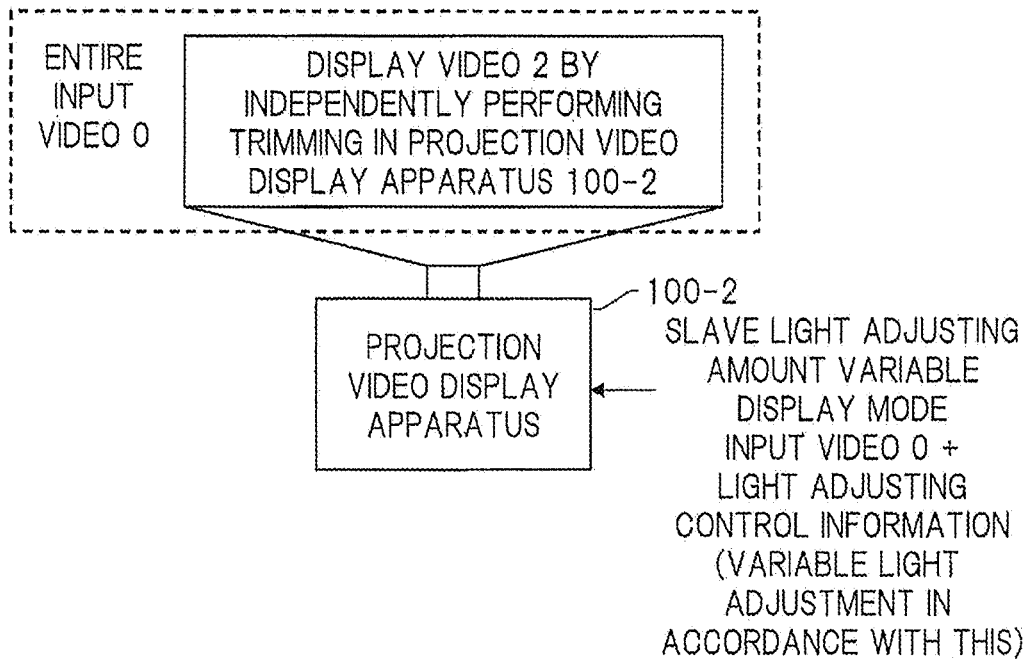

*FIG. 28*

<<MENU SCREEN IN MODIFICATION EXAMPLE 3>>

INPUT-VIDEO-INTERLOCKED VARIABLE LIGHT ADJUSTING FUNCTION MODE MENU

○ INPUT-VIDEO-INTERLOCKED VARIABLE LIGHT ADJUSTING FUNCTION OFF

○ SINGLE DISPLAY MODE [SECOND DISPLAY MODE]

○ MULTI-SCREEN PROJECTION MODE [FIRST DISPLAY MODE (MASTER MODE)]

○ MULTI-SCREEN PROJECTION MODE [THIRD DISPLAY MODE (SLAVE MODE)]

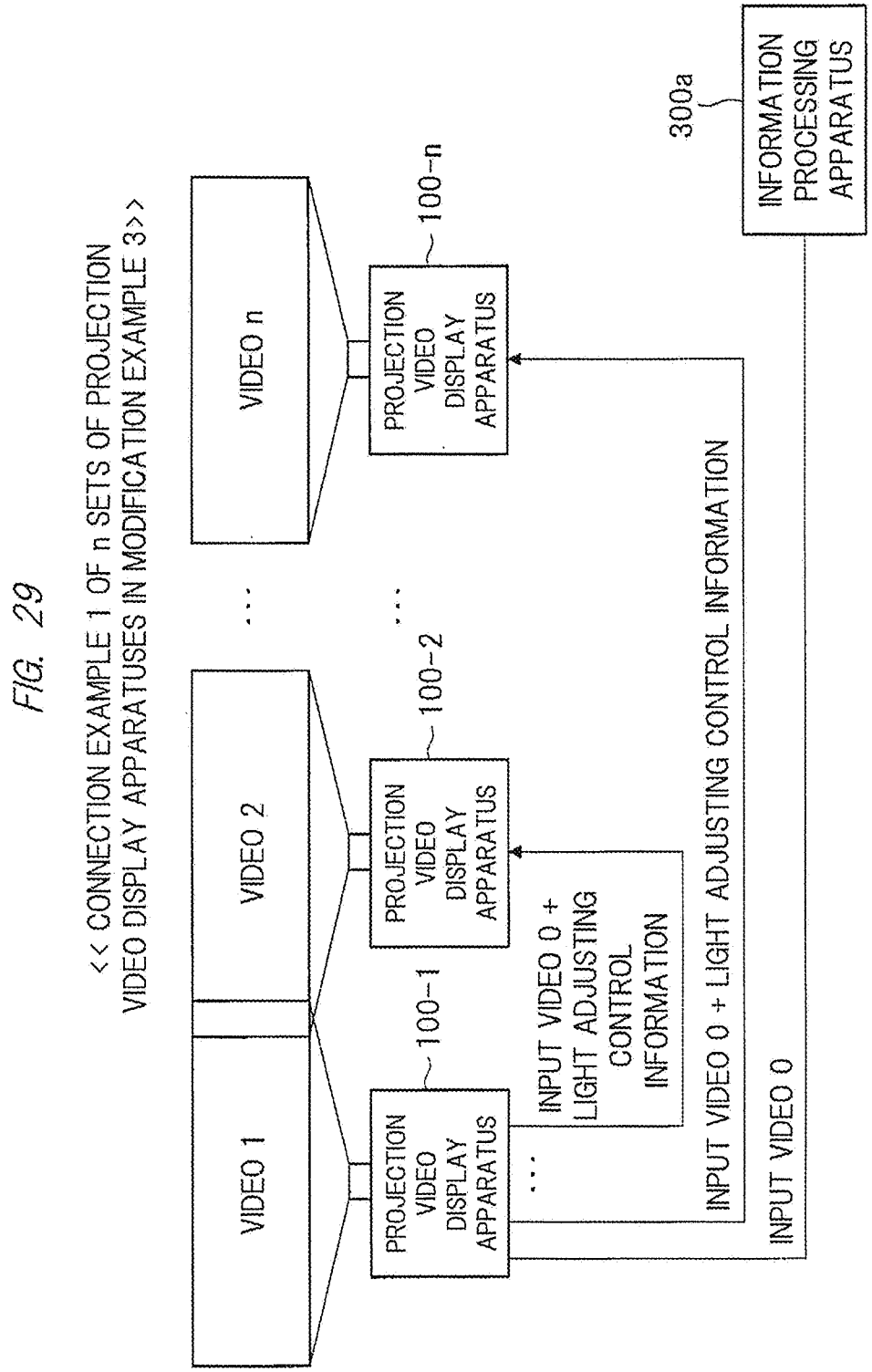

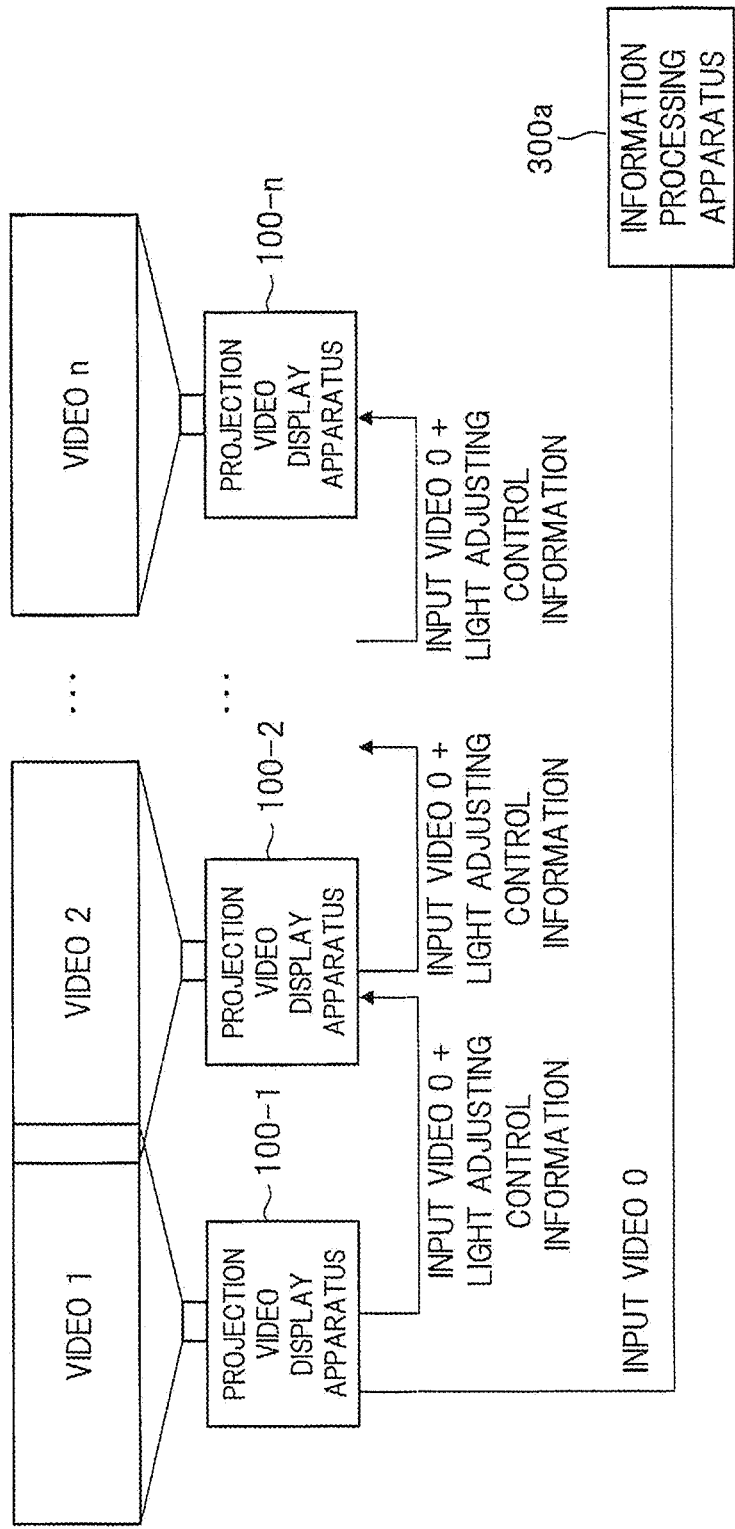

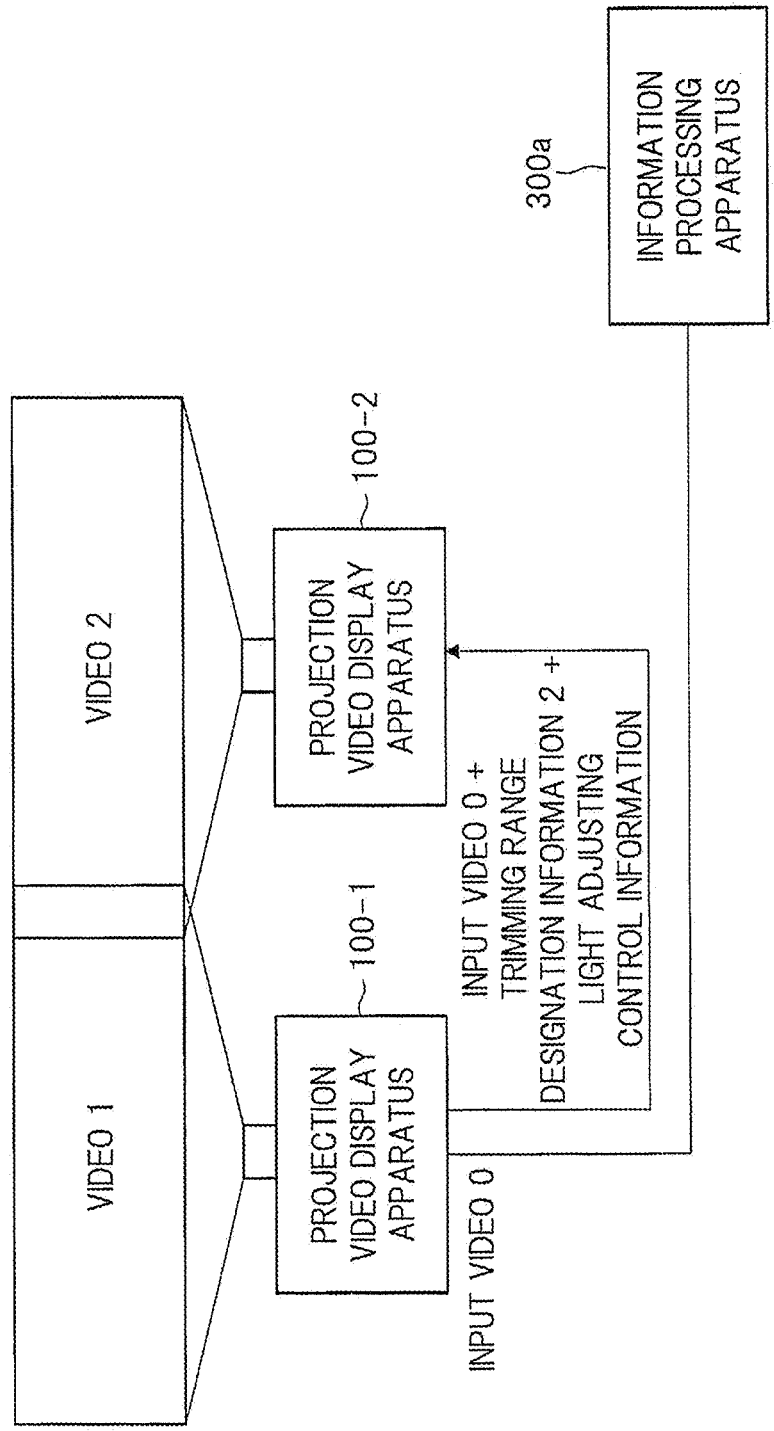

FIG. 32

<<MASTER PROJECTION VIDEO DISPLAY APPARATUS OF MODIFICATION EXAMPLE 4>>

FIG. 39

| | FIRST CONTROL | SECOND CONTROL | MERIT |
|---|---|---|---|
| EXAMPLE 1 | LIGHT SOURCE | IRIS | SMALL IRREGULARITY BETWEEN PROJECTION VIDEO DISPLAY APPARATUSES AT INTERMEDIATE BRIGHTNESS<br>LARGE DISPLAY ELEMENT RANGE |
| EXAMPLE 2 | IRIS | LIGHT SOURCE | SMALL IRREGULARITY BETWEEN PROJECTION VIDEO DISPLAY APPARATUSES AT INTERMEDIATE BRIGHTNESS<br>LARGE DISPLAY ELEMENT RANGE |
| EXAMPLE 3 | DISPLAY ELEMENT (ENTIRE SCREEN) | IRIS | SMALL IRREGULARITY BETWEEN PROJECTION VIDEO DISPLAY APPARATUSES AT INTERMEDIATE BRIGHTNESS<br>LIGHT ADJUSTMENT OF LIGHT SOURCE IS UNNECESSARY |
| EXAMPLE 4 | DISPLAY ELEMENT (ENTIRE SCREEN) | LIGHT SOURCE | SMALL IRREGULARITY BETWEEN PROJECTION VIDEO DISPLAY APPARATUSES AT INTERMEDIATE BRIGHTNESS<br>LIGHT ADJUSTMENT OF VARIABLE IRIS IS UNNECESSARY |
| EXAMPLE 5 | DISPLAY ELEMENT (ENTIRE SCREEN OR OVERLAPPING REGION) LIGHT SOURCE | IRIS | SMALL IRREGULARITY BETWEEN PROJECTION VIDEO DISPLAY APPARATUSES AT INTERMEDIATE BRIGHTNESS |
| EXAMPLE 6 | DISPLAY ELEMENT (ENTIRE SCREEN OR OVERLAPPING REGION) IRIS | LIGHT SOURCE | SMALL IRREGULARITY BETWEEN PROJECTION VIDEO DISPLAY APPARATUSES AT INTERMEDIATE BRIGHTNESS |
| EXAMPLE 7 | DISPLAY ELEMENT (ENTIRE SCREEN or OVERLAPPING REGION) | IRIS LIGHT SOURCE | SECOND CONTROL MAY BE PERFORMED BY BOTH IRIS AND LIGHT SOURCE. HOWEVER, SAME FIRST LIGHT ADJUSTING INFORMATION IS USED IN LIGHT ADJUSTMENT OF VARIABLE IRISES AMONG PLURALITY OF PROJECTION VIDEO DISPLAY APPARATUSES, AND SAME SECOND LIGHT ADJUSTING CONTROL INFORMATION IS USED IN LIGHT ADJUSTMENT OF LIGHT SOURCES AMONG PLURALITY OF PROJECTION VIDEO DISPLAY APPARATUSES |

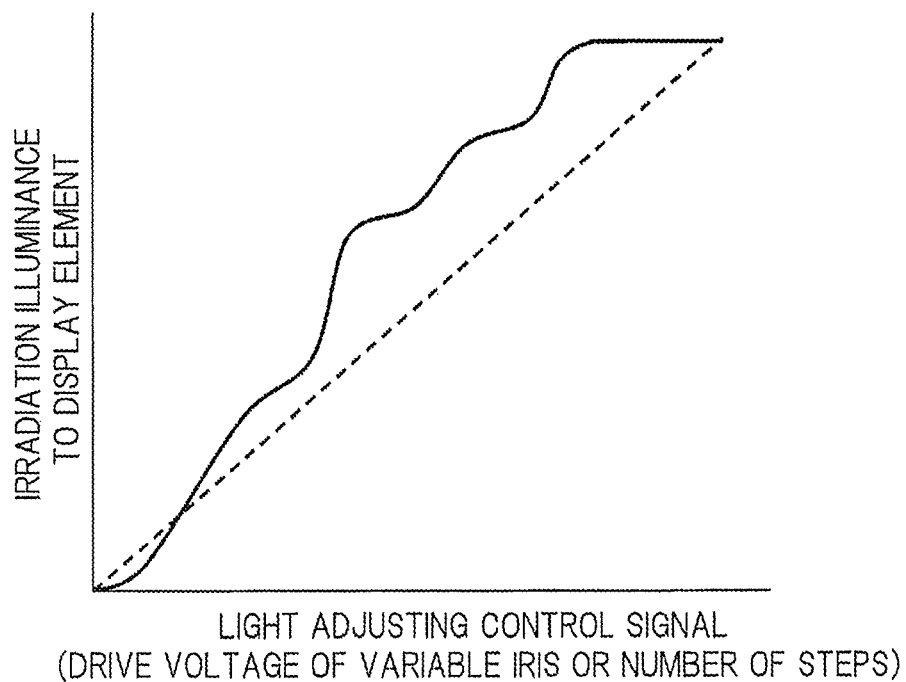

PROJECTION VIDEO DISPLAY APPARATUS WITH VARIABLE LIGHT ADJUSTMENT FOR MULTISCREEN PROJECTION MODE

CROSS REFERENCE TO RELATED APPLICATIONS

This application is a Continuation of U.S. patent application Ser. No. 17/967,088, filed Oct. 17, 2022, which is a Continuation of U.S. patent application Ser. No. 17/346,677, filed Jun. 14, 2021, now U.S. Pat. No. 11,509,872, which is a Continuation of U.S. patent application Ser. No. 16/850, 326, filed Apr. 16, 2020, now U.S. Pat. No. 11,064,169, which is a Continuation of U.S. patent application Ser. No. 16/215,198, filed Dec. 10, 2018, now U.S. Pat. No. 10,666, 915, which is a Continuation of U.S. patent application Ser. No. 15/510,160, filed on Mar. 9, 2017, now U.S. Pat. No. 10,205,920, which is a U.S. National Stage application under 35 U. S. C. § 371 of International Application No. PCT/JP2016/059809, filed on Mar. 28, 2016, the entire contents of which is hereby incorporated by reference.

TECHNICAL FIELD

The present invention relates to a projection video display apparatus.

BACKGROUND ART

As a projection video display apparatus, an apparatus which includes: a light source; a display element on which light emitted from the light source is incident; and a variable light adjusting function which changes the amount of light incident on the display element has been known. For example, Patent Document 1 discloses an illumination apparatus used in a projection display apparatus, and the illumination apparatus includes: a light source; uniform illumination means which makes the illuminance distribution of light incident from the light source uniform; and light adjusting means which adjusts the amount of light emitted from the light source. Further, Patent Document 1 describes that the amount of light emitted from the uniform illumination means can be adjusted by controlling the light adjusting means based on information from the outside.

RELATED ART DOCUMENTS

Patent Documents

Patent Document 1: International Patent Application Publication No. WO03/032080

SUMMARY OF THE INVENTION

Problems to be Solved by the Invention

With respect to the technique for the projection video display apparatus mentioned above, for example, there has been known a usage mode in which a plurality of projection video display apparatuses are prepared and videos are projected onto a display screen by the plurality of projection video display apparatuses, thereby forming one continuous input video as a whole, that is, a usage mode by a so-called multi-screen projection.

In such a usage mode in which the multi-screen projection is performed by a plurality of projection video display apparatuses, input videos of the respective projection video display apparatuses are different, and it is thus necessary to improve quality of a joint of input videos by adjusting illuminances of the videos around the joint to be close to each other in the multi-screen projection.

Note that, in the above-mentioned technique disclosed in Patent Document 1, the amount of light emitted from the uniform illumination means can be adjusted by controlling the light adjusting means, but the control of the light adjusting means in the usage mode for the multi-screen projection is not taken into consideration.

An object of the present invention is to provide a projection video display apparatus which can enhance quality of a joint of projected videos at the time of the multi-screen projection.

The above and other objects and novel characteristics of the present invention will be apparent from the description of the present specification and the accompanying drawings.

Means for Solving the Problems

The following is a brief description of an outline of the typical invention disclosed in the present application.

A projection video display apparatus according to one embodiment includes: a video input unit which inputs an input video; a light source; a display element which allows incidence of light generated by the light source thereon and makes the light pass therethrough or reflect thereon; a projection optical system which projects the light from the display element as a display video; and a variable light adjusting function which changes the amount of light incident on the display element. A plurality of display modes using the variable light adjusting function are prepared and one display mode of the plurality of display modes can be selected from a menu screen. The plurality of display modes of the display video using the variable light adjusting function includes: a first display mode where the input video is displayed while changing a light adjusting amount in accordance with light adjusting control information, which is input from external equipment and is capable of controlling the variable light adjusting function in unit of frame of a projected video; and a second display mode where the input video is displayed while changing a light adjusting amount in accordance with the input video.

Another projection video display apparatus according to one embodiment includes: a video input unit which inputs an input video; a light source; a display element which allows incidence of light generated by the light source thereon and makes the light pass therethrough or reflect thereon; a projection optical system which projects the light from the display element as a display video; and a variable light adjusting function which changes the amount of light incident on the display element. A plurality of display modes using the variable light adjusting function are prepared and one display mode of the plurality of display modes can be selected from a menu screen. Also, the plurality of display modes of the display video using the variable light adjusting function includes: a display mode where a light adjusting amount is changed in accordance with an arithmetic operation applied to a video having a larger range than a second video while displaying the second video which is generated by performing trimming processing to the input video and has a smaller range than the input video.

Effects of the Invention

The effects obtained by typical embodiments of the invention disclosed in the present application will be briefly described below.

According to one embodiment, it is possible to provide a projection video display apparatus which can enhance quality of a joint of projected videos at the time of the multi-screen projection.

BRIEF DESCRIPTIONS OF THE DRAWINGS

FIG. 17 is a view for describing a menu screen in the modification example 1 in one embodiment of the present invention;

FIG. 24 is a view for describing a connection example where n sets of projection video display apparatuses are connected to each other in the modification example 2 in one embodiment of the present invention;

FIG. 25 is a view for describing a configuration of a modification example 3 in one embodiment of the present invention;

FIG. 26 is a view for describing a projection video display apparatus serving as a master in the modification example 3 in one embodiment of the present invention;

FIG. 27 is a view for describing a projection video display apparatus serving as a slave in the modification example 3 in one embodiment of the present invention;

FIG. 28 is a view for describing a menu screen in the modification example 3 in one embodiment of the present invention;

FIG. 29 is a view for describing a connection example 1 where n sets of projection video display apparatuses are connected to each other in the modification example 3 in one embodiment of the present invention;

FIG. 30 is a view for describing a connection example 2 (daisy chain) where n sets of projection video display apparatuses are connected to each other in the modification example 3 in one embodiment of the present invention;

FIG. 31 is a view for describing a configuration of a modification example 4 in one embodiment of the present invention;

FIG. 32 is a view for describing a projection video display apparatus serving as a master in the modification example 4 in one embodiment of the present invention;

FIG. 39 is a view for describing an example of combinations of a first control and a second control in the modification example 7 in one embodiment of the present invention; and FIG. 40 is a view for describing a light adjusting characteristic of a variable iris in the modification example 7 in one embodiment of the present invention.

DETAILED DESCRIPTION OF PREFERRED EMBODIMENTS

Figure 1:
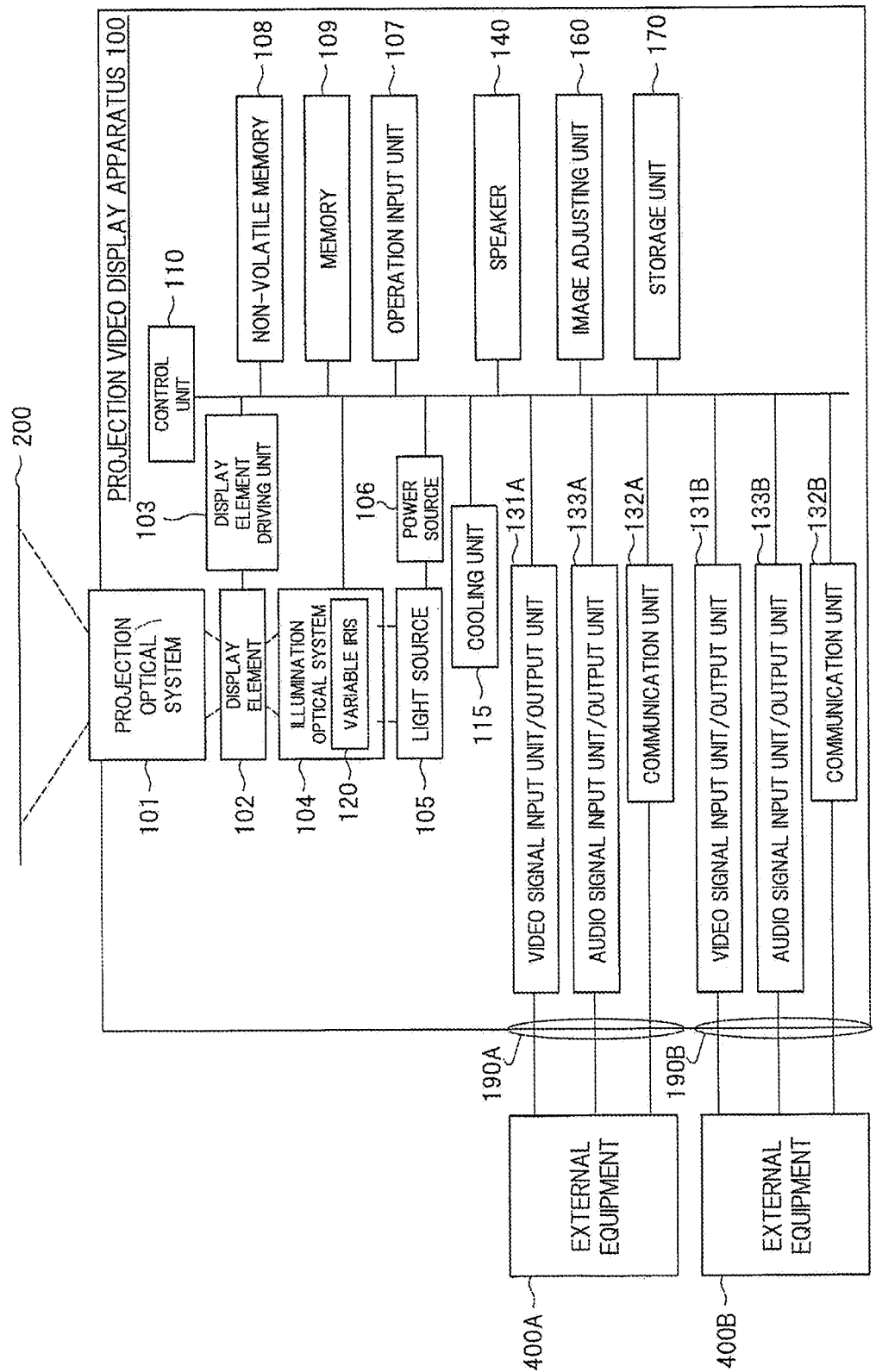
FIG. 1 is a block diagram showing one example of an inner configuration of a projection video display apparatus according to one embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, one embodiment of the present invention will be described in detail with reference to the accompanying drawings. Note that components having the same function are denoted by the same reference characters throughout the drawings for describing the embodiment, and the repetitive description thereof will be omitted.

EMBODIMENT

A projection video display apparatus according to one embodiment will be described with reference to FIG. 1 to FIG. 40.

<Projection Video Display Apparatus>

The projection video display apparatus according to this embodiment will be described with reference to FIG. 1. FIG. 1 is a block diagram showing one example of an inner configuration of a projection video display apparatus 100 according to this embodiment.

The projection video display apparatus 100 according to this embodiment includes: a projection optical system 101; a display element 102; a display element driving unit 103; an illumination optical system 104; a light source 105; a power source 106; an operation input unit 107; a non-volatile memory 108; a memory 109; and a control unit 110. The projection video display apparatus 100 according to this embodiment further includes: a cooling unit 115; a video signal input unit/output unit 131; a communication unit 132; an audio signal input unit/output unit 133; a speaker 140; an image adjusting unit 160; and a storage unit 170. The illumination optical system 104 includes a variable iris 120.

The light source 105 generates light for video projection, and uses a high-pressure mercury-vapor lamp, a xenon lamp, an LED light source, a laser light source or a combination thereof. The power source 106 converts an AC current input from the outside to a DC current to supply power to the light source 105. The power source 106 further supplies a DC current required for respective other units. The illumination optical system 104 condenses and uniformizes the light generated by the light source 105 and emits the uniformized light to the display element 102. The cooling unit 115 cools respective units which become a high-temperature state such as the light source 105, the power source 106, the display element 102 and the like by air cooling or liquid cooling when necessary.

The display element 102 is an element which allows the light from the illumination optical system 104 to pass therethrough or to reflect thereon, and forms a video by modulating the light at the time of such transmission or reflection. For example, a transmissive-type liquid crystal panel, a reflective-type liquid crystal panel, a DMD (Digital Micromirror Device: registered trademark) panel or the like is used as the display element 102. The display element driving unit 103 transmits a drive signal in accordance with a video signal to the display element 102.

The projection optical system 101 is an enlarged projection optical system which projects a video to a display screen 200, and includes lenses and/or mirrors.

In this embodiment, a video signal which the display element driving unit 103 refers to may be an input video signal input from the outside through the video signal input unit/output unit 131, or may be a video signal obtained by applying image adjustment to the input video signal by the image adjusting unit 160. Alternatively, the display element driving unit 103 may refer to a signal which is obtained by overlapping an OSD image signal generated by the control unit 110 by using an image stored in the non-volatile memory 108 or the storage unit 170 to these video signals. In response to a drive signal which the display element driving unit 103 generates by referring to these input video signals, an optical image which is generated by the modulation of the light by the display element 102 is projected onto the display screen 200 as a display video by the projection optical system 101.

The operation input unit 107 is an operation button or a light receiving unit of a remote controller, and inputs an operation signal from a user.

The speaker 140 can perform an audio output based on audio data input to the audio signal input unit/output unit 133. The speaker 140 may output also a built-in operation sound or error alarm sound.

Next, an interface 190 will be described. The interface 190 is an interface which connects the projection video display apparatus 100 with external equipment 400 (for example, video audio outputting/inputting apparatus, information processing apparatus or other projection video display apparatus), and through which various data is transmitted/received therebetween.

FIG. 1 shows the example where the projection video display apparatus 100 has two interfaces including an interface 190A and an interface 190B as the interface 190, and the interface 190A and the interface 190B are connected to external equipment 400A and external equipment 400B, respectively.

The video signal input unit/output unit 131A is a functional unit which forms a part of the interface 190A, and inputs video data to the projection video display apparatus 100 from the external equipment 400A connected by the interface 190A. A function of outputting video data may be provided in the same interface. Namely, the video signal input unit/output unit 131A functions as a video input unit for inputting a video and a video output unit for outputting a video as a separate functional unit or an integrated functional unit.

The audio signal input unit/output unit 133A similarly inputs audio data from the external equipment (for example, an audio outputting/inputting apparatus or an information processing apparatus) 400A connected by the interface 190A. A function of outputting audio data may be provided in the same interface. Namely, the audio signal input unit/output unit 133A functions as an audio input unit for inputting an audio and an audio output unit for outputting an audio as a separate functional unit or an integrated functional unit.

The communication unit 132A similarly inputs/outputs various control signals from/to the external equipment 400A connected by the interface 190A.

In this manner, the video signal input unit/output unit 131A, the audio signal input unit/output unit 133A and the communication unit 132A are formed as the same interface 190A, but may be formed as respectively separated interfaces.

The configurations and processing of the interface 190B which similarly connects the projection video display apparatus 100 and the external equipment 400B, the video signal input unit/output unit 131B, the audio signal input unit/output unit 133B and the communication unit 132B which form parts of the interface 190B are substantially the same as the above-mentioned configurations and processing of the interface 190A, the video signal input unit/output unit 131A, the audio signal input unit/output unit 133A and the communication unit 132A which form parts of the interface 190A, and thus the description of the interface 190B, the video signal input unit/output unit 131B, the audio signal input unit/output unit 133B and the communication unit 132B is omitted. In the drawing, the example where the projection video display apparatus 100 has two interfaces including the interface 190A and the interface 190B as the interface 190 has been shown. However, the interface 190 may be configured to have only one of either the interface 190A or the interface 190B or may be configured to have three or more interfaces having the similar configuration. In this case, in addition to the interface 190A and the interface 190B, an interface 190C, an interface 190D, . . . , and an interface 190N may be added according to necessity in design.

The non-volatile memory 108 stores various data used in a projector function. The memory 109 stores video data to be projected and data for controlling the apparatus. The memory 109 may store image data used in the formation of a GUI image. The control unit 110 controls operations of the respective units to be connected.

The image adjusting unit 160 is provided for applying image processing to video data input by the video signal input unit/output unit 131. Examples of the image processing include scaling processing for performing enlargement, contraction, deformation or the like of an image, brightness adjustment processing for changing brightness, contrast adjustment processing for adjusting a contrast curve of an image, gamma adjustment processing for adjusting a gamma curve indicative of a gradation characteristic of an image, Retinex processing for decomposing an image into the components of light and changing the weighting for respective components of light, and the like.

The storage unit 170 is provided for recording videos, images, audios, various data and the like. For example, the storage unit 170 may record videos, images, audios, various data or the like in advance before shipping a product, or may record videos, images, audios, various data or the like acquired from external equipment, an external server or the like through the communication unit 132. Videos, images, various data or the like recorded in the storage unit 170 may be output as projected videos through the display element 102 and the projection optical system 101. Audios recorded in the storage unit 170 may be output as audios from the speaker 140.

The variable iris 120 is, for example, a mechanism including a movable light shielding plate capable of shielding a part of an optical path of the illumination optical system 104. By being controlled by the control unit 110, the variable iris 120 varies the light shielding amount by changing (moving or rotating) a position or an angle of the light shielding plate in accordance with a light adjusting value (for example, a light shielding ratio or the number of steps of the iris) calculated based on a video input to the video signal input unit/output unit 131 or a light adjusting value (for example, a light shielding ratio or the number of steps of the iris) calculated based on a control signal received from the communication unit 132. The position or the angle of the light shielding plate can be changed by changing an input voltage value applied to a driving unit of the light shielding plate or changing the number of pulses input to the driving unit of the light shielding plate.

As described above, it is possible to impart various functions to the projection video display apparatus 100.

<Input-Video-Interlocked Variable Light Adjusting Function>

Next, an input-video-interlocked variable light adjusting function of the projection video display apparatus 100 shown in FIG. 1 will be described. The projection video display apparatus 100 has, for example, three means for changing brightness of a projected video. The first means is the display element 102. The second means is the variable iris 120, and the variable iris 120 realizes light adjustment by changing the light shielding amount in an optical path of the illumination optical system 104 mentioned above. The third means is the power source 106 for a light source. By being controlled by the control unit 110, the power source 106 realizes the light adjustment by changing brightness of the light source 105 by changing a voltage for a light source in accordance with a light adjusting value (for example, a light shielding ratio or the number of steps of the iris) calculated based on a video input to the video signal input unit/output unit 131 or a light adjusting value (for example, a light shielding ratio or the number of steps of the iris) calculated based on a control signal received from the communication unit 132.

Here, a function of controlling the light adjusting amount in an interlocking manner with an input video, that is, a so-called "input-video-interlocked variable light adjusting function" (simply referred to also as variable light adjusting function) becomes necessary.

Accordingly, the concept of "input-video-interlocked variable light adjusting function" in this embodiment does not include a change in brightness of a projected video itself by the light modulation by the display element 102. Of the light adjusting functions other than light modulation by the display element 102 (for example, light adjustment by light shielding of the variable iris 120 and light adjustment by variable voltage of the power source 106 for a light source), a function of changing the light adjusting amount in an interlocking manner with a calculated value derived from the input video is included in the concept of "input-video-interlocked variable light adjusting function". The function of realizing the light adjustment by light shielding of the variable iris 120 is referred to also as "variable iris function". The function of realizing the light adjustment by variable voltage of the power source 106 for a light source is referred to also as "lamp light adjusting function".

By performing the light adjustment by the functions other than light modulation by the display element 102, a dynamic range of a video can be enlarged than a dynamic range of light modulation of the display element 102.

Also, there is a usage mode where a plurality of projection video display apparatuses 100 are provided, the projection video display apparatuses 100 project respective videos onto a display screen, and one continuous input video is projected as a whole (usage mode for multi-screen projection). In the multi-screen projection, there are "projection with no blending" where the videos are projected onto the display screen so that the videos disposed adjacently do not overlap with each other and "projection with blending" where videos are projected onto the display screen so that the videos disposed adjacently overlap with each other. Note that the concept of "projection with no blending" includes the projection where a plurality of videos are disposed adjacently to each other so that the videos strictly do not overlap with each other. However, the concept of "projection with no blending" does not require satisfying a condition that videos disposed adjacently to each other do not overlap with each other at all in a strict manner, and does not completely exclude a state where videos disposed adjacently to each other slightly overlap with each other. Namely, "projection with no blending" is the projection where a plurality of videos are projected adjacently so as not to overlap with each other as much as possible without performing the brightness adjustment of the plurality of videos in "overlapping portion" in "projection with blending" described in the following description of this embodiment. In this context, "projection with no blending" in the kinds of the multi-screen projection in the following description of this embodiment may be expressed as "projection without brightness adjustment in overlapping portion". In the same manner, "projection with blending" may be expressed as "projection with brightness adjustment in overlapping portion". In such a usage mode, it is necessary to pay an attention so as to prevent a joint of videos at the time of performing multi-screen projection from being unnatural in each of the plurality of projection video display apparatuses 100.

Next, a problem to be solved in the multi-screen projection by the plurality of projection video display apparatuses 100 will be studied in detail.

<<Example of Multi-Screen Projection in Accordance with "Projection with No Blending">>

First, an example of multi-screen projection in accordance with "projection with no blending" will be described.

An example where a targeted gradation video is displayed in "projection with no blending" of a video 1 and a video 2 will be described with reference to FIG. 2.

Figure 2:
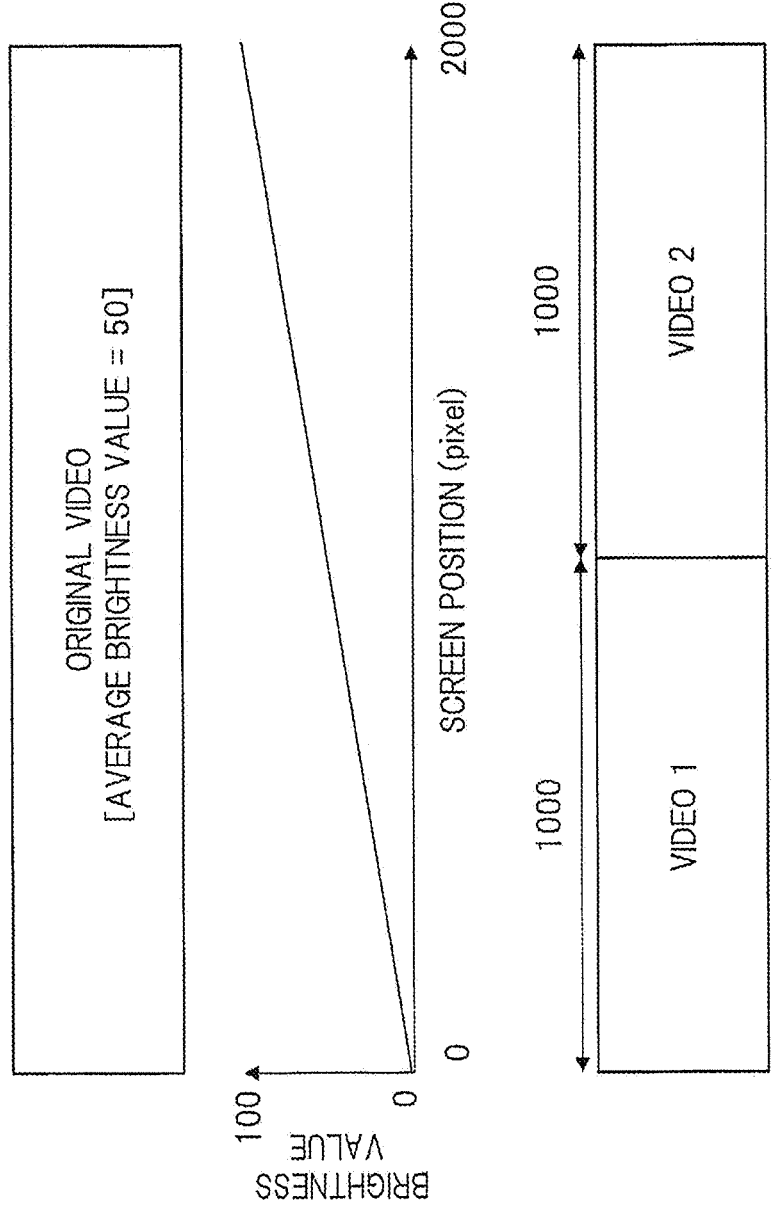
FIG. 2 is a view for describing an example of multi-screen projection in accordance with "projection with no blending"

FIG. 2 shows a case where an input video which is an original video is set to have an average brightness value of 50 in projection with no blending of videos of two projection video display apparatuses. In this case, the video 1 amounts to 1000 pixels (at positions of 0 to 1000 pixels) and the video 2 amounts to 1000 pixels (at positions of 1000 to 2000 pixels).

In this case, in the relationship between the screen positions (positions of pixels: 0 to 2000) and brightness values (0 to 100), the brightness value becomes 0 when the screen position is at the position of 0 pixel, and the brightness value becomes 100 when the screen position is at the position of 2000 pixels. Accordingly, if the video 1 and the video 2 can be displayed with a characteristic which increases linearly, there is no possibility that a joint between the video 1 and the video 2 becomes unnatural.

<<Example of Multi-Screen Projection in Accordance with "Projection with Blending">>

Next, an example of multi-screen projection in accordance with "projection with blending" will be described.

An example where a targeted gradation video is displayed in "projection with blending" of a video 1 and a video 2 will be described with reference to FIG. 3.

Figure 3:
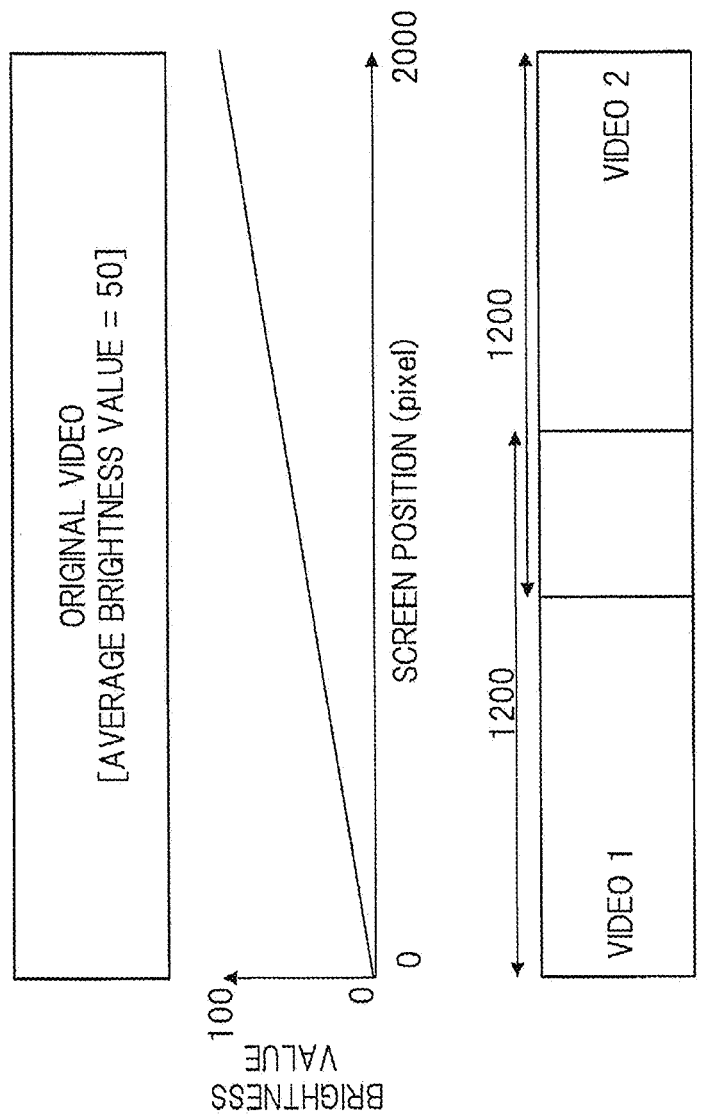
FIG. 3 is a view for describing an example of multi-screen projection in accordance with "projection with blending"

FIG. 3 shows a case where an input video which is an original video is set to have an average brightness value of 50 in projection with blending of videos of two projection video display apparatuses. In this case, the video 1 amounts to 1200 pixels (at positions of 0 to 1200 pixels) and the video 2 amounts to 1200 pixels (at positions of 800 to 2000 pixels). An overlapping portion between the video 1 and the video 2 amounts to 400 pixels.

In this case, in the relationship between the screen positions (positions of pixels: 0 to 2000) and brightness values (0 to 100), the brightness value becomes 0 when the screen position is at the position of 0 pixel, and the brightness value becomes 100 when the screen position is at the position of 2000 pixels. Accordingly, if the video 1 and the video 2 can be displayed with a characteristic which increases linearly, there is no possibility that a joint between the video 1 and the video 2 becomes unnatural.

Next, an example where a display of a targeted gradation video explained with reference to FIG. 2 is performed by a conventional projection video display apparatus will be described.

Figure 4:
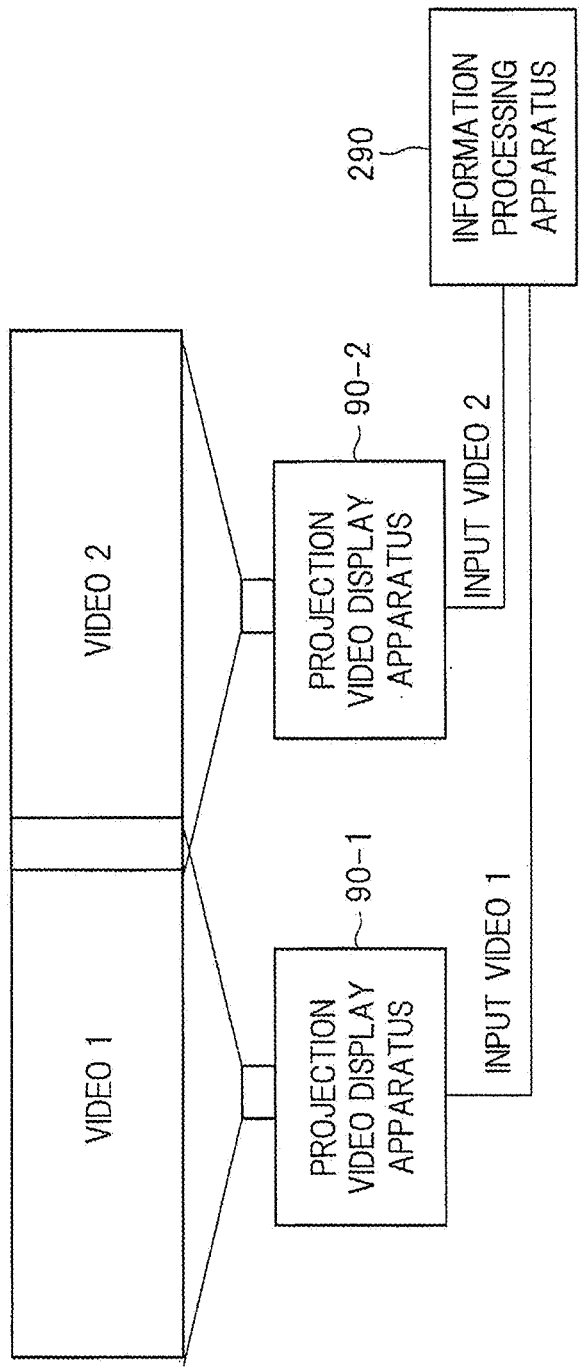
FIG. 4 is a view for describing a configuration example of a conventional multi-screen projection system.

FIG. 4 shows a configuration example of a system for performing multi-screen projection by two sets of conventional projection video display apparatuses 90-1 and 90-2. In performing multi-screen projection, input videos of the respective projection video display apparatuses are different from each other. For example, in FIG. 4, an input video 1 given to the projection video display apparatus 90-1 from an information processing apparatus 290 which is external equipment and an input video 2 given to the projection video display apparatus 90-2 from the information processing apparatus 290 are different from each other. Accordingly, it is necessary to enhance quality of a joint between the video 1 and the video 2 displayed on the display screen in multi-screen projection by adjusting a black display and a white display in the joint to be close to each other.

However, when a variable light adjusting function (lamp light adjusting function, variable iris function) in accordance with the input videos of the respective projection video display apparatuses 90-1 and 90-2 is performed, black brightness and white brightness of the respective projection video display apparatuses 90-1 and 90-2 are changed and the continuation of brightness at the joint becomes unnatural. For this reason, it is necessary to turn off the input-video-interlocked variable light adjusting function conventionally.

Hereinafter, an example of the case where the input-video-interlocked variable light adjusting function is turned on in multi-screen projection by the conventional projection video display apparatus and the case where the input-video-interlocked variable light adjusting function is turned off in multi-screen projection by the conventional projection video display apparatus will be described while comparing these cases.

<<[Projection with No Blending+No Input-Video-Interlocked Variable Light Adjusting Function]>>

First, an example where a display of a targeted gradation is performed in a state of [projection with no blending+no input-video-interlocked variable light adjusting function] will be described with reference to FIG. 5.

Figure 5:
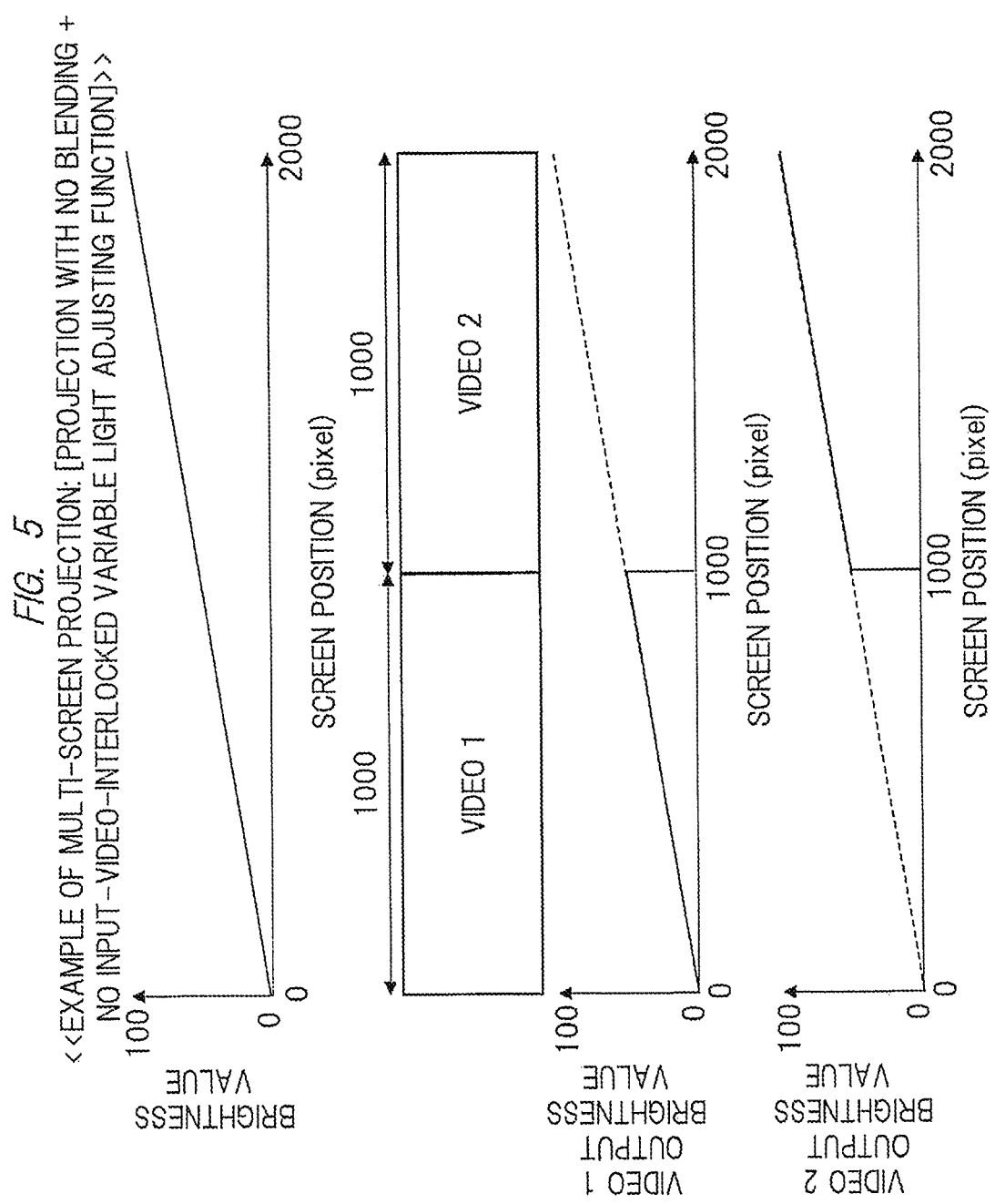
FIG. 5 is a view for describing an example of multi-screen projection in accordance with [projection with no blending+no input-video-interlocked variable light adjusting function]

FIG. 5 shows the case where a variable light adjusting function interlocked with an input video is turned off (or such function is not provided) in projection with no blending of a video 1 of the projection video display apparatus 90-1 and a video 2 of the projection video display apparatus 90-2.

In this case, in the relationship between the screen positions (positions of 0 to 1000 pixels) and brightness values of the video 1, the brightness value becomes 0 when the screen position is at the position of 0 pixel, and the brightness value becomes 50 when the screen position is at the position of 1000 pixels. Accordingly, a characteristic which increases linearly is exhibited.

In addition, in the relationship between the screen positions (positions of 1000 to 2000 pixels) and brightness values of the video 2, the brightness value becomes 50 when the screen position is at the position of 1000 pixels, and the brightness value becomes 100 when the screen position is at the position of 2000 pixels. Accordingly, a characteristic which increases linearly is exhibited.

In this manner, when the variable light adjusting function is turned off or such function is not provided, a targeted gradation display can be reproduced and it is possible to bring a joint between the video 1 and the video 2 into a natural state.

<<Problem: [Projection with No Blending+Input-Video-Interlocked Variable Light Adjusting Function of Prior Art]>>

Next, a problem to be solved in the case where a display of a targeted gradation is performed in a state of [projection with no blending+input-video-interlocked variable light adjusting function of prior art] will be described with reference to FIG. 6.

Figure 6:
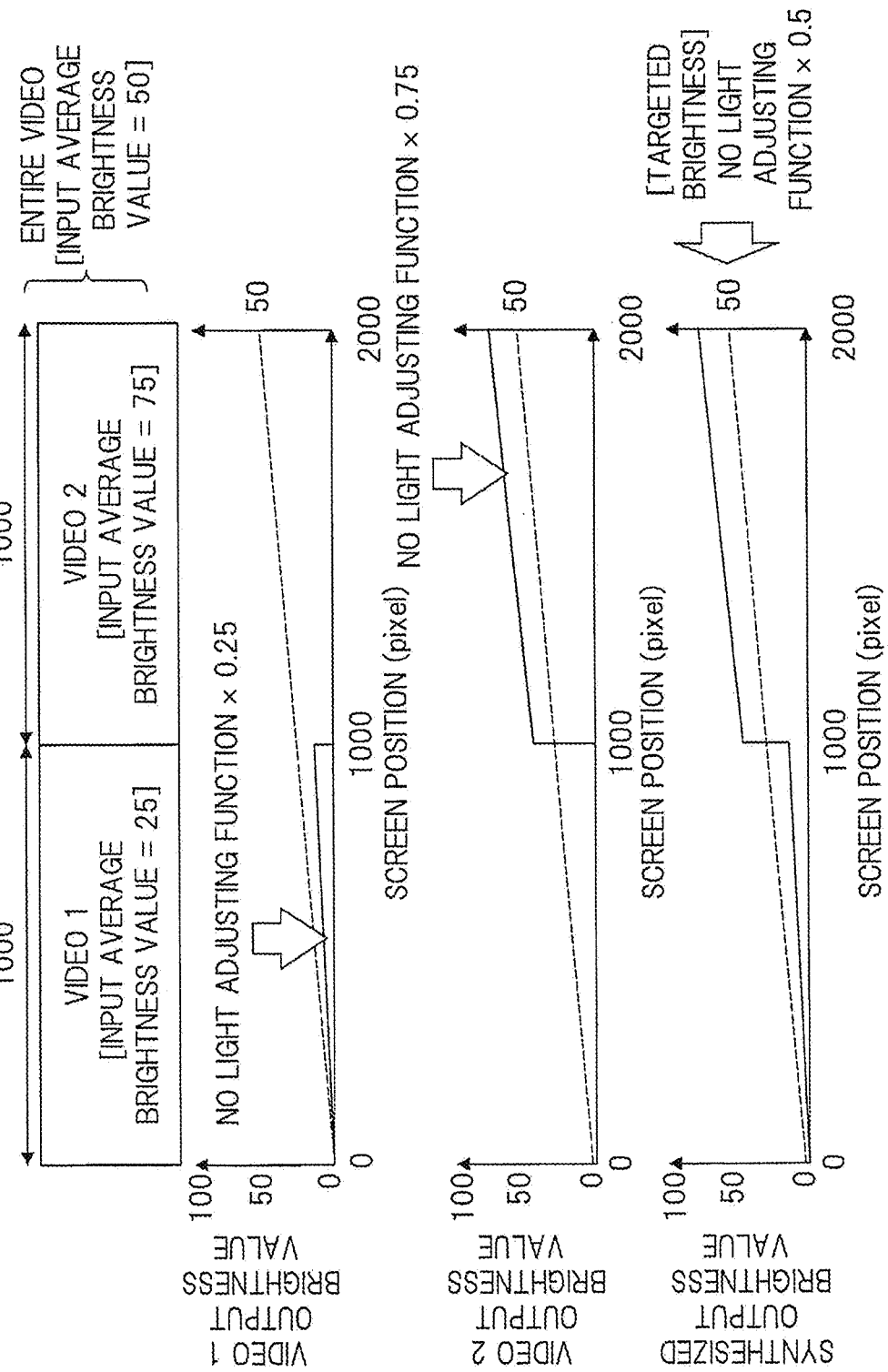
FIG. 6 is a view for describing a problem in [projection with no blending+input-video-interlocked variable light adjusting function of prior art]

FIG. 6 shows the case where a variable light adjusting function interlocked with an input video of prior art is provided and such function is turned on in projection with no blending of a video 1 of the projection video display apparatus 90-1 and a video 2 of the projection video display apparatus 90-2.

In this case, an input-video-interlocked variable light adjusting function of prior art is described by using an example of a general function in which the light adjusting amount is varied in an interlocking manner with average brightness of an input video signal. For the sake of simplifying the description, assume that a brightness value of an input video is set to a value which falls within a range of 0 to 100, the light adjusting amount is 0% when average brightness is set to 0, the light adjusting amount is 100% when average brightness is set to 100, and the intermediate light adjusting amount is proportional to average brightness.

Further, the video 1 amounts to 1000 pixels (at positions of 0 to 1000 pixels) and an input average brightness value is set to 25. The video 2 amounts to 1000 pixels (at positions of 1000 to 2000 pixels) and an input average brightness value is set to 75. An input average brightness value is set to 50 over the entire video (at positions of 0 to 2000 pixels).

In this case, since the input average brightness value to be input to the projection video display apparatus 90-1 is 25, a light adjusting ratio by a variable light adjusting function of the projection video display apparatus 90-1 becomes 25%. Accordingly, in the relationship between the screen positions (positions of 0 to 1000 pixels) of the video 1 and output brightness values (no light adjusting function×0.25), the brightness value becomes 0 when the screen position is at the position of 0 pixel, and the brightness value becomes 12.5 when the screen position is at the position of 1000 pixels. Accordingly, a characteristic which increases linearly is exhibited.

Also, since the input average brightness value to be input to the projection video display apparatus 90-2 is 75, a light adjusting ratio by a variable light adjusting function of the projection video display apparatus 90-2 becomes 75%. Accordingly, in the relationship between the screen positions (positions of 1000 to 2000 pixels) of the video 2 and brightness values (no light adjusting function×0.75), the brightness value becomes 37.5 when the screen position is at the position of 1000 pixels, and the brightness value becomes 75 when the screen position is at the position of 2000 pixels. Accordingly, a characteristic which increases linearly is exhibited.

In addition, with respect to an original targeted brightness value (no light adjusting function×0.5) which is indicated by a dotted line, the brightness value becomes 0 when the screen position is at the position of 0 pixel and the brightness value becomes 50 when the screen position is at the position of 2000 pixels, and it is supposed to exhibit a characteristic which increases linearly. On the other hand, in the example shown in FIG. 6, in the relationship between the screen positions (positions of 0 to 2000 pixels) and synthesized output brightness values when the video 1 and the video 2 are synthesized, a characteristic which linearly increases is exhibited when the screen position is at the positions of 0 to 1000 pixels and when the screen position is at the positions of 1000 to 2000 pixels, but the synthesized output brightness value changes from 12.5 to 37.5 at the position of 1000 pixels. Namely, the synthesized output brightness value largely differs from the targeted brightness value and a change in brightness at the screen position of 1000 pixels corresponding to a joint of the images becomes unnatural.

<<[Projection with Blending+No Input-Video-Interlocked Variable Light Adjusting Function]>>

Next, an example where a display of a targeted gradation is performed in a state of [projection with blending+no input-video-interlocked variable light adjusting function] will be described with reference to FIG. 7. Since a system configuration example is the same as that shown in FIG. 4, the description of the system configuration example is omitted.

Figure 7:
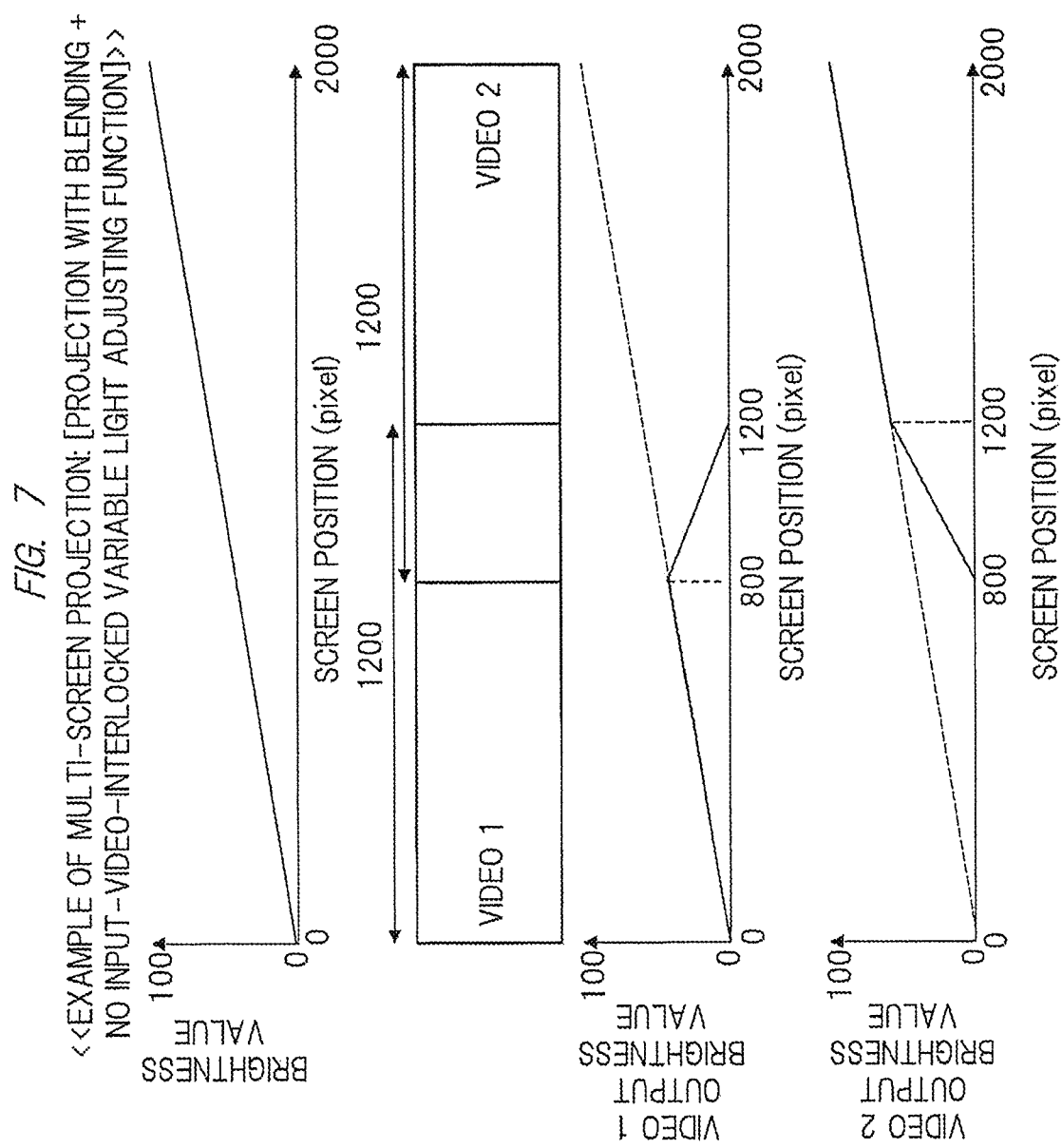
FIG. 7 is a view for describing an example of multi-screen projection in accordance with [projection with blending+no input-video-interlocked variable light adjusting function]

FIG. 7 shows the case where a light adjusting function interlocked with an input video is turned off (or such function is not provided) in projection with blending of a video 1 of the projection video display apparatus 90-1 and a video 2 of the projection video display apparatus 90-2.

In this case, in the relationship between the screen positions (positions of 0 to 1200 pixels) and brightness values of the video 1, the brightness value becomes 0 when the screen position is at the position of 0 pixel, the brightness value becomes when the screen position is at the position of 800 pixels, and the brightness value becomes 0 when the screen position is at the position of 1200 pixels. Accordingly, a characteristic which increases linearly is exhibited when the screen position falls within a range of 0 to 800 pixels, and a characteristic which lowers linearly is exhibited when the screen position falls within a range of 800 to 1200 pixels.

Also, in the relationship between the screen positions (positions of 800 to 2000 pixels) and brightness values of the video 2, the brightness value becomes 0 when the screen position is at the position of 800 pixels, the brightness value becomes 60 when the screen position is at the position of 1200 pixels, and the brightness value becomes 100 when the screen position is at the position of 2000 pixels. Accordingly, a characteristic which increases linearly is exhibited when the screen position falls within a range of 800 to 1200 pixels, and a characteristic which increases linearly (characteristic which increases more gently than the characteristic within a range of 800 to 1200 pixels) is exhibited when the screen position falls within a range of 1200 to 2000 pixels.

In this case, unlike the projection with no blending shown in FIG. 5, in the projection with blending shown in FIG. 7, output brightness values of both videos gently lower toward ends of the screen in order to naturally mix both videos in the portion where two videos overlap with each other (the portion corresponding to 800 to 1200 pixels in the example shown in FIG. 7), and a synthesized output brightness value is calculated while adjusting the output brightness values so as to acquire targeted gradation (brightness adjustment of overlapping portion).

In this manner, when the variable light adjusting function is turned off or such function is not provided, a targeted gradation display can be reproduced even in projection with blending, and it is possible to bring a joint between the video 1 and the video 2 into a natural state.

<<Problem: [Projection with Blending+Input-Video-Interlocked Variable Light Adjusting Function of Prior Art]>>

Next, a problem to be solved in the case where a display of a targeted gradation is performed in a state of [projection with blending+input-video-interlocked variable light adjusting function of prior art] will be described with reference to FIG. 8.

Figure 8:
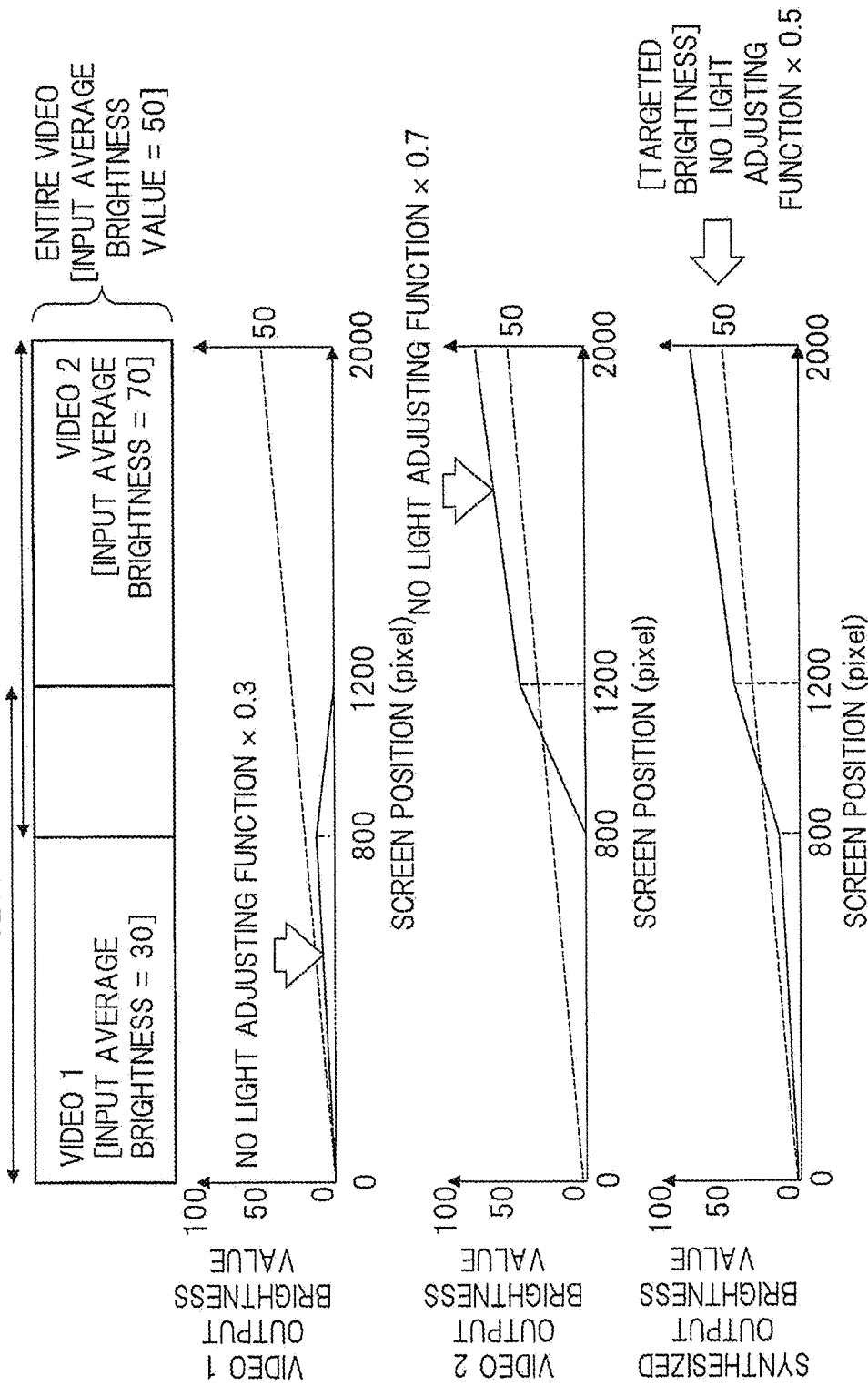
FIG. 8 is a view for describing a problem in [projection with blending+input-video-interlocked variable light adjusting function of prior art]

FIG. 8 shows the case where a light adjusting function interlocked with an input video of prior art is provided and such function is turned on in addition to projection with blending of a video 1 of the projection video display apparatus 90-1 and a video 2 of the projection video display apparatus 90-2.

The input-video-interlocked variable light adjusting function of prior art illustrated in this case is the same as the input-video-interlocked variable light adjusting function of prior art described with reference to FIG. 6, and hence, the repetitive description thereof is omitted.

Also, the video 1 amounts to 1200 pixels (at positions of 0 to 1200 pixels) and an input average brightness value is set to 30. The video 2 amounts to 1200 pixels (at positions of 800 to 2000 pixels) and an input average brightness value is set to 70. An input average brightness value is set to 50 over the entire video (at positions of 0 to 2000 pixels).

In this case, since the input average brightness value to be input to the projection video display apparatus 90-1 is 30, a light adjusting ratio by a variable light adjusting function of the projection video display apparatus 90-1 becomes 30%. Accordingly, in the relationship between the screen positions (positions of 0 to 1200 pixels) of the video 1 and brightness values (no light adjusting function×0.3), the brightness value becomes 0 when the screen position is at the position of 0 pixel, the brightness value becomes 15 when the screen position is at the position of 800 pixels, and the brightness value becomes 0 when the screen position is at the position of 1200 pixels. Accordingly, a characteristic which increases linearly is exhibited when the screen position falls within a range of 0 to 800 pixels, and a characteristic which lowers linearly is exhibited when the screen position falls within a range of 800 to 1200 pixels.

Also, since the input average brightness value to be input to the projection video display apparatus 90-2 is 70, a light adjusting ratio by a variable light adjusting function of the projection video display apparatus 90-2 becomes 70%. Accordingly, in the relationship between the screen positions (positions of 800 to 2000 pixels) of the video 2 and brightness values (no light adjusting function×0.7), the brightness value becomes 0 when the screen position is at the position of 800 pixels, the brightness value becomes 52.5 when the screen position is at the position of 1200 pixels, and the brightness value becomes 70 when the screen position is at the position of 2000 pixels. Accordingly, a characteristic which increases linearly is exhibited when the screen position falls within a range of 800 to 1200 pixels, and a characteristic which increases linearly (characteristic which increases more gently than the characteristic within a range of 800 to 1200 pixels) is exhibited when the screen position falls within a range of 1200 to 2000 pixels.

In addition, with respect to an original targeted brightness value (no light adjusting function×0.5) which is indicated by a dotted line, the brightness value becomes 0 when the screen position is at the position of 0 pixel and the brightness value becomes 50 when the screen position is at the position of 2000 pixels, and it is supposed to exhibit a characteristic which increases linearly. On the other hand, in the example shown in FIG. 8, in the relationship between the screen positions (positions of 0 to 2000 pixels) and synthesized output brightness values when the video 1 and the video 2 are synthesized, a characteristic which linearly increases is exhibited when the screen position is at the positions of 0 to 800 pixels and when the screen position is at the positions of 1200 to 2000 pixels, but the synthesized output brightness value sharply changes linearly from 15 to 52.5 at the positions of 800 to 1200 pixels corresponding to an overlapping portion. Namely, the synthesized output brightness value largely differs from the targeted brightness value and a change in brightness around the overlapping portion at the screen positions of 800 to 1200 pixels corresponding to a joint of the images becomes unnatural.

As described above, since a change in brightness around a joint becomes unnatural when an input-video-interlocked variable light adjusting function is turned on at the time of performing multi-screen projection in the conventional projection video display apparatus, it is necessary to turn off the input-video-interlocked variable light adjusting function. Accordingly, it has been not easy in multi-screen projection to acquire an effect of enlarging a dynamic range of a video by the input-video-interlocked variable light adjusting function.

<Means for Solving Problem of Multi-Screen Projection>

Next, means for solving a problem of multi-screen projection mentioned above will be described. The multi-screen projection by the conventional projection video display apparatus described above has a problem that a joint between the video 1 and the video 2 becomes unnatural, and this embodiment solves the problem in the following manner.

In this embodiment, at the time of multi-screen projection, instead of light adjustment in units of divided video, a common light adjusting value is set by using a parameter based on a video portion (for example, an entire input video) having a larger range than the divided video, and the common light adjusting value is used in common by a plurality of projection video display apparatuses, so that light adjusting ratios of the plurality of projection video display apparatuses can be made closer to each other and it is thus possible to make a boundary portion (joint, border) in multi-screen projection less noticeable even when the light adjusting function is operated. The specific description is as follows.

<<Solving Means: [Projection with No Blending+Input-Video-Interlocked Variable Light Adjusting Function of this Embodiment]>>

The concept of an operation of [projection with no blending+input-video-interlocked variable light adjusting function of this embodiment] for solving the conventional problem will be described with reference to FIG. 9.

Figure 9:
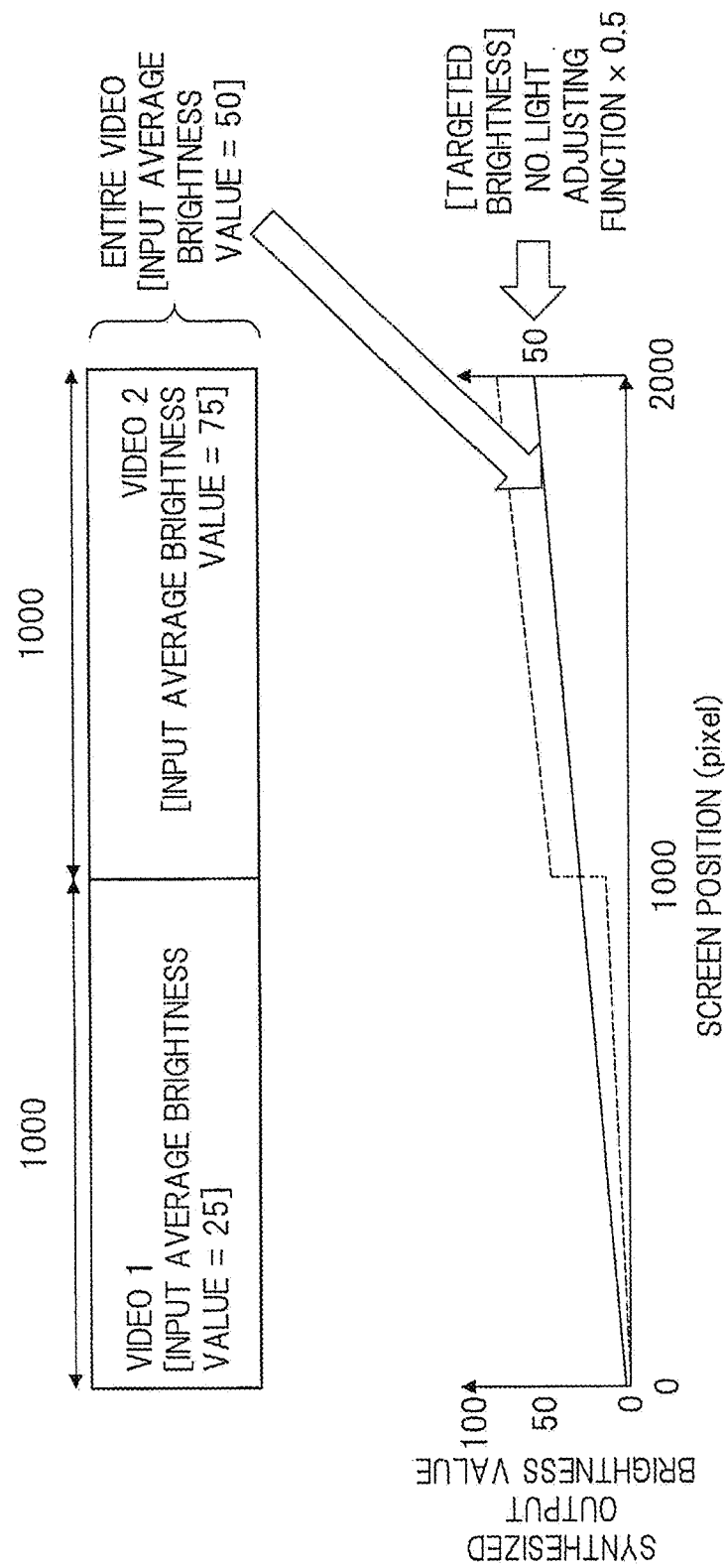
FIG. 9 is a view for describing an operation concept of [projection with no blending+input-video-interlocked variable light adjusting function of present embodiment]

FIG. 9 shows an operational example capable of solving <<problem: [projection with no blending+input-video-interlocked variable light adjusting function of prior art] in the case of gradation display>> described above with reference to FIG. 6.

In the input-video-interlocked variable light adjusting function of this embodiment shown in FIG. 9, for example, the configuration of "input-video-interlocked variable light adjusting function" described with reference to FIG. 1, that is, the function of realizing the light adjustment by light shielding of the variable iris 120 (variable iris function) or the function of realizing the light adjustment by variable voltage of the power source 106 for a light source (lamp light adjusting function) is adopted.

In the input-video-interlocked variable light adjusting function of this embodiment, an input average brightness value of a video (for example, an entire video) larger than each of the video 1 and the video 2 is used in common for both videos 1 and 2. In this manner, it is possible to make a synthesized output brightness value approach a targeted brightness value.

In FIG. 9, the video 1 amounts to 1000 pixels (at positions of 0 to 1000 pixels) and an input average brightness value is set to 25. The video 2 amounts to 1000 pixels (at positions of 1000 to 2000 pixels) and an input average brightness value is set to 75. An input average brightness value is set to 50 over the entire video (at positions of 0 to 2000 pixels).

In this case, in the relationship between the screen positions (positions of 0 to 2000 pixels) and synthesized output brightness values when the video 1 and the video 2 are synthesized, the input-video-interlocked variable light adjusting function of the prior art has a characteristic that the synthesized output brightness value changes from 12.5 to 37.5 at the position of 1000 pixels as indicated by a broken line, and thus the synthesized output brightness value largely differs from the targeted brightness value and a joint of the videos at the screen position of 1000 pixels becomes unnatural.

On the other hand, in the input-video-interlocked variable light adjusting function of this embodiment, light adjusting values (25% and 75% in the example shown in FIG. 6) which are calculated based on respective input average brightness values of the video 1 (input average brightness value=25) and the video 2 (input average brightness value=75) are not separately adopted, and a light adjusting value (50%) which is calculated based on an input average brightness value (=50) of the entire video which is larger than the video 1 and the video 2 is used in common for both the videos 1 and 2. In this manner, as indicated by a solid line, the brightness value becomes 0 when the screen position is at the position of 0 pixel and the brightness value becomes 50 when the screen position is at the position of 2000 pixels, and a characteristic which increases linearly is exhibited. Accordingly, the synthesized output brightness value approaches the targeted brightness value and a change in brightness around the screen position of 1000 pixels corresponding to a joint of the screen becomes more natural.

<<Solving Means: [Projection with Blending+Input-Video-Interlocked Variable Light Adjusting Function of this Embodiment]>>

Next, also with respect to "projection with blending", the concept of an operation of [projection with blending+input-video-interlocked variable light adjusting function of this embodiment] for solving the conventional problem will be described with reference to FIG. 10.

Figure 10:
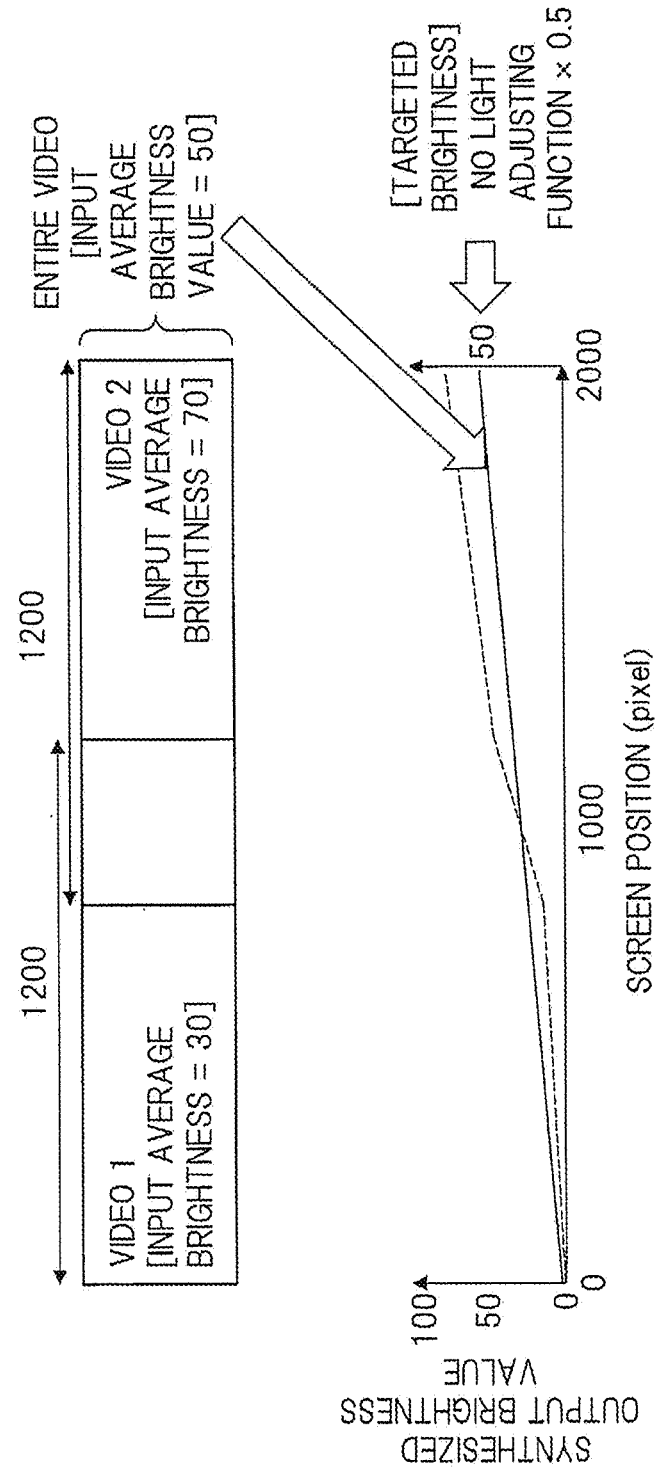
FIG. 10 is a view for describing an operation concept of [projection with blending+input-video-interlocked variable light adjusting function of present embodiment]

FIG. 10 shows an operational example capable of solving <<problem: [projection with blending+input-video-interlocked variable light adjusting function of prior art] in the case of gradation display>> described above with reference to FIG. 8.

Also in the input-video-interlocked variable light adjusting function of this embodiment shown in FIG. 10, like the example shown in FIG. 9, for example, the configuration of "input-video-interlocked variable light adjusting function" described with reference to FIG. 1, that is, the function of realizing the light adjustment by light shielding of the variable iris 120 (variable iris function) or the function of realizing the light adjustment by variable voltage of the power source 106 for a light source (lamp light adjusting function) is adopted.

Also in the input-video-interlocked variable light adjusting function of this embodiment, an input average brightness value of a video (for example, an entire video) larger than the video 1 and the video 2 is used in common for both the videos 1 and 2. In this manner, it is possible to make a synthesized output brightness value approach a targeted brightness value.

In FIG. 10, the video 1 amounts to 1200 pixels (at positions of 0 to 1200 pixels) and an input average brightness value is set to 30. The video 2 amounts to 1200 pixels (at positions of 800 to 2000 pixels) and an input average brightness value is set to 70. An input average brightness value is set to 50 over the entire video (at positions of 0 to 2000 pixels).

In this case, in the relationship between the screen positions (positions of 0 to 2000 pixels) and synthesized output brightness values when the video 1 and the video 2 are synthesized, the input-video-interlocked variable light adjusting function of the prior art has a characteristic that the synthesized output brightness value sharply changes linearly from 15 to 52.5 at the positions of 800 to 1200 pixels as indicated by a broken line, and thus the synthesized output brightness value largely differs from the targeted brightness value and a joint of the videos at the screen positions of 800 to 1200 pixels becomes unnatural. On the other hand, in the input-video-interlocked variable light adjusting function of this embodiment, light adjusting values (30% and 70% in the example shown in FIG. 6) which are calculated based on respective input average brightness values of the video 1 (input average brightness value=30) and the video 2 (input average brightness value=70) are not separately adopted, and a light adjusting value (50%) which is calculated based on an input average brightness value (=50) of the entire video which is larger than the video 1 and the video 2 is used in common for both the videos 1 and 2. In this manner, as indicated by a solid line, the brightness value becomes 0 when the screen position is at the position of 0 pixel and the brightness value becomes 50 when the screen position is at the position of 2000 pixels, and a characteristic which increases linearly is exhibited. Accordingly, the synthesized output brightness value approaches the targeted brightness value (no light adjusting function×0.5) and a change in brightness around the screen positions of 800 to 1200 pixels corresponding to a joint of the screen becomes more natural.

Hereinafter, <Basic example>, <Modification example 1>, <Modification example 2>, <Modification example 3>, <Modification example 4>, <Modification example 5>, <Modification example 6> and <Modification example 7> to which <Means for solving problem of multi-screen projection> described above is applied will be described in sequence. Both of the basic example and the modification examples are applicable to any one of "projection with blending" and "projection with no blending".

Basic Example

Figure 11:
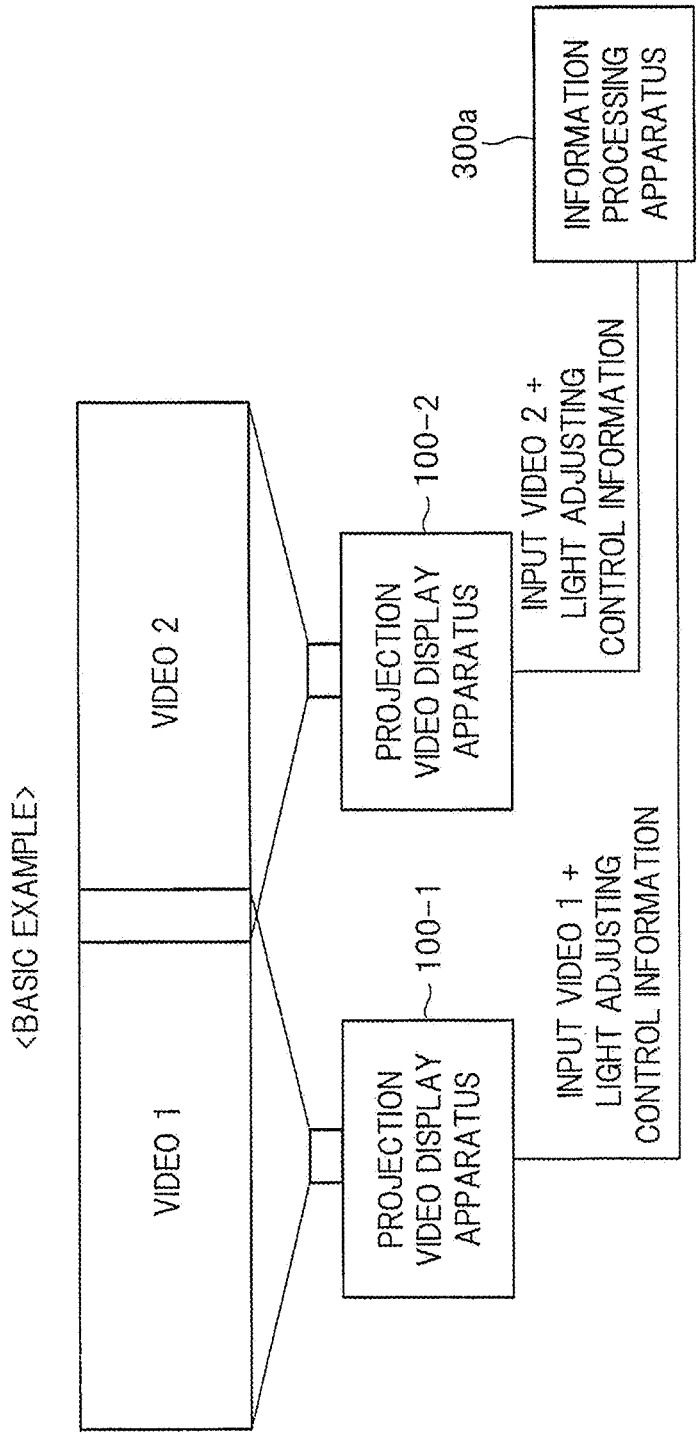
FIG. 11 is a view for describing a configuration of a basic example in one embodiment of the present invention.

The basic example will be described with reference to FIG. 11 to FIG. 14. FIG. 11 is a view for describing the configuration of the basic example.

As shown in FIG. 11, as the configuration of the basic example, an example where projection video display apparatuses 100-1 and 100-2 as a plurality of projection video display apparatuses and an information processing apparatus 300a as external equipment are provided will be described. Each of the projection video display apparatuses 100-1 and 100-2 corresponds to the projection video display apparatus 100 having the internal configuration described above with reference to FIG. 1. The information processing apparatus 300a corresponds to one example of the external equipment 300 connected to the video signal input unit/output unit 131 described above with reference to FIG. 1.

In both of the connection between the projection video display apparatus and the information processing apparatus and the connection between a plurality of projection video display apparatuses described with reference to FIG. 11 and subsequent figures, for example, the connection by the interface 190 described with reference to FIG. 1 may be used. By doing so, it is possible to perform not only the transmission and reception of videos but also the transmission and reception of control information.

The information processing apparatus 300a generates input videos 1 and 2 displayed by the respective projection video display apparatuses 100-1 and 100-2 based on an input video 0 for multi-screen projection in both the projection video display apparatuses 100-1 and 100-2. Further, the information processing apparatus 300a determines the light adjusting amount by an arithmetic operation using the entire input video 0 having a range wider than the respective ranges of the input videos 1 and 2 to be displayed by the projection video display apparatuses 100-1 and 100-2, and also generates information which designates the light adjusting amount (light adjusting control information).

Further, the information processing apparatus 300a outputs the input video 1 to be displayed by the projection video display apparatus 100-1 and the light adjusting control information to the projection video display apparatus 100-1. The projection video display apparatus 100-1 receives the input video 1 and the light adjusting control information as an input and displays the video 1 while changing the light adjusting amount based on the light adjusting control information. Similarly, the information processing apparatus 300a outputs the input video 2 to be displayed by the projection video display apparatus 100-2 and the light adjusting control information to the projection video display apparatus 100-2. The projection video display apparatus 100-2 receives the input video 2 and the light adjusting control information as an input and displays the video 2 while changing the light adjusting amount based on the light adjusting control information. The light adjusting control information transmitted to the projection video display apparatus 100-1 and the projection video display apparatus 100-2 contains a common light adjusting value, and the common light adjusting value is used in common by both the projection video display apparatus 100-1 and the projection video display apparatus 100-2.

As the effect of the configuration of the basic example, at the time of performing multi-screen projection, it is possible to make a joint between the video 1 displayed by the projection video display apparatus 100-1 and the video 2 displayed by the projection video display apparatus 100-2 less noticeable and simultaneously acquire a high dynamic range of the entire multi-screen projection video formed of the video 1 and the video 2.

<<Projection Video Display Apparatus According to Basic Example>>

Figure 12:
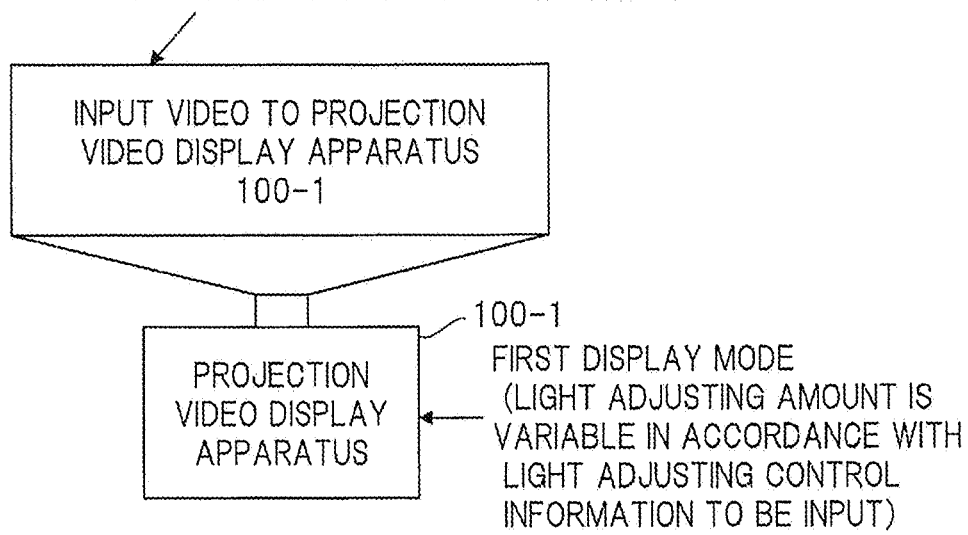
FIG. 12 is a view for describing a projection video display apparatus in the basic example in one embodiment of the present invention.

A projection video display apparatus according to the basic example will be described with reference to FIG. 12. FIG. 12 is a view for describing the projection video display apparatus according to the basic example.

As shown in FIG. 12, the projection video display apparatus 100-1 is described as an example of the projection video display apparatus according to the basic example. The projection video display apparatus 100-1 has a variable light adjusting function (input-video-interlocked variable light adjusting function such as lamp light adjusting function and variable iris function) and is provided with a plurality of display modes using the variable light adjusting function, and one display mode of the plurality of display modes can be selected from a menu screen which is displayed and superimposed on a projected video.

Also, the plurality of display modes using the variable light adjusting function include a first display mode where the input video 1 is displayed while changing the light adjusting amount in accordance with the light adjusting control information which is input from the information processing apparatus 300a and is capable of controlling the variable light adjusting function in units of one frame of a projected video. Namely, in the first display mode, the light adjusting amount is changeable in accordance with input light adjusting control information. The first display mode is a display mode used at the time of performing the above-mentioned multi-screen projection (multi-screen projection mode).

Further, the plurality of display modes using the variable light adjusting function include a second display mode where the input video 1 is displayed while changing the light adjusting amount in accordance with the input video 1 input to the projection video display apparatus 100-1 for use in the single projection of the projection video display apparatus 100-1. Namely, in the second display mode, an object of the arithmetic operation for the calculation of the light adjusting amount is an input video input to the projection video display apparatus 100-1 as shown in FIG. 12. The second display mode is a display mode at the time of using only the projection video display apparatus 100-1 (single display mode).

<<Menu Screen in Basic Example>>

Figure 13:
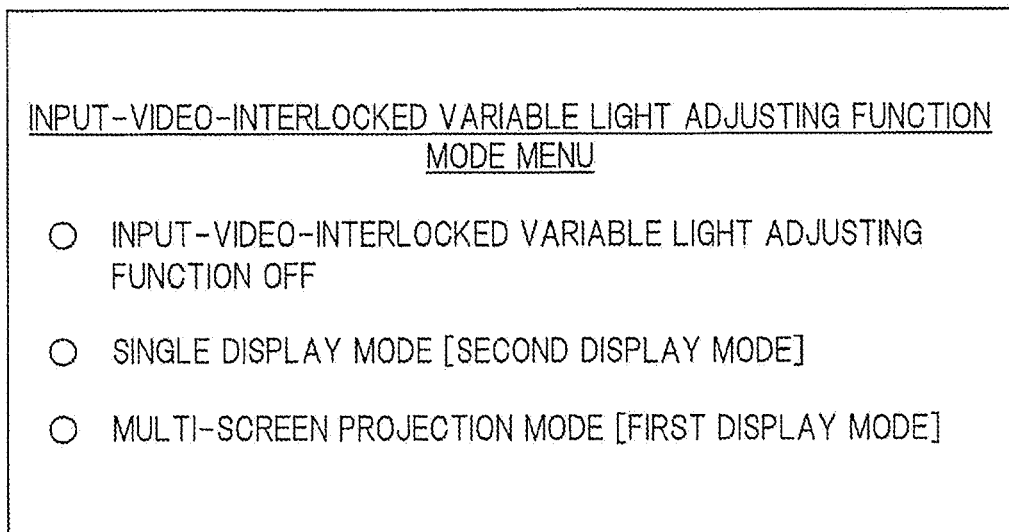
FIG. 13 is a view for describing a menu screen in the basic example in one embodiment of the present invention.

A menu screen in the basic example will be described with reference to FIG. 13. FIG. 13 is a view for describing the menu screen in the basic example.

As shown in FIG. 13, the input-video-interlocked variable light adjusting function mode menu which is the menu screen in the basic example includes: a multi-screen projection mode as the first display mode; and a single display mode as the second display mode. Further, the input-video-interlocked variable light adjusting function mode menu includes a mode for turning off the input-video-interlocked variable light adjusting function. The menu screen may be configured so that these modes can be alternatively selected by moving a cursor based on an operation input to be input to the operation input unit 107.

In the configuration of the basic example, it is possible to add an image quality control interlocking function of <Modification example 5> and a local image quality adjustment prohibiting function of <Modification example 6> described later as an image quality adjusting function. For example, the first display mode may have a state where the execution of first image quality adjustment processing (image quality control interlocking function of <modification example 5>) which uniformly affects the entire input video is allowed and the execution of second image quality adjustment processing (local image quality adjustment prohibiting function of <modification example 6>) where image quality adjustment to the input video locally differs is prohibited. Further, the second display mode or a mode where an input-video-interlocked variable light adjusting function is turned off may have a state where the execution of both the first image quality adjustment processing and the second image quality adjustment processing are allowed.

Also, in the configuration of the basic example, it is possible to add a function of <Modification example 7> described later as a countermeasure to cope with the case where brightness of the plurality of projection video display apparatuses 100-1 and 100-2 is not uniform when an input-video-interlocked variable light adjusting function is turned off due to individual difference of the light source 105. For example, the projection video display apparatuses 100-1 and 100-2 may include a second variable light adjusting function (first control of <Modification example 7>) which can change the light adjusting amount by light adjusting means different from light adjusting means used in an input-video-interlocked variable light adjusting function (second control of <Modification example 7>). The second variable light adjusting function is a variable light adjusting function which is used for making a boundary between projected videos less noticeable in a state where the variable light adjusting function is turned off when videos related to each other are simultaneously displayed by one projection video display apparatus 100-1 and the other projection video display apparatus 100-2. Also, the light adjusting means used for the variable light adjusting function is not used for the second variable light adjusting function.

These additional functions of <Modification example 5>, <Modification example 6> and <Modification example 7> can be added to the configurations of <Modification example 1>, <Modification example 2>, <Modification example 3> and <Modification example 4> in the same manner in addition to <Basic example>.

<<Connection Example of n Sets of Projection Video Display Apparatuses in Basic Example>>

Figure 14:
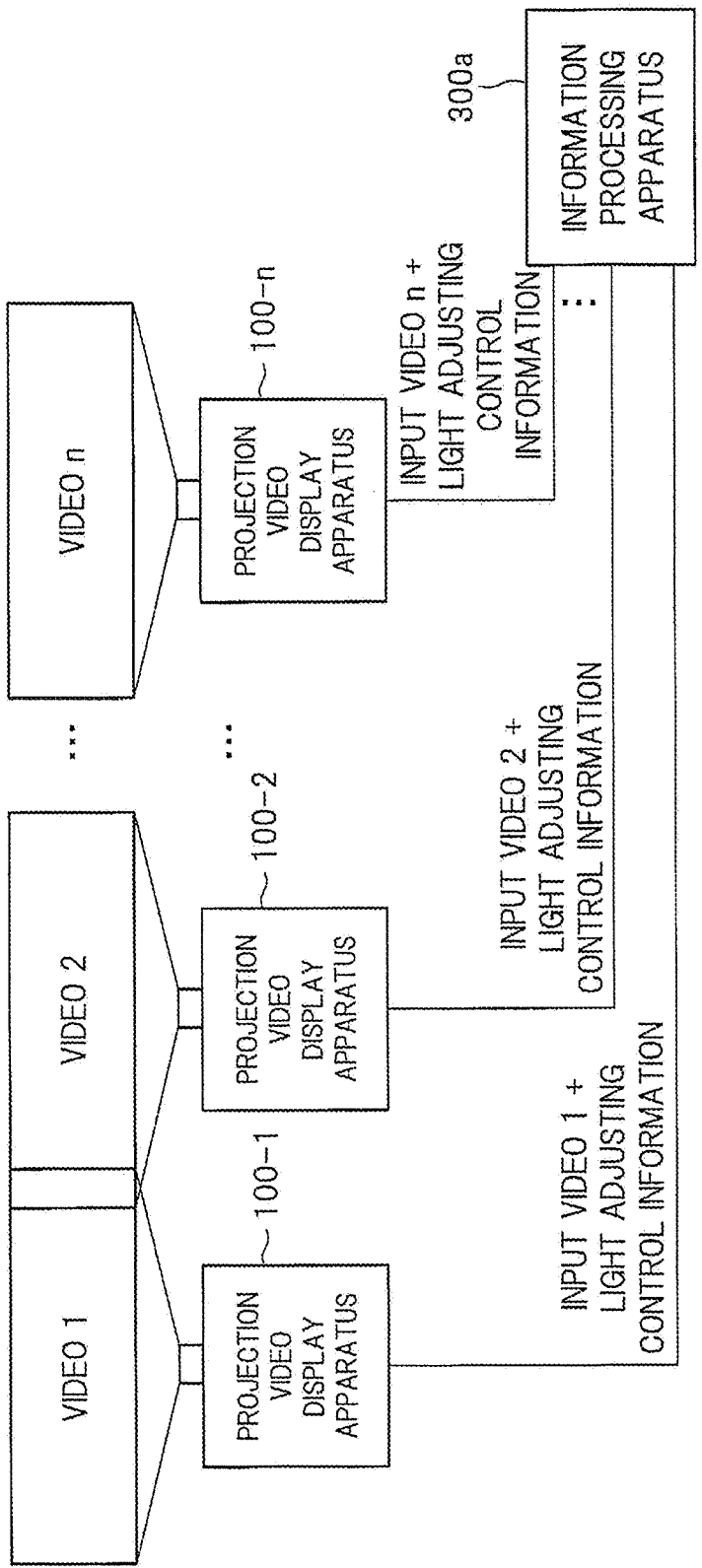
FIG. 14 is a view for describing a connection example where n sets of projection video display apparatuses are connected to each other in the basic example in one embodiment of the present invention.

A connection example of n sets of projection video display apparatuses in the basic example will be described with reference to FIG. 14. FIG. 14 is a view for describing the connection example of n sets of projection video display apparatuses in the basic example.

As shown in FIG. 14, in an example where n sets of projection video display apparatuses 100-1, 100-2, . . . , and 100-n and an information processing apparatus 300a are connected, the information processing apparatus 300a generates the input videos 1, 2, . . . , and n to be displayed by the respective projection video display apparatuses 100-1, 100-2, . . . , and 100-n. Further, the information processing apparatus 300a generates also the light adjusting control information which designates the light adjusting amount used in common by the projection video display apparatuses 100-1, 100-2, . . . , and 100-n. Then, the information processing apparatus 300a outputs the input videos 1, 2, . . . , and n and the light adjusting control information to the respective projection video display apparatuses 100-1, 100-2, . . . , and 100-n. The respective projection video display apparatuses 100-1, 100-2, . . . , and 100-n receive the input videos 1, 2, . . . , and n and the light adjusting control information as inputs and display the videos 1, 2, . . . , and n while changing the light adjusting amount based on the light adjusting control information which designates the common light adjusting value in any of the apparatuses.

In this manner, at the time of performing multi-screen projection using n sets of projection video display apparatuses 100-1 to 100-n, it is possible to improve quality of a joint between the video 1 displayed by the projection video display apparatus 100-1 and the video 2 displayed by the projection video display apparatus 100-2, quality of a joint between the video 2 displayed by the projection video display apparatus 100-2 and the video 3 displayed by the projection video display apparatus 100-3, . . . , and quality of a joint between the video n−1 displayed by the projection video display apparatus 100-(n−1) and the video n displayed by the projection video display apparatus 100-n.

Hereinafter, a plurality of modification examples will be described below, and the description of the operation and the processing which are the same as those described in the basic example is omitted for the sake of avoiding the repetition of the description in all these modification examples.

Modification Example 1

Figure 15:
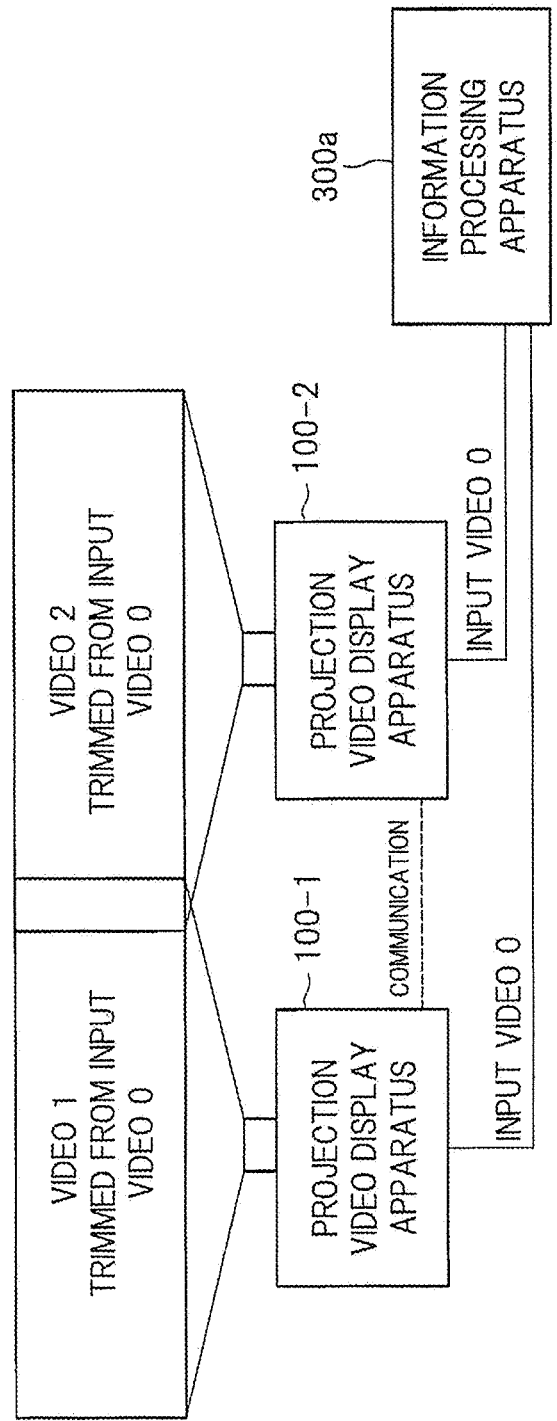
FIG. 15 is a view for describing a configuration of a modification example 1 in one embodiment of the present invention.

A modification example 1 will be described with reference to FIG. 15 to FIG. 18. FIG. 15 is a view for describing the configuration of the modification example 1.

As shown in FIG. 15, as the configuration of the modification example 1, an example where the projection video display apparatuses 100-1 and 100-2 as a plurality of projection video display apparatuses and the information processing apparatus 300a as external equipment are provided will be described.

The information processing apparatus 300a outputs an input video 0 for multi-screen projection in both the projection video display apparatuses 100-1 and 100-2 to the projection video display apparatuses 100-1 and 100-2.

The projection video display apparatuses 100-1 and 100-2 receive the input video 0 as an input and determine the light adjusting amount in accordance with the whole input video 0, and trimmed videos 1 and 2 which are portions of the input video 0 set by the respective projection video display apparatuses 100-1 and 100-2 (the videos 1 and 2 trimmed from the input video 0) are displayed. Namely, in the multi-screen projection mode, the light adjusting amount is determined based on an arithmetic operation using the whole input video 0 having a range wider than ranges displayed by the projection video display apparatuses 100-1 and 100-2, and the same arithmetic operation is used in the projection video display apparatus 100-1 and the projection video display apparatus 100-2. At this time, since the arithmetic operation applied to the same video (input video 0) is performed in the projection video display apparatus 100-1 and the projection video display apparatus 100-2, the light adjusting value can be used in common between the projection video display apparatus 100-1 and the projection video display apparatus 100-2. Accordingly, quality of a joint between projected videos of these apparatuses can be improved in the multi-screen projection mode.

In order to perform setting of image quality and others in common, the configuration in which the projection video display apparatus 100-1 and the projection video display apparatus 100-2 are connected to each other by a communication line to establish communication therebetween may also be adopted.

<<Projection Video Display Apparatus According to Modification Example 1>>

Figure 16:
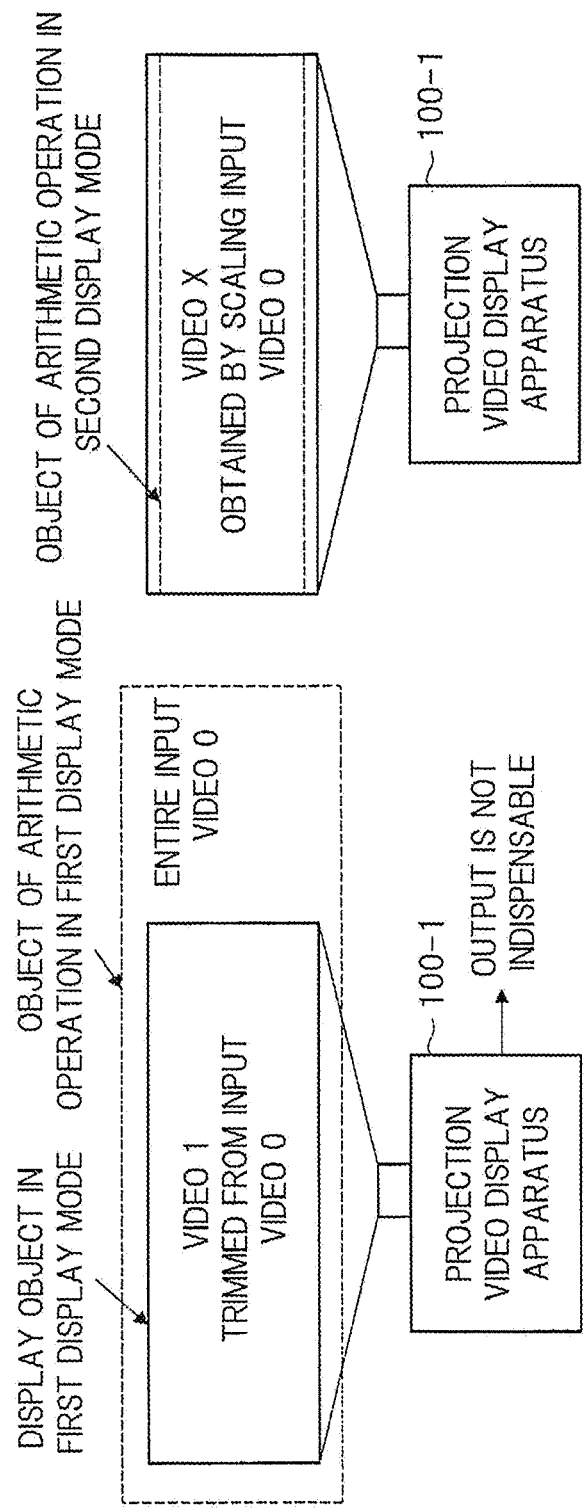
FIG. 16 is a view for describing a projection video display apparatus in the modification example 1 in one embodiment of the present invention.

A projection video display apparatus according to the modification example 1 will be described with reference to FIG. 16. FIG. 16 is a view for describing the projection video display apparatus according the modification example 1.

As shown in FIG. 16, the projection video display apparatus 100-1 will be described as an example of the projection video display apparatus according to the modification example 1. The projection video display apparatus 100-1 has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a first display mode where a video 1 trimmed from the input video 0 which is input to the projection video display apparatus 100-1 is displayed while changing the light adjusting amount in accordance with an arithmetic operation applied to the input video 0. Namely, in the first display mode, as shown in FIG. 16, a display object is the video 1 trimmed from the input video 0, and an object of arithmetic operation is the entire input video 0. This first display mode is a multi-screen projection mode.

Further, the plurality of display modes using the variable light adjusting function include a second display mode where a video X obtained by scaling the input video 0 input to the projection video display apparatus 100-1 is displayed while changing the light adjusting amount in accordance with an arithmetic operation applied to the input video 0 or the video X obtained by scaling the input video 0. In FIG. 16, the video X obtained by scaling (contracting) the input video 0 is used as an object of the arithmetic operation. This second display mode is a single display mode.

In the projection video display apparatus 100-1 according to the modification example 1, output to another projection video display apparatus 100-2 is not always necessary, and such output is not indispensable.

<<Menu Screen in Modification Example 1>>

A menu screen in the modification example 1 will be described with reference to FIG. 17. FIG. 17 is a view for describing the menu screen in the modification example 1.

As shown in FIG. 17, an input-video-interlocked variable light adjusting function mode menu as a menu screen in the modification example 1 includes a multi-screen projection mode as a first display mode and a single display mode as a second display mode. The input-video-interlocked variable light adjusting function mode menu further includes a mode for turning off the input-video-interlocked variable light adjusting function.

<<Connection Example of n Sets of Projection Video Display Apparatuses in Modification Example 1>>

Figure 18:
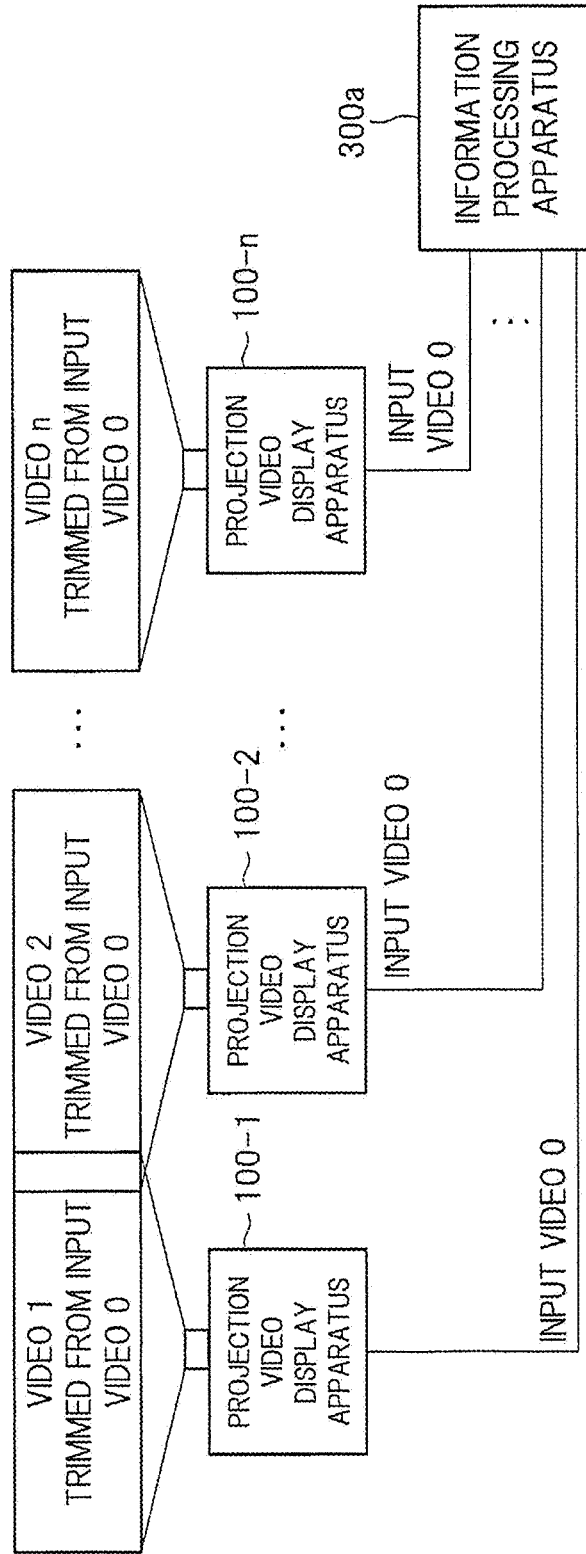
FIG. 18 is a view for describing a connection example where n sets of projection video display apparatuses are connected to each other in the modification example 1 in one embodiment of the present invention.

A connection example of n sets of projection video display apparatuses in the modification example 1 will be described with reference to FIG. 18. FIG. 18 is a view for describing the connection example of n sets of projection video display apparatuses in the modification example 1.

As shown in FIG. 18, in the example where n sets of projection video display apparatuses 100-1, 100-2, . . . , and 100-n and the information processing apparatus 300a are connected to each other, the information processing apparatus 300a outputs an input video 0 to the respective projection video display apparatuses 100-1, 100-2, . . . , and 100-n. The respective projection video display apparatuses 100-1, 100-2, . . . , and 100-n receive the input video 0 as an input and determine the light adjusting amount in accordance with the entire input video 0, and trimmed videos 1, 2, . . . , and n which are portions of the input video 0 set by the respective projection video display apparatuses 100-1, 100-2, . . . , and 100-n, that is, the videos 1, 2, . . . , and n trimmed from the input video 0 are displayed.

In this manner, at the time of performing multi-screen projection using n sets of projection video display apparatuses 100-1 to 100-n, it is possible to improve quality of joints between the videos 1, 2, . . . , and n displayed by the respective projection video display apparatuses 100-1, 100-2, . . . , and 100-n.

As described above, in the modification example 1, by performing processing on the side of the plurality of projection video display apparatuses according to this example, the light adjusting value which can be used in common among the plurality of projection video display apparatuses can be calculated, and the variable light adjusting function using such a common light adjusting value can be realized. Accordingly, in the modification example 1, it is unnecessary to provide a function of generating light adjusting control information to the information processing apparatus 300a, and a simple video outputting apparatus may be used as the information processing apparatus 300a. Namely, in the modification example 1, even when the information processing apparatus 300a is formed of a simple video outputting apparatus, it is possible to realize the improvement of quality of joints of projected videos in the multi-screen projection mode.

Modification Example 2

Figure 19:
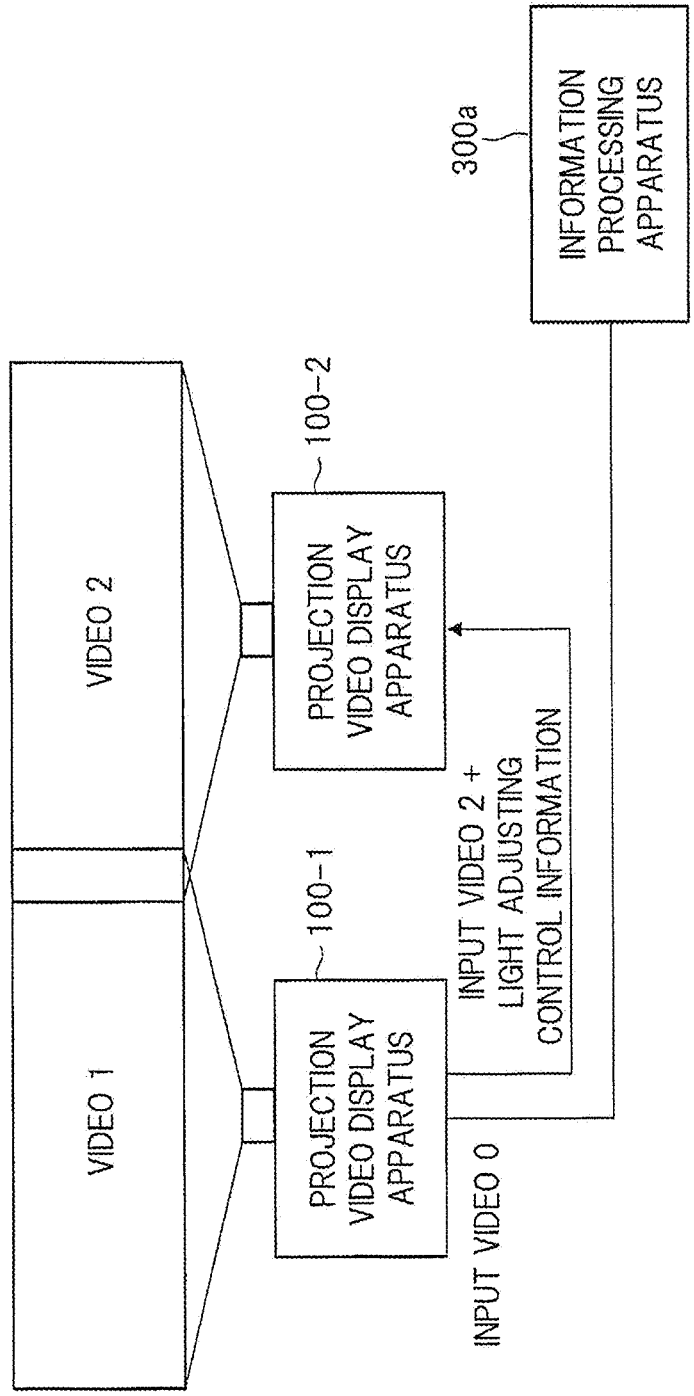
FIG. 19 is a view for describing a configuration of a modification example 2 in one embodiment of the present invention.

A modification example 2 will be described with reference to FIG. 19 to FIG. 24. FIG. 19 is a view for describing the configuration of the modification example 2.

As shown in FIG. 19, as the configuration of the modification example 2, an example where the projection video display apparatuses 100-1 and 100-2 as a plurality of projection video display apparatuses and the information processing apparatus 300a as external equipment are provided will be described.

The first projection video display apparatus 100-1 is defined as a master, and another projection video display apparatus 100-2 is defined as a slave. The information processing apparatus 300a outputs an input video 0 (video including the entire display video in the multi-screen projection) to the projection video display apparatus 100-1 serving as a master.

The projection video display apparatus 100-1 serving as a master receives an input video 0 as an input, designates trimming for a video 1 and a video 2, and outputs the video 2 to the projection video display apparatus 100-2 serving as a slave and further outputs light adjusting control information calculated by an arithmetic operation (average brightness, histogram, maximum brightness) or the like based on the input video 0 to the projection video display apparatus 100-2. The light adjusting control information is light adjusting control information capable of controlling a variable light adjusting function of the projection video display apparatus 100-2 in units of one frame of a projected video so as to make a light adjusting state of the projection video display apparatus 100-2 approach a light adjusting state of the projection video display apparatus 100-1 (so as to use a light adjusting value in common). At this time, the projection video display apparatus 100-2 performs light adjustment in accordance with the light adjusting control information, and thus the projection video display apparatus 100-1 and the projection video display apparatus 100-2 can use a light adjusting value in common. Accordingly, quality of a joint of projected videos of these apparatuses can be enhanced in the multi-screen projection mode.

<<Projection Video Display Apparatus Serving as Master in Modification Example 2>>

Figure 20:
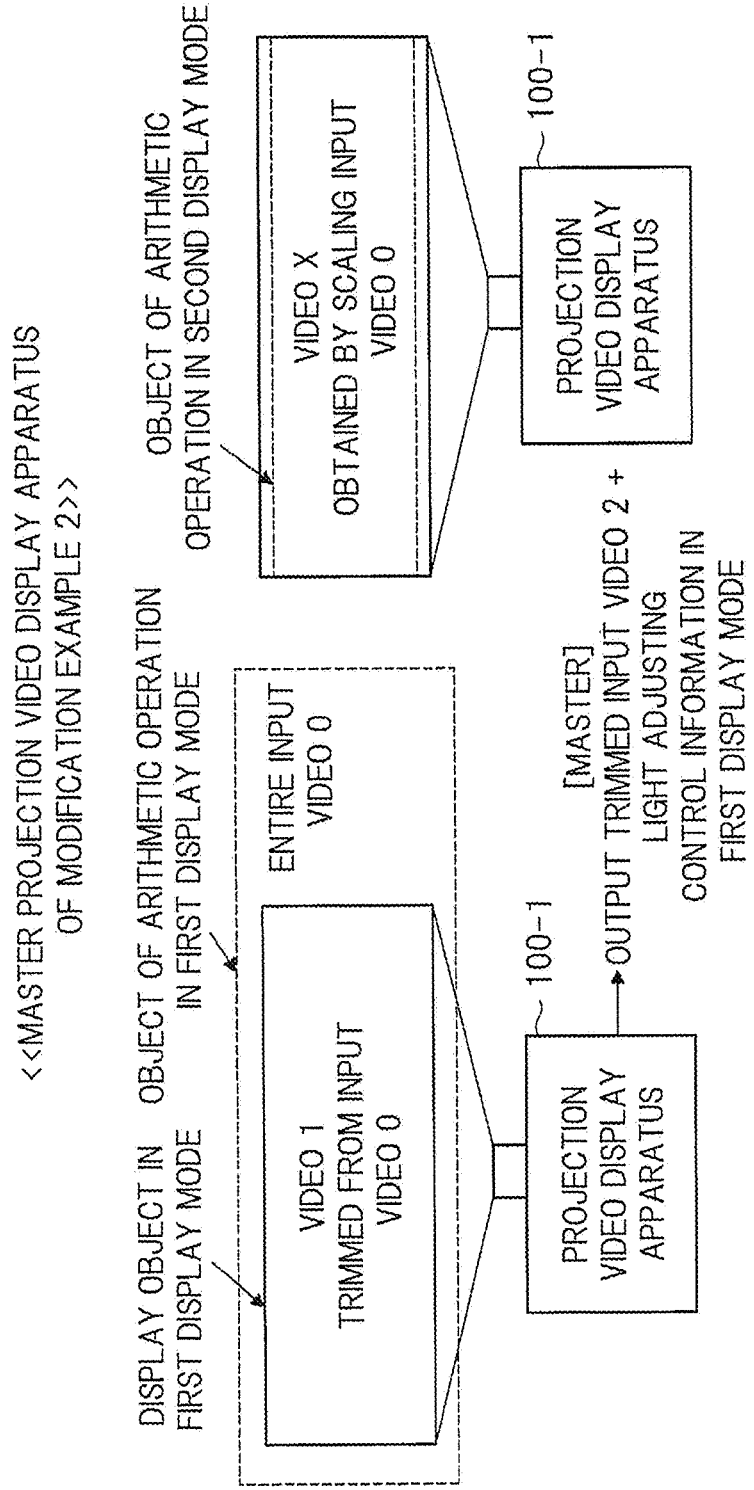
FIG. 20 is a view for describing a projection video display apparatus serving as a master in the modification example 2 in one embodiment of the present invention.

A projection video display apparatus serving as a master in the modification example 2 will be described with reference to FIG. 20. FIG. 20 is a view for describing the projection video display apparatus serving as a master in the modification example 2.

As shown in FIG. 20, the projection video display apparatus 100-1 serving as a master in the modification example 2 has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a first display mode (multi-screen projection mode) where a video 1 trimmed from the input video 0 which is input to the projection video display apparatus 100-1 is displayed while changing the light adjusting amount in accordance with an arithmetic operation applied to the input video 0.

Further, in the first display mode, light adjusting control information, which is calculated in accordance with the arithmetic operation applied to the input video 0 and is capable of controlling a variable light adjusting function of the projection video display apparatus 100-2 in units of one frame of a projected video, and a video 2, which differs from the video 1 and is trimmed from the input video 0, are output to the projection video display apparatus 100-2 serving as a slave.

Further, the plurality of display modes using the variable light adjusting function include a second display mode (single display mode) where a video X obtained by scaling the input video 0 input to the projection video display apparatus 100-1 is displayed while changing the light adjusting amount in accordance with an arithmetic operation applied to the input video 0 or the video X obtained by scaling the input video 0.

Figure 21:
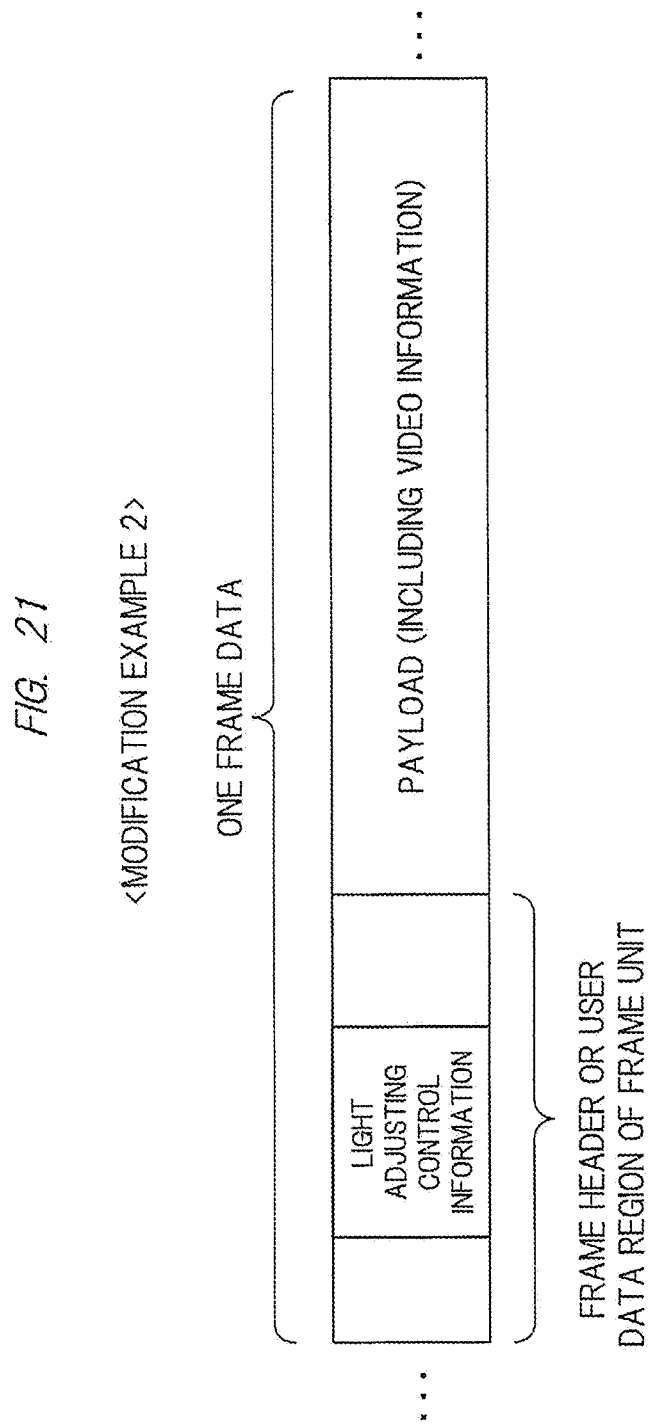
FIG. 21 is a view for describing one example of a data format in one embodiment of the present invention.

As in the case of the projection video display apparatus 100-1 serving as a master according to the modification example 2, transmission processing of the video 2 and the light adjusting control information to the projection video display apparatus 100-2 serving as a slave can be realized by, for example, transmitting data with a data format shown in FIG. 21 in the interface 190 which is an integrated interface of the video signal input unit/output unit 131 and the communication unit 132. FIG. 21 is a view for describing one example of the data format.

As shown in FIG. 21, the data format includes a frame header or a user data region of a frame unit and a payload region in one frame data. Information of a video is contained in the payload region, and light adjusting control information is contained in the frame header or the user data region of a frame unit. By performing the transmission with the data format like this, light adjusting control in units of frame can be realized in a projection video display apparatus as a transmission destination. The data format may be applied to a case where both the video data and the light adjusting control information are transmitted together in any of the basic example and a plurality of other modification examples of this embodiment.

<<Projection Video Display Apparatus Serving as Slave in Modification Example 2>>

Figure 22:
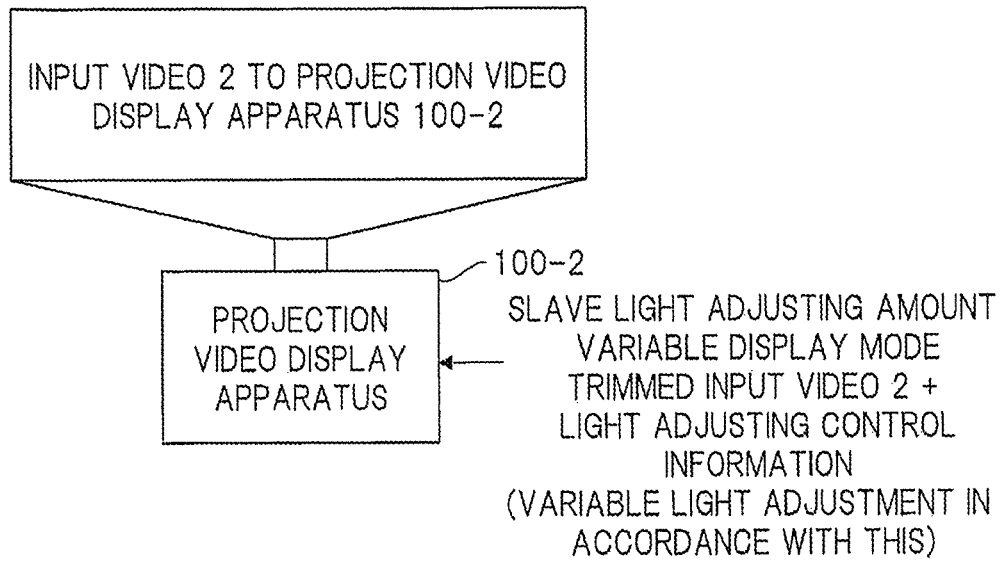
FIG. 22 is a view for describing a projection video display apparatus serving as a slave in the modification example 2 in one embodiment of the present invention.

A projection video display apparatus serving as a slave in the modification example 2 will be described with reference to FIG. 22. FIG. 22 is a view for describing the projection video display apparatus serving as a slave in the modification example 2.

As shown in FIG. 22, the projection video display apparatus 100-2 serving as a slave in the modification example 2 has substantially the same configuration as the projection video display apparatus 100-2 in the basic example mentioned above, and realizes a variable light adjusting function in accordance with light adjusting control information instead of realizing the variable light adjustment using a light adjusting value calculated by an arithmetic operation from an input video. The display mode using such a variable light adjusting function (slave light adjusting amount variable display mode) is the first display mode (multi-screen projection mode) where an input video 2 which is an input video trimmed from the input video 0 is displayed while changing the light adjusting amount in accordance with the light adjusting control information output from the projection video display apparatus 100-1 serving as a master and input to the projection video display apparatus 100-2 serving as a slave.

<<Projection Video Display Apparatus Serving as Master and Slave in Modification Example 2>>

A projection video display apparatus serving as a master and a slave in the modification example 2 is a projection video display apparatus which has both the function of the projection video display apparatus 100-1 serving as a master and the function of the projection video display apparatus 100-2 serving as a slave described above, and is capable of switching such functions. Further, the projection video display apparatus serving as a master and a slave in the modification example 2 has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a first display mode (multi-screen projection mode) where a video 1 trimmed from the input video 0 which is input to the projection video display apparatus is displayed while changing the light adjusting amount in accordance with an arithmetic operation applied to the input video 0.

Further, the plurality of display modes using the variable light adjusting function include a third display mode (multi-screen projection mode) where an input video 2 input to the projection video display apparatus is displayed while changing the light adjusting amount in accordance with light adjusting control information, which is input to the projection video display apparatus and is capable of controlling a variable light adjusting function in units of one frame of a projected video.

In the projection video display apparatus serving as a master and a slave in the modification example 2, a multi-screen projection mode as the first display mode is referred to as a master mode, and a multi-screen projection mode as the third display mode is referred to as a slave mode. Namely, plural kinds of multi-screen projection modes are provided.

<<Menu Screen in Modification Example 2>>

Figure 23:
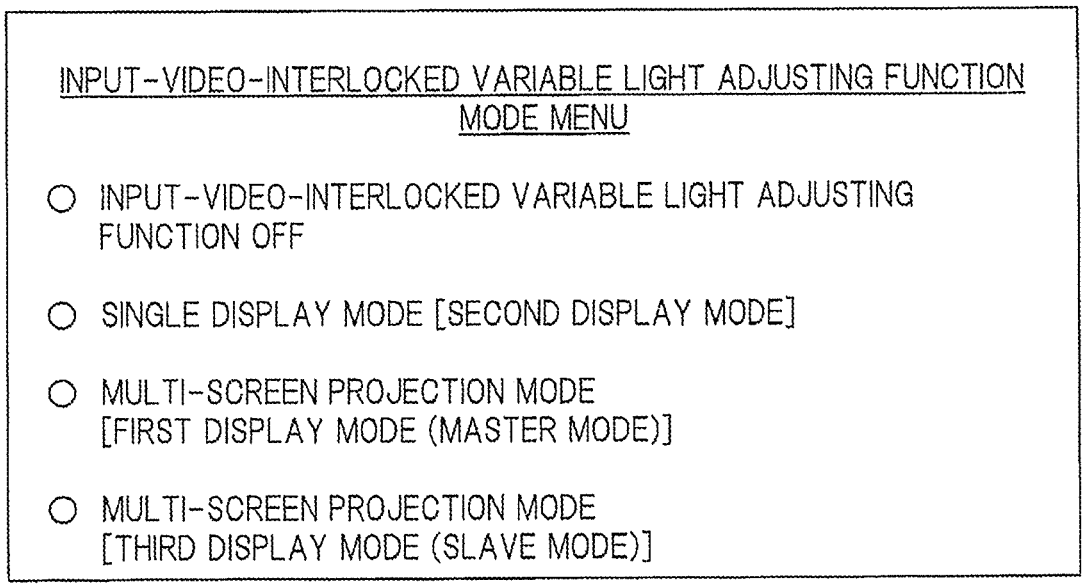
FIG. 23 is a view for describing a menu screen in the modification example 2 in one embodiment of the present invention.

A menu screen in the modification example 2 will be described with reference to FIG. 23. FIG. 23 is a view for describing a menu screen in the modification example 2. FIG. 23 shows an example of the projection video display apparatus serving as a master and a slave.

As shown in FIG. 23, an input-video-interlocked variable light adjusting function mode menu as the menu screen in the modification example 2 includes the multi-screen projection mode (master mode) as the first display mode, the multi-screen projection mode (slave mode) as the third display mode, and a single display mode as the second display mode. The input-video-interlocked variable light adjusting function mode menu further includes a mode for turning off the input-video-interlocked variable light adjusting function.

Accordingly, the projection video display apparatus serving as a master and a slave in the modification example 2 is provided with plural kinds of multi-screen projection modes including the master mode which is the multi-screen projection mode as the first display mode and the slave mode which is the multi-screen projection mode as the third display mode.

<<Connection Example of n Sets of Projection Video Display Apparatuses in Modification Example 2>>

A connection example of n sets of projection video display apparatuses in the modification example 2 will be described with reference to FIG. 24. FIG. 24 is a view for describing the connection example of n sets of projection video display apparatuses in the modification example 2.

As shown in FIG. 24, in an example where n sets of projection video display apparatuses 100-1, 100-2, . . . , and 100-n and the information processing apparatus 300a are connected to each other, the first projection video display apparatus 100-1 is defined as a master, and the other projection video display apparatuses 100-2 to 100-n are defined as slaves.

The information processing apparatus 300a outputs an input video 0 to the projection video display apparatus 100-1 serving as a master. The projection video display apparatus 100-1 serving as a master receives the input video 0 as an input, designates trimming for videos 1 and 2 to n, and outputs the videos 2 to n to the projection video display apparatuses 100-2 to 100-n serving as slaves and further outputs the light adjusting control information calculated by an arithmetic operation based on the input video 0 and the like to the projection video display apparatuses 100-2 to 100-n. Then, the projection video display apparatus 100-1 serving as a master and the projection video display apparatuses 100-2 to 100-n serving as slaves display the videos 1 and 2 to n, respectively.

In this manner, at the time of performing the multi-screen projection using the projection video display apparatus 100-1 serving as a master and the projection video display apparatuses 100-2 to 100-n serving as slaves, it is possible to improve quality of joints between the videos 1, 2, . . . , and n displayed by the respective projection video display apparatuses 100-1, 100-2, . . . , and 100-n.

As described above, in the modification example 2, by performing processing on the side of the plurality of projection video display apparatuses according to this example, the light adjusting value which can be used in common among the plurality of projection video display apparatuses can be calculated, and the variable light adjusting function using such a common light adjusting value can be realized. Accordingly, in the modification example 2, it is unnecessary to provide a function of generating light adjusting control information to the information processing apparatus 300a, and a simple video outputting apparatus may be used as the information processing apparatus 300a. Further, since it is sufficient if the information processing apparatus 300a is connected to only the projection video display apparatus serving as a master, even when a video output unit of the information processing apparatus 300a has only one system, the above-mentioned advantageous effects can be acquired. Namely, in the modification example 2, even when the information processing apparatus 300a is a simple video outputting apparatus and the video output unit of the information processing apparatus 300a has only one system, it is possible to realize the improvement of quality of joints of projected videos in the multi-screen projection mode.

In addition, since trimming of videos of the respective projection video display apparatuses is performed by the master projection video display apparatus in the modification example 2, it is unnecessary for the slave projection video display apparatuses to perform the trimming processing.

Modification Example 3

A modification example 3 will be described with reference to FIG. 25 to FIG. 30. FIG. 25 is a view for describing the configuration of the modification example 3.

As shown in FIG. 25, as the configuration of the modification example 3, an example where the projection video display apparatuses 100-1 and 100-2 as a plurality of projection video display apparatuses and the information processing apparatus 300a as external equipment are provided will be described.

The first projection video display apparatus 100-1 is defined as a master, and another projection video display apparatus 100-2 is defined as a slave. The information processing apparatus 300a outputs an input video 0 (video including the entire display video in the multi-screen projection) to the projection video display apparatus 100-1 serving as a master.

The projection video display apparatus 100-1 serving as a master receives an input video 0 as an input, designates trimming for a video 1, and outputs the input video 0 to the projection video display apparatus 100-2 serving as a slave and further outputs light adjusting control information calculated by an arithmetic operation (average brightness, histogram, maximum brightness) or the like based on the input video 0 to the projection video display apparatus 100-2. The light adjusting control information is light adjusting control information capable of controlling a variable light adjusting function of the projection video display apparatus 100-2 in units of one frame of a projected video so as to make alight adjusting state of the projection video display apparatus 100-2 approach a light adjusting state of the projection video display apparatus 100-1. At this time, the projection video display apparatus 100-2 performs light adjustment in accordance with the light adjusting control information, and thus the projection video display apparatus 100-1 and the projection video display apparatus 100-2 can use a light adjusting value in common. Accordingly, quality of a joint of projected videos of these apparatuses can be enhanced in the multi-screen projection mode. Further, the projection video display apparatus 100-2 performs trimming to the video 2 from the input video 0 output from the projection video display apparatus 100-1.

<<Projection Video Display Apparatus Serving as Master in Modification Example 3>>

A projection video display apparatus serving as a master in the modification example 3 will be described with reference to FIG. 26. FIG. 26 is a view for describing the projection video display apparatus serving as a master in the modification example 3.

As shown in FIG. 26, the projection video display apparatus 100-1 serving as a master in the modification example 3 has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a first display mode (multi-screen projection mode) where a video 1 trimmed from the input video 0 which is input to the projection video display apparatus 100-1 is displayed while changing the light adjusting amount in accordance with an arithmetic operation applied to the input video 0.

Further, in the first display mode, light adjusting control information, which is calculated in accordance with the arithmetic operation applied to the input video 0 and is capable of controlling a variable light adjusting function of the projection video display apparatus 100-2 in units of one frame of a projected video, and the video 1 are output to the projection video display apparatus 100-2 serving as a slave.

Further, the plurality of display modes using the variable light adjusting function include a second display mode (single display mode) where a video X obtained by scaling the input video 0 input to the projection video display apparatus 100-1 is displayed while changing the light adjusting amount in accordance with an arithmetic operation applied to the input video 0 or the video X obtained by scaling the input video 0.

<<Projection Video Display Apparatus Serving as Slave in Modification Example 3>>

A projection video display apparatus serving as a slave in the modification example 3 will be described with reference to FIG. 27. FIG. 27 is a view for describing the projection video display apparatus serving as a slave in the modification example 3.

As shown in FIG. 27, the projection video display apparatus 100-2 serving as a slave in the modification example 3 has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a display mode (multi-screen projection mode) where a video 2 generated by trimming the input video 0 input to the projection video display apparatus 100-2 serving as a slave is displayed while changing the light adjusting amount based on light adjusting control information, which is input to the projection video display apparatus 100-2 serving as a slave and is capable of controlling the variable light adjusting function in units of one frame of a projected video.

<<Projection Video Display Apparatus Serving as Master and Slave in Modification Example 3>>

A projection video display apparatus serving as a master and a slave in the modification example 3 is a projection video display apparatus which has both the function of the projection video display apparatus 100-1 serving as a master and the function of the projection video display apparatus 100-2 serving as a slave described above, has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a first display mode (multi-screen projection mode=master mode) where a video 1 trimmed from the input video 0 which is input to the projection video display apparatus is displayed while changing the light adjusting amount in accordance with an arithmetic operation applied to the input video 0.

Further, the plurality of display modes using the variable light adjusting function include a third display mode (multi-screen projection mode=slave mode) where a video 2 obtained by trimming the video 0 input to the projection video display apparatus is displayed while changing the light adjusting amount based on light adjusting control information, which is input to the projection video display apparatus and is capable of controlling a variable light adjusting function in units of one frame of a projected video.

<<Menu Screen in Modification Example 3>>

A menu screen in the modification example 3 will be described with reference to FIG. 28. FIG. 28 is a view for describing a menu screen in the modification example 3. FIG. 28 shows an example of the projection video display apparatus serving as a master and a slave.

As shown in FIG. 28, an input-video-interlocked variable light adjusting function mode menu as the menu screen in the modification example 3 includes the multi-screen projection mode (master mode) as the first display mode, the multi-screen projection mode (slave mode) as the third display mode, and a single display mode as the second display mode. The input-video-interlocked variable light adjusting function mode menu further includes a mode for turning off the input-video-interlocked variable light adjusting function.

<<Connection Example 1 of n Sets of Projection Video Display Apparatuses in Modification Example 3>>

A connection example 1 of n sets of projection video display apparatuses in the modification example 3 will be described with reference to FIG. 29. FIG. 29 is a view for describing the connection example 1 of n sets of projection video display apparatuses in the modification example 3.

As shown in FIG. 29, in an example where n sets of projection video display apparatuses 100-1, 100-2, . . . , and 100-n and the information processing apparatus 300a are connected to each other, the first projection video display apparatus 100-1 is defined as a master, and the other projection video display apparatuses 100-2 to 100-n are defined as slaves.

The information processing apparatus 300a outputs an input video 0 to the projection video display apparatus 100-1 serving as a master. The projection video display apparatus 100-1 serving as a master receives the input video 0 as an input, designates trimming for a video 1, and outputs the input video 0 to the projection video display apparatuses 100-2 to 100-n serving as slaves and further outputs the light adjusting control information calculated by an arithmetic operation based on the input video 0 and the like to the projection video display apparatuses 100-2 to 100-n. Then, the projection video display apparatus 100-1 serving as a master and the projection video display apparatuses 100-2 to 100-n serving as slaves display the videos 1 and 2 to n, respectively.

In this manner, at the time of performing the multi-screen projection using the projection video display apparatus 100-1 serving as a master and the projection video display apparatuses 100-2 to 100-n serving as slaves, it is possible to improve quality of joints between the videos 1, 2, . . . , and n displayed by the respective projection video display apparatuses 100-1, 100-2, . . . , and 100-n.

<<Connection Example 2 of n Sets of Projection Video Display Apparatuses (Daisy Chain) in Modification Example 3>>

A connection example 2 of n sets of projection video display apparatuses (daisy chain) in the modification example 3 will be described with reference to FIG. 30. FIG. 30 is a view for describing the connection example 2 of n sets of projection video display apparatuses (daisy chain) in the modification example 3.

As shown in FIG. 30, in an example where n sets of projection video display apparatuses 100-1, 100-2, . . . , and 100-$n$ and the information processing apparatus 300$a$ are connected to each other, the first projection video display apparatus 100-1 is defined as a master, and the other projection video display apparatuses 100-2 to 100-$n$ are defined as slaves.

The information processing apparatus 300$a$ outputs an input video 0 to the projection video display apparatus 100-1 serving as a master. The projection video display apparatus 100-1 serving as a master receives the input video 0 as an input, designates trimming for a video 1, and outputs the input video 0 to the projection video display apparatus 100-2 serving as a slave and further outputs the light adjusting control information calculated by an arithmetic operation based on the input video 0 and the like to the projection video display apparatus 100-2. Subsequently, the projection video display apparatus 100-2 serving as a slave outputs the input video 0 and the light adjusting control information to the projection video display apparatus 100-3 serving as a slave, . . . , and the projection video display apparatus 100-$(n-1)$ serving as a slave outputs the input video 0 and the light adjusting control information to the projection video display apparatus 100-$n$ serving as a slave. Then, the projection video display apparatus 100-1 serving as a master and the projection video display apparatuses 100-2 to 100-$n$ serving as slaves display the videos 1 and 2 to n, respectively.

In this manner, at the time of performing the multi-screen projection using the projection video display apparatus 100-1 serving as a master and the projection video display apparatuses 100-2 to 100-$n$ serving as slaves, it is possible to improve quality of joints between the videos 1, 2, . . . , and n displayed by the respective projection video display apparatuses 100-1, 100-2, . . . , and 100-$n$.

As described above, in the modification example 3, by performing processing on the side of the plurality of projection video display apparatuses according to this example, the light adjusting value which can be used in common among the plurality of projection video display apparatuses can be calculated, and the variable light adjusting function using such a common light adjusting value can be realized. Accordingly, in the modification example 3, it is unnecessary to provide a function of generating light adjusting control information to the information processing apparatus 300$a$, and a simple video outputting apparatus may be used as the information processing apparatus 300$a$. Further, since it is sufficient if the information processing apparatus 300$a$ is connected to only the projection video display apparatus serving as a master, even when a video output unit of the information processing apparatus 300$a$ has only one system, the above-mentioned advantageous effects can be acquired. Namely, in the modification example 3, even when the information processing apparatus 300$a$ is a simple video outputting apparatus and the video output unit of the information processing apparatus 300$a$ has only one system, it is possible to realize the improvement of quality of joints of projected videos in the multi-screen projection mode.

Further, in the modification example 3, each of the projection video display apparatuses outputs the input video 0 as it is, and trimming of the video is performed in the respective latter projection video display apparatuses, and thus trimming processing for the latter slave projection video display apparatuses becomes unnecessary in the master projection video display apparatus. Further, the above-mentioned advantageous effect can be acquired even in the case of the daisy chain connection.

Modification Example 4

A modification example 4 will be described with reference to FIG. 31 to FIG. 36. FIG. 31 is a view for describing the configuration of the modification example 4.

As shown in FIG. 31, as the configuration of the modification example 4, an example where the projection video display apparatuses 100-1 and 100-2 as a plurality of projection video display apparatuses and the information processing apparatus 300$a$ as external equipment are provided will be described.

The first projection video display apparatus 100-1 is defined as a master, and another projection video display apparatus 100-2 is defined as a slave. The information processing apparatus 300$a$ outputs an input video 0 (video including the entire display video in the multi-screen projection) to the projection video display apparatus 100-1 serving as a master.

The projection video display apparatus 100-1 serving as a master receives the input video 0 as an input, designates trimming for a video 1 and a video 2, and outputs the input video 0 to the projection video display apparatus 100-2 serving as a slave and further outputs trimming range designation information 2 which is information for designating a trimming range of the video 2 and light adjusting control information calculated by an arithmetic operation (average brightness, histogram, maximum brightness) or the like based on the input video 0 to the projection video display apparatus 100-2. The light adjusting control information is light adjusting control information capable of controlling a variable light adjusting function of the projection video display apparatus 100-2 in units of one frame of a projected video so as to make a light adjusting state of the projection video display apparatus 100-2 approach a light adjusting state of the projection video display apparatus 100-1. At this time, the projection video display apparatus 100-2 performs light adjustment in accordance with the light adjusting control information, and thus the projection video display apparatus 100-1 and the projection video display apparatus 100-2 can use a light adjusting value in common. Accordingly, quality of a joint of projected videos of these apparatuses can be enhanced in the multi-screen projection mode.

<<Projection Video Display Apparatus Serving as Master in Modification Example 4>>

Figure 32:
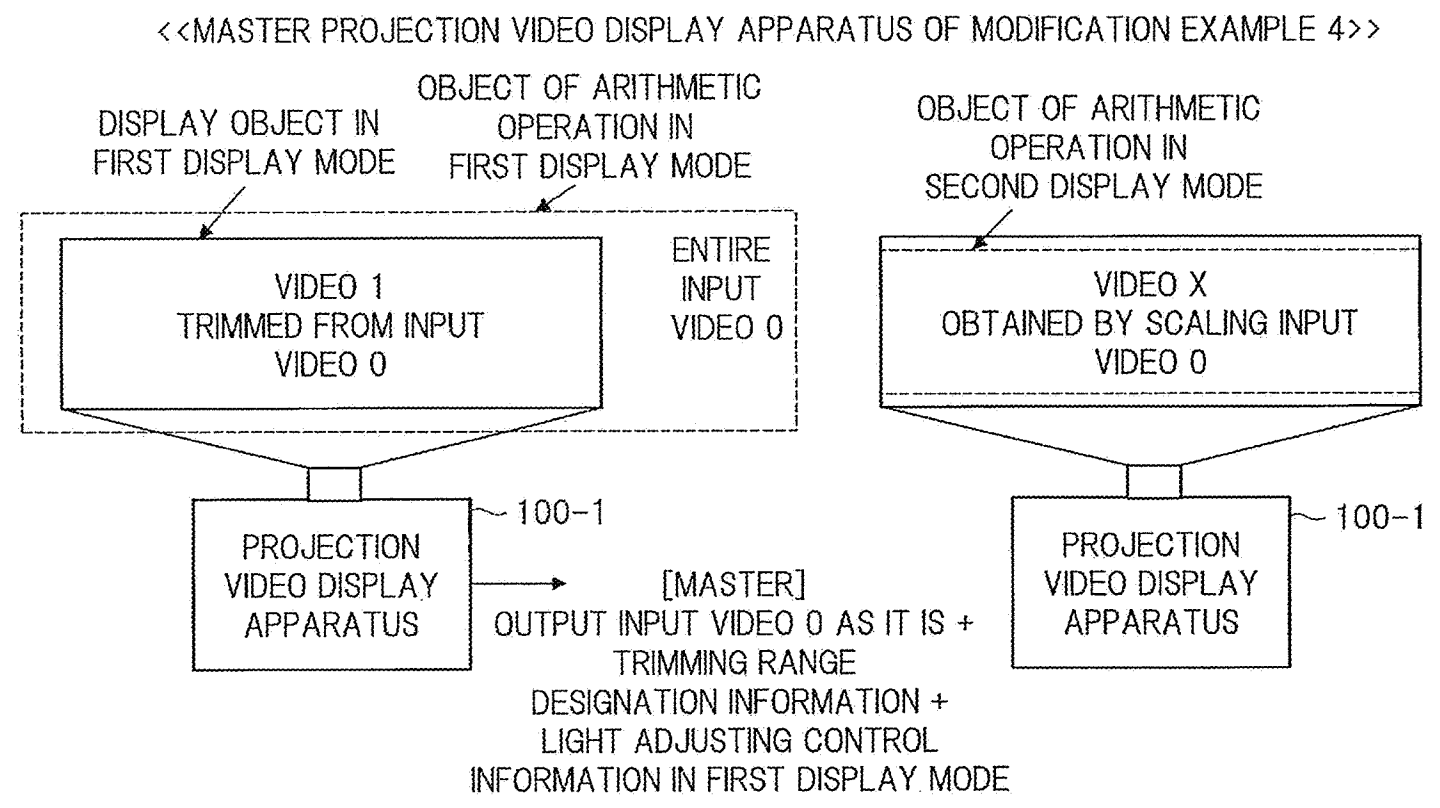

A projection video display apparatus serving as a master in the modification example 4 will be described with reference to FIG. 32. FIG. 32 is a view for describing the projection video display apparatus serving as a master in the modification example 4.

As shown in FIG. 32, the projection video display apparatus 100-1 serving as a master in the modification example 4 has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a first display mode (multi-screen projection mode) where a video 1 trimmed from the input video 0 which is input to the projection video display apparatus 100-1 is displayed while changing the light adjusting amount in accordance with an arithmetic operation applied to the input video 0.

Further, in the first display mode, light adjusting control information, which is calculated in accordance with the arithmetic operation applied to the input video 0 and is capable of controlling a variable light adjusting function of the projection video display apparatus 100-2 in units of one frame of a projected video, the input video 0, and trimming range designation information for trimming the input video 0 are output to the projection video display apparatus 100-2 serving as a slave. At this time, in the projection video display apparatus 100-1 serving as a master, in accordance with an operation input to be input to the operation input unit 107, a trimming range where a video trimmed from the input video 0 is displayed can be set for each of the video 1 to be displayed by the projection video display apparatus 100-1 serving as a master and the video 2 to be displayed by the projection video display apparatus 100-2 serving as a slave. Then, trimming range designation information which is information relating to a trimming range of the video 2 to be displayed by the projection video display apparatus 100-2 serving as a slave is output.

Further, the plurality of display modes using the variable light adjusting function include a second display mode (single display mode) where a video X obtained by scaling the input video 0 input to the projection video display apparatus 100-1 is displayed while changing the light adjusting amount in accordance with an arithmetic operation applied to the input video 0 or the video X obtained by scaling the input video 0.

<<Projection Video Display Apparatus Serving as Slave in Modification Example 4>>

Figure 33:
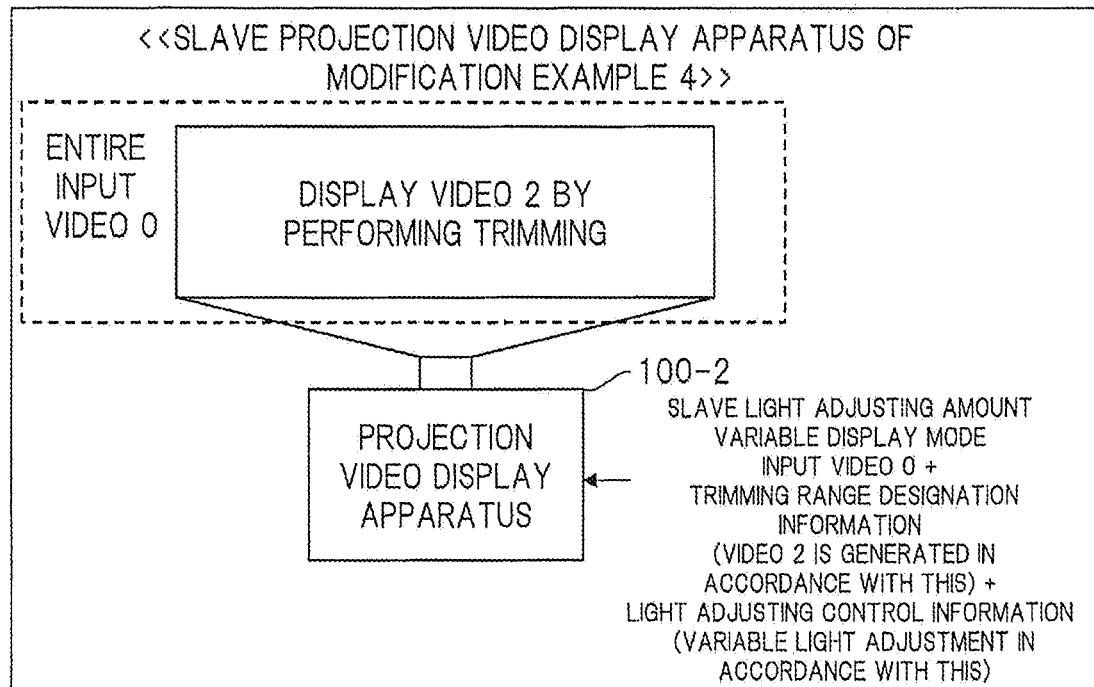
FIG. 33 is a view for describing a projection video display apparatus serving as a slave in the modification example 4 in one embodiment of the present invention.

A projection video display apparatus serving as a slave in the modification example 4 will be described with reference to FIG. 33. FIG. 33 is a view for describing the projection video display apparatus serving as a slave in the modification example 4.

As shown in FIG. 33, the projection video display apparatus 100-2 serving as a slave in the modification example 4 has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a display mode (multi-screen projection mode) where a video 2 obtained by trimming the input video 0 input to the projection video display apparatus 100-2 serving as a slave by using trimming range designation information input to the projection video display apparatus 100-2 is displayed while changing the light adjusting amount based on light adjusting control information, which is input to the projection video display apparatus 100-2 serving as a slave and is capable of controlling the variable light adjusting function in units of one frame of a projected video.

<<Projection Video Display Apparatus Serving as Master and Slave in Modification Example 4>>

A projection video display apparatus serving as a master and a slave in the modification example 4 is a projection video display apparatus which has both the function of the projection video display apparatus 100-1 serving as a master and the function of the projection video display apparatus 100-2 serving as a slave described above, has a variable light adjusting function (lamp light adjusting function, variable iris function) and is provided with a plurality of display modes using the variable light adjusting function, and one display mode of the plurality of display modes can be selected from a menu screen.

Also, the plurality of display modes using the variable light adjusting function include a first display mode (multi-screen projection mode=master mode) where a video 1 trimmed from the input video 0 which is input to the projection video display apparatus is displayed while changing the light adjusting amount in accordance with an arithmetic operation applied to the input video 0.

Further, the plurality of display modes using the variable light adjusting function include a third display mode (multi-screen projection mode=slave mode) where a video 2 obtained by trimming the video 0 input to the projection video display apparatus by using the trimming range designation information input to the projection video display apparatus is displayed while changing the light adjusting amount based on light adjusting control information, which is input to the projection video display apparatus and is capable of controlling a variable light adjusting function in units of one frame of a projected video.

<<Menu Screen in Modification Example 4>>

Figure 34:
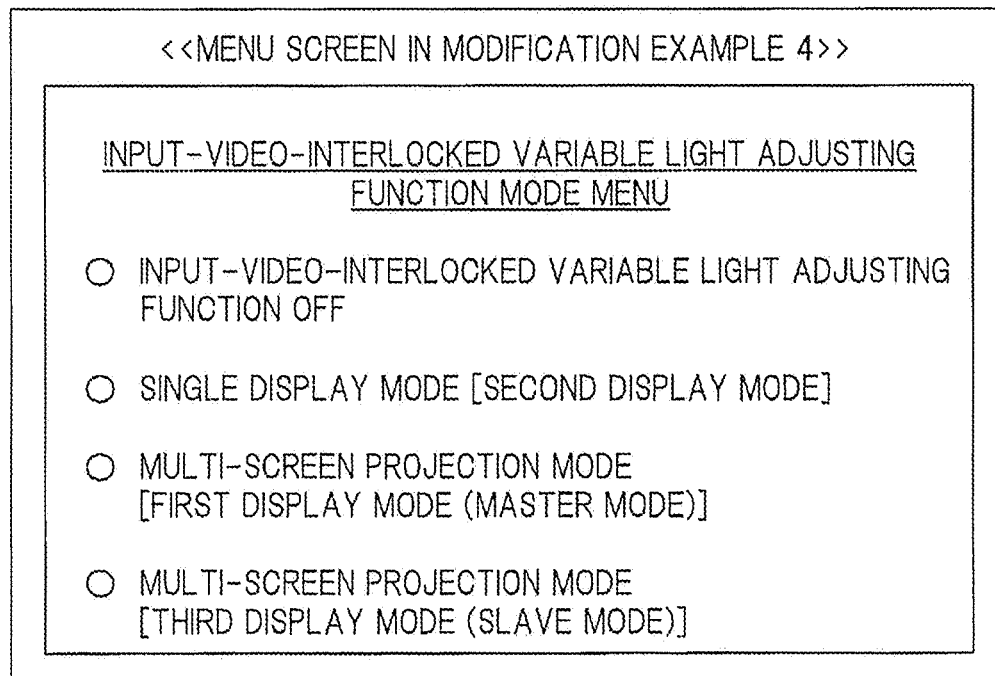
FIG. 34 is a view for describing a menu screen in the modification example 4 in one embodiment of the present invention.

A menu screen in the modification example 4 will be described with reference to FIG. 34. FIG. 34 is a view for describing a menu screen in the modification example 4. FIG. 34 shows an example of the projection video display apparatus serving as a master and a slave.

As shown in FIG. 34, an input-video-interlocked variable light adjusting function mode menu as the menu screen in the modification example 4 includes the multi-screen projection mode (master mode) as the first display mode, the multi-screen projection mode (slave mode) as the third display mode, and a single display mode as the second display mode. The input-video-interlocked variable light adjusting function mode menu further includes a mode for turning off the input-video-interlocked variable light adjusting function.

<<Connection Example 1 of n Sets of Projection Video Display Apparatuses in Modification Example 4>>

Figure 35:
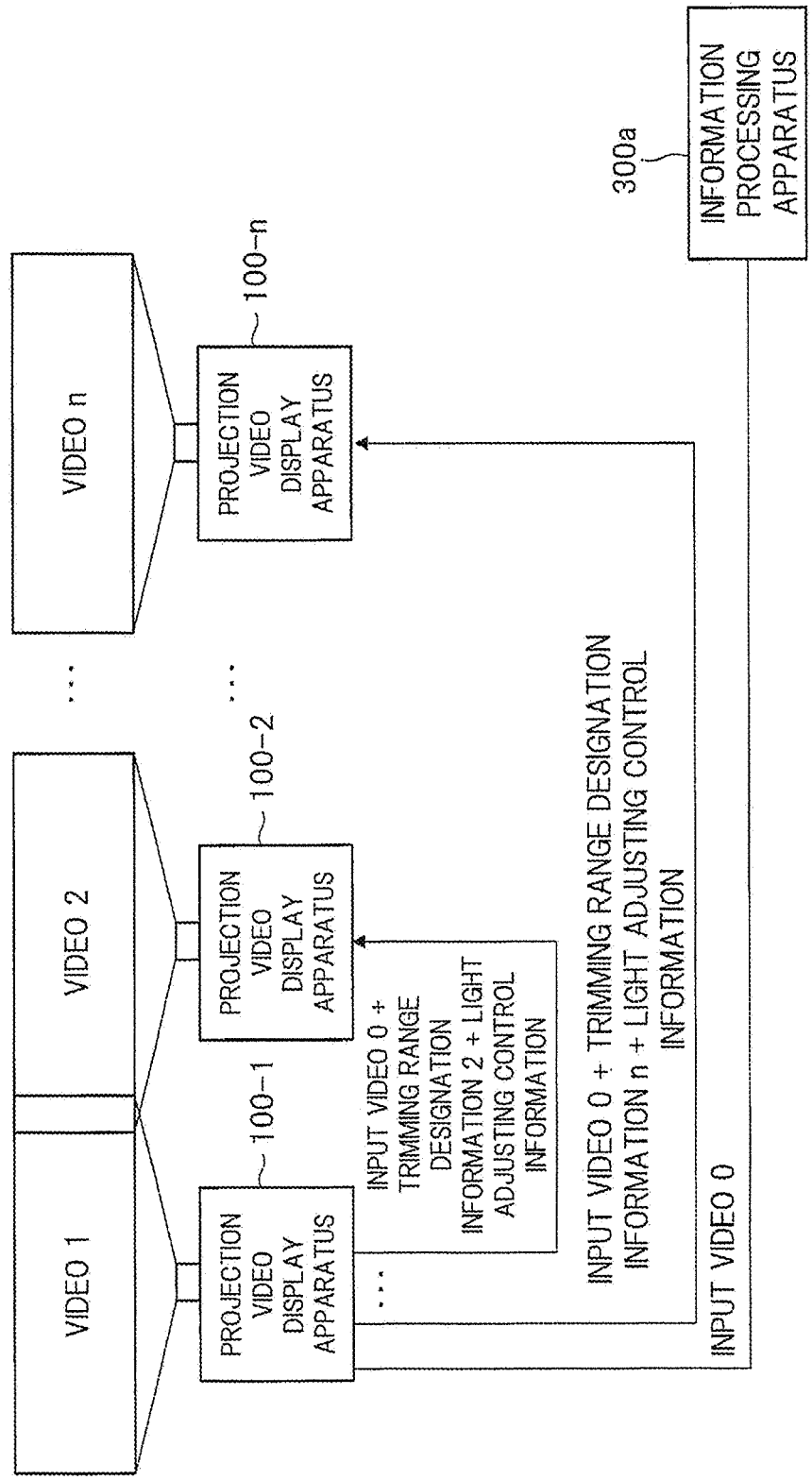
FIG. 35 is a view for describing a connection example 1 where n sets of projection video display apparatuses are connected to each other in the modification example 4 in one embodiment of the present invention.

A connection example 1 of n sets of projection video display apparatuses in the modification example 4 will be described with reference to FIG. 35. FIG. 35 is a view for describing the connection example 1 of n sets of projection video display apparatuses in the modification example 4.

As shown in FIG. 35, in an example where n sets of projection video display apparatuses 100-1, 100-2, . . . , and 100-*n* and the information processing apparatus 300*a* are connected to each other, the first projection video display apparatus 100-1 is defined as a master, and the other projection video display apparatuses 100-2 to 100-*n* are defined as slaves.

The information processing apparatus 300*a* outputs an input video 0 to the projection video display apparatus 100-1 serving as a master. The projection video display apparatus 100-1 serving as a master receives the input video 0 as an input, designates trimming for videos 1 and 2 to n in accordance with an operation input to be input to the operation input unit 107, and outputs the input video 0 to the projection video display apparatuses 100-2 to 100-*n* serving as slaves and further outputs trimming range designation information 2 to n which designates trimming ranges of the videos 2 to n and light adjusting control information calculated by an arithmetic operation based on the input video 0 and the like to the projection video display apparatuses 100-2 to 100-*n*. Then, the projection video display apparatus 100-1 serving as a master and the projection video display apparatuses 100-2 to 100-*n* serving as slaves display the videos 1 and 2 to n, respectively.

In this manner, at the time of performing the multi-screen projection using the projection video display apparatus 100-1 serving as a master and the projection video display apparatuses 100-2 to 100-*n* serving as slaves, it is possible to improve quality of joints between the videos 1, 2, . . . , and n displayed by the respective projection video display apparatuses 100-1, 100-2, . . . , and 100-*n*.

<<Connection Example 2 of n Sets of Projection Video Display Apparatuses (Daisy Chain) in Modification Example 4>>

Figure 36:
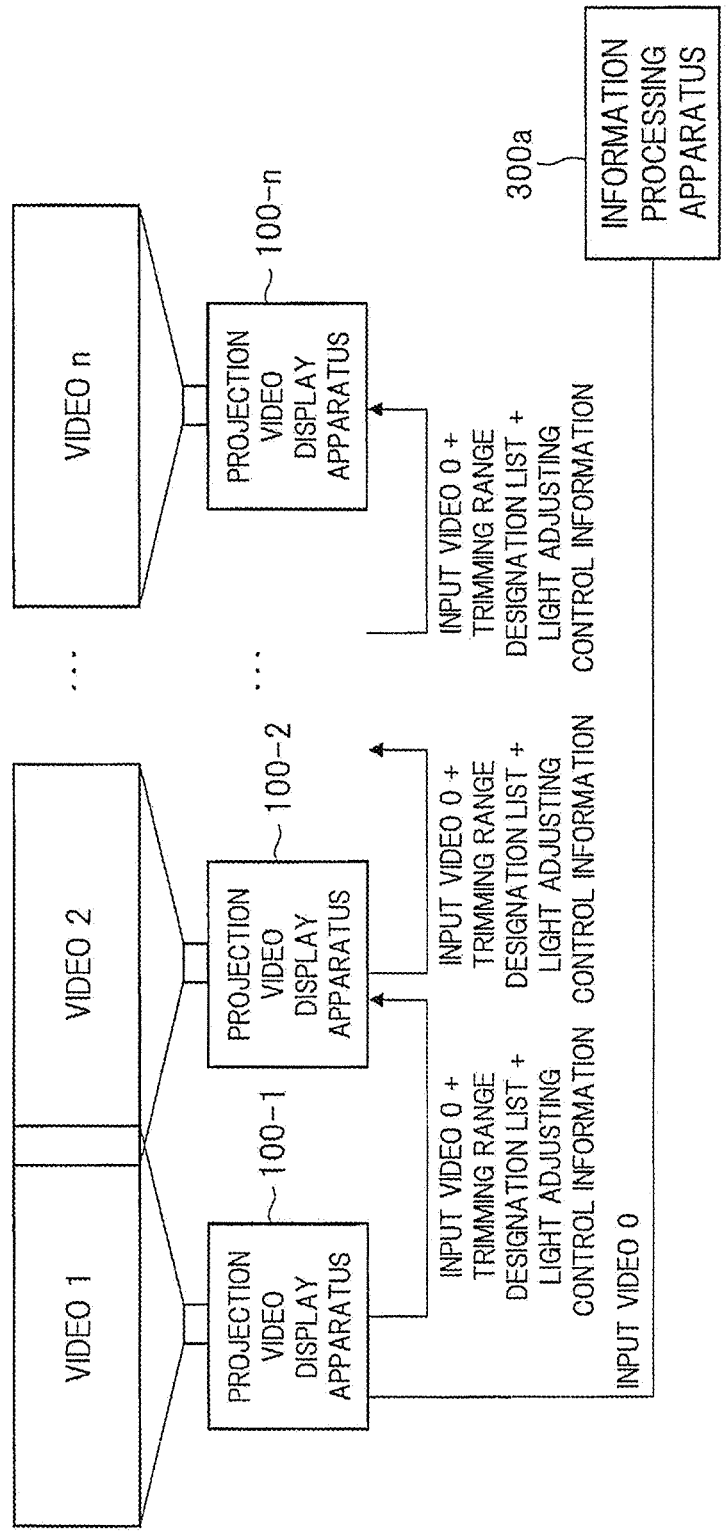
FIG. 36 is a view for describing a connection example 2 (daisy chain) where n sets of projection video display apparatuses are connected to each other in the modification example 4 in one embodiment of the present invention.

A connection example 2 of n sets of projection video display apparatuses (daisy chain) in the modification example 4 will be described with reference to FIG. 36. FIG. 36 is a view for describing the connection example 2 of n sets of projection video display apparatuses (daisy chain) in the modification example 4.

As shown in FIG. 36, in an example where n sets of projection video display apparatuses 100-1, 100-2, . . . , and 100-*n* and the information processing apparatus 300*a* are connected to each other, the first projection video display apparatus 100-1 is defined as a master, and the other projection video display apparatuses 100-2 to 100-*n* are defined as slaves.

The information processing apparatus 300*a* outputs an input video 0 to the projection video display apparatus 100-1 serving as a master. The projection video display apparatus 100-1 serving as a master receives the input video 0 as an input, designates trimming for videos 1 to n in accordance with the operation input to be input to the operation input unit 107, and outputs the input video 0 to the projection video display apparatus 100-2 serving as a slave and further outputs a trimming range designation list which is a list of information for designating trimming ranges of the videos 2 to n other than the video 1 and the light adjusting control information calculated by an arithmetic operation based on the input video 0 and the like to the projection video display apparatus 100-2. Namely, the trimming range designation list is a list which contains a series of information including the trimming range designation information for designating trimming ranges of the videos 2 to n in the plural sets of projection video display apparatuses 100-2 to 100-*n* serving as slaves, and it is possible to use the respective corresponding trimming range designation information at the time of performing the trimming processing in the respective projection video display apparatuses. Subsequently, the projection video display apparatus 100-2 serving as a slave outputs the input video 0, the trimming range designation list and the light adjusting control information to the projection video display apparatus 100-3 serving as a slave, . . . , and the projection video display apparatus 100-(*n*−1) serving as a slave outputs the input video 0, the trimming range designation list and the light adjusting control information to the projection video display apparatus 100-*n* serving as a slave. Then, the projection video display apparatus 100-1 serving as a master and the projection video display apparatuses 100-2 to 100-*n* serving as slaves display the videos 1 and 2 to n, respectively.

In this manner, at the time of performing the multi-screen projection using the projection video display apparatus 100-1 serving as a master and the projection video display apparatuses 100-2 to 100-*n* serving as slaves, it is possible to improve quality of joints between the videos 1, 2, . . . , and n displayed by the respective projection video display apparatuses 100-1, 100-2, . . . , and 100-*n*.

As described above, in the modification example 4, by performing processing on the side of the plurality of projection video display apparatuses according to this example, the light adjusting value which can be used in common among the plurality of projection video display apparatuses can be calculated, and the variable light adjusting function using such a common light adjusting value can be realized. Accordingly, in the modification example 4, it is unnecessary to provide a function of generating light adjusting control information to the information processing apparatus 300*a*, and a simple video outputting apparatus may be used as the information processing apparatus 300*a*. Further, since it is sufficient if the information processing apparatus 300*a* is connected to only the projection video display apparatus serving as a master, even when a video output unit of the information processing apparatus 300*a* has only one system, the above-mentioned advantageous effects can be acquired. Namely, in the modification example 4, even when the information processing apparatus 300*a* is a simple video outputting apparatus and the video output unit of the information processing apparatus 300*a* has only one system, it is possible to realize the improvement of quality of joints of projected videos in the multi-screen projection mode.

Further, in the modification example 4, each of the projection video display apparatuses outputs the input video 0 as it is, and trimming of the video is performed in the respective latter projection video display apparatuses, and thus trimming processing for the latter slave projection video display apparatuses becomes unnecessary in the master projection video display apparatus. However, since the designation of a trimming range is performed by the master projection video display apparatus, it is unnecessary for a user to perform setting of trimming in the respective projection video display apparatuses serving as slaves, and an operation of the system as a whole becomes easy. Further, the above-mentioned advantageous effect can be acquired even in the case of the daisy chain connection.

<Further Modification Example of Modification Example 3 and Modification Example 4>

In the above-mentioned modification example 3 and modification example 4, the configuration where the input video 0 and the light adjusting control information calculated by the master projection video display apparatus are both output from the projection video display apparatus on a former stage of the system to the projection video display apparatus on a latter stage of the system has been described.

However, when a common light adjusting value calculation control can be performed in all projection video display apparatuses which constitute the system, the configuration where the light adjusting control information is not transmitted from the projection video display apparatus on the former stage of the system to the projection video display apparatus on the latter stage of the system may be adopted.

Namely, if a light adjusting value calculated from the input video 0 by the projection video display apparatus disposed on a latter stage of the system is equal to a light adjusting value of the projection video display apparatus disposed on a former stage of the system, it is possible to acquire advantageous effects substantially equal to those of the modification example 3 and the modification example 4 described above.

To realize such advantageous effects, in the above-mentioned modification example 3 and modification example 4, the projection video display apparatus on a former stage of the system is configured so as not to output the light adjusting control information, and the projection video display apparatus on a latter stage of the system is configured to perform light adjustment processing using a light adjusting value calculated based on the entire input video 0 (eventually a light adjusting value equal to that of the projection video display apparatus on the former stage is obtained) in place of the light adjustment processing performed in accordance with the light adjusting control information.

Modification Example 5

A modification example 5 will be described. The modification example 5 is an example where an image quality control interlocking function is added to the above-mentioned <Basic example>, <Modification example 1>, <Modification example 2>, <Modification example 3> and <Modification example 4>.

The image quality control interlocking function is a function for an entire screen image quality control which is executed by the image adjusting unit 160 of a master projection video display apparatus shown in FIG. 1 to totally control the video. This function includes gamma adjustment, brightness adjustment and contrast adjustment applied to an entire screen. The gamma adjustment is a processing for changing a gamma curve indicative of a gradation characteristic of an image. The brightness adjustment is a processing for changing brightness. The contrast adjustment is a processing for changing a contrast curve of an image.

In the multi-screen projection mode, the master projection video display apparatus generates adjustment parameters for executing the entire screen image quality control simultaneously with the generation of the light adjusting control information, and outputs the adjustment parameters to other projection video display apparatuses as image quality adjustment designation information. Other projection video display apparatuses execute an entire screen image quality control based on the image quality adjustment designation information generated by the master projection video display apparatus in place of or in addition to the image quality control executed by individual projection video display apparatuses.

Modification Example 6

A modification example 6 will be described. The modification example 6 is an example where a local image quality adjustment prohibiting function is added to the above-mentioned <Basic example>, <Modification example 1>, <Modification example 2>, <Modification example 3> and <Modification example 4>.

The local image quality adjustment function is a function for adjusting an image quality of respective local areas of a video which is executed by the image adjusting unit 160 of respective projection video display apparatuses shown in FIG. 1, and the local image quality adjustment prohibiting function is a function for prohibiting the local image quality adjustment. The local image quality adjustment function includes a partial contrast control, a Retinex control and the like. The partial contrast control is a processing for partially changing a contrast curve of an image. The Retinex control is a processing for decomposing an image into the components of light and changing the weighting for respective components of light.

The local image quality adjustment prohibiting function is configured to forcibly turn off the local image quality adjustment function, for example, during a display mode for the multi-screen projection in the image adjusting unit 160 of each of the master projection video display apparatus and the slave projection video display apparatus. (In the single display mode, it is sufficient if a user can switch ON and OFF the local image quality adjustment function through a setting menu.)

Note that the local image quality adjustment prohibiting function is not indispensable, and the configuration where the local image quality adjustment function is not forcibly turned off may be adopted because there may be a case where a joint is not substantially noticeable depending on a control for respective local areas of a video even when projection video display apparatuses having different video display ranges are used in a state where the image quality adjustment function is turned on.

Modification Example 7

A modification example 7 will be described with reference to FIG. 37 to FIG. 40. The modification example 7 is an example where a countermeasure to cope with the case where brightness of a plurality of projection video display apparatuses is non-uniform from the beginning due to individual differences of respective light sources (the case where brightness of the plurality of projection video display apparatuses is non-uniform even when the same video signal is input in a state where an input-video-interlocked variable light adjusting function is in an OFF state) is added to the above-mentioned <Basic example>, <Modification example 1>, <Modification example 2>, <Modification example 3> and <Modification example 4>.

Figure 37:
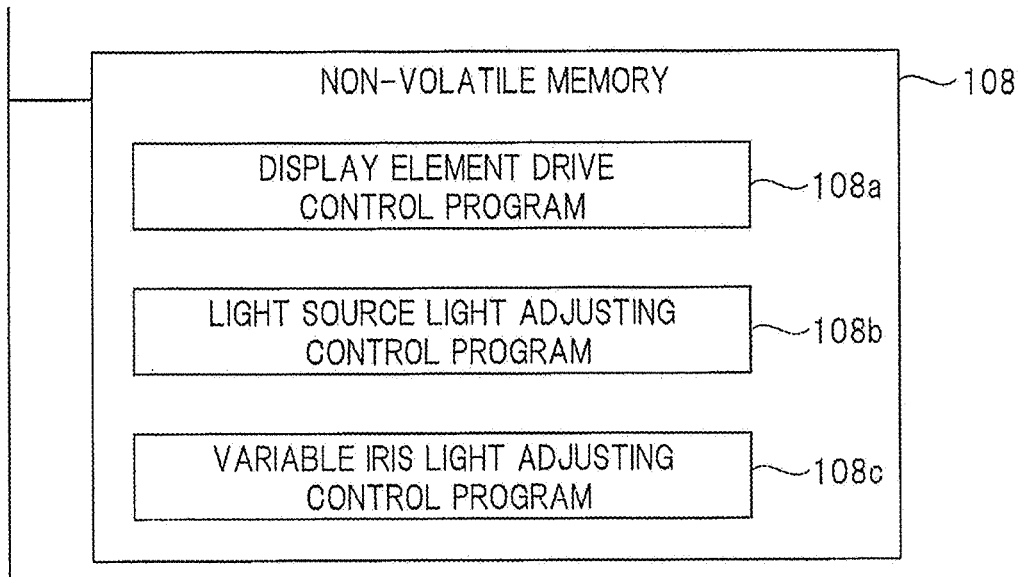
FIG. 37 is a view for describing a configuration of a non-volatile memory in a modification example 7 in one embodiment of the present invention.

FIG. 37 is a view for describing the configuration of a non-volatile memory in the modification example 7. As shown in FIG. 37, the non-volatile memory 108 (or storage unit 170) shown in FIG. 1 includes a region for storing a display element drive control program 108a for executing a drive control of the display element 102, a light source light adjusting control program 108b for executing a light adjusting control of the light source 105 (lamp light adjusting function) and a variable iris light adjusting control program 108c for executing a light adjusting control of the variable iris 120 (variable iris function). In the modification example 7, at least two programs out of the three programs are stored, and the control unit 110 can execute various controls in a cooperative manner by developing these programs in the memory 109.

Accordingly, as a control for varying brightness of projected video light, the control unit 110 realizes at least two controls out of the drive control of the display element 102, the light adjusting control of the light source 105, and the light adjusting control of the variable iris 120.

Figure 38:
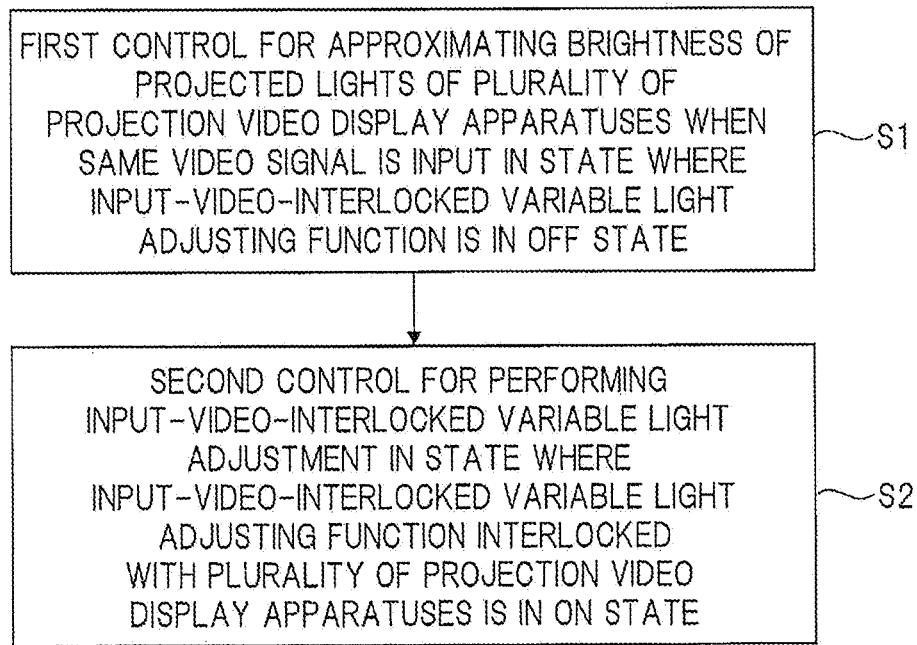
FIG. 38 is a view for describing a control executed by a control unit in the modification example 7 in one embodiment of the present invention.

FIG. 38 is a view for describing the control executed by the control unit 110 in the modification example 7. As shown in FIG. 38, the control unit 110 executes a first control for approximating brightness of projected lights of the plurality of projection video display apparatuses when the same video signal is input in a state where an input-video-interlocked variable light adjusting function is in an OFF state (S1). Then, the control unit 110 executes a second control for performing the input-video-interlocked variable light adjustment in a state where an input-video-interlocked variable light adjusting function which is interlocked with the plurality of projection video display apparatuses is in an ON state (S2). In this case, the control unit 110 changes a combination of controls used for adjustment of brightness between the first control and the second control. Further, a light adjusting function used in the second control is not used in the first control.

FIG. 39 is a view for describing a specific example of combinations of the first control and the second control in the modification example 7 described with reference to FIG. 38. As shown in FIG. 39, for example, in an example 1, a light adjusting control of the light source 105 is executed as the first control and a light adjusting control of the variable iris 120 is executed as the second control. A merit of the example 1 is that irregularities between the projection video display apparatuses at intermediate brightness can be made small, and a range of the display element 102 can be made large. To the contrary of the example 1, in an example 2, a light adjusting control of the variable iris 120 is executed as the first control and a light adjusting control of the light source 105 is executed as the second control, and the same merit as that of the example 1 can be acquired.

In an example 3, a drive control (entire screen) of the display element 102 is executed as the first control and a light adjusting control of the variable iris 120 is executed as the second control. The example 3 has a merit that irregularities between the projection video display apparatuses at intermediate brightness can be made small, and a light adjusting control of the light source 105 can be made unnecessary. In an example 4, a drive control (entire screen) of the display element 102 is executed as the first control and a light adjusting control of the light source 105 is executed as the second control, and a light adjusting control of the variable iris 120 can be made unnecessary.

In an example 5, a combination of a drive control (entire screen or overlapping region) of the display element 102 and a light adjusting control of the light source 105 is executed as the first control and a light adjusting control of the variable iris 120 is executed as the second control. The example 5 has a merit that irregularities between the projection video display apparatuses at intermediate brightness can be made small. In an example 6, a combination of a drive control (entire screen or overlapping region) of the display element 102 and a light adjusting control of the variable iris 120 is executed as the first control and a light adjusting control of the light source 105 is executed as the second control, and the same merit as that of the example 5 can be acquired.

In an example 7, a drive control (entire screen or overlapping region) of the display element 102 is executed as the first control and a combination of a light adjusting control of the variable iris 120 and a light adjusting control of the light source 105 is executed as the second control. In the example 7, both the light adjusting control of the variable iris 120 and the light adjusting control of the light source 105 may be executed as the second control. In such a case, however, it is necessary to use the same first light adjusting control information in the light adjustment of the variable irises of the plurality of projection video display apparatuses, and to use the same second light adjusting control information in the light adjustment of the light sources of the plurality of projection video display apparatuses.

FIG. 40 is a view for describing a light adjusting characteristic of the variable iris 120 in the modification example 7. As shown in FIG. 40, in the light adjusting characteristic of the variable iris 120, irradiation illuminance to the display element 102 is not linear with respect to a light adjusting control signal (drive voltage of the variable iris 120 or the number of steps). This characteristic differs depending on a design of an optical system, the structure of a moving mechanism of a light shielding plate of the variable iris 120 or a characteristic of a motor.

When a plurality of projection video display apparatuses of the same model having the same light adjusting characteristic are prepared and the same light adjusting control signal is applied thereto, similar illuminance can be easily acquired in the plurality of projection video display apparatuses. On the other hand, it is difficult to acquire a light adjusting control signal, which can acquire desired irradiation illuminance, by an arithmetic operation. This may be possible by providing an illuminance sensor or the like, but such a configuration causes the cost increase.

Although not shown in the drawing, also in the light adjusting characteristic of the light source 105, illuminance is not linear with respect to a control signal such as a voltage. This characteristic also differs depending on kinds of the light source 105 or the configuration of the power source circuit like the case described above.

In the modification example 7, the first control is a control for reducing irregularities of irradiated light among the projection video display apparatuses, and is thus a technique to positively make control signals of the light adjusting function differ from each other. On the other hand, the second control is a control for making the light adjusting functions of the projection video display apparatuses have the characteristic as similar as possible. Here, when the light adjusting control used as the second control is used as the first control, a light adjusting control range (for example, a range of the light adjusting control signal on a horizontal axis in FIG. 40) used in the second control differs among the plurality of projection video display apparatuses. As described above with reference to FIG. 40, since the light adjusting characteristic of the variable iris 120 and the light adjusting characteristic of the light source 105 are not linear, the influence of irregularities in light adjusting control range caused by the first control among the plurality of projection video display apparatuses appears as irregularities in illuminance in the second control.

Accordingly, by making the light adjusting function used in the second control differ from the light adjusting function used in the first control as in the case of the combination of the first control and the second control in the embodiment 7 of the present invention illustrated in FIG. 39, it is possible to further reduce the occurrence of irregularities in illuminance in the second control among the plurality of projection video display apparatuses.

In the respective embodiments of the present invention described above, the light adjusting control performed by calculating a light adjusting value in units of one frame has been described, but it is not always necessary to perform the control for changing the light adjusting value for each one frame as long as the light adjusting value is calculated in units of frame. The control for changing the light adjusting value may be performed in units of several frames.

As described above, according to the projection video display apparatus 100 of one embodiment of the present invention, quality of a joint in the multi-screen projection can be more preferably improved.

In addition, according to the projection video display apparatus 100 of this embodiment, a high dynamic range of a video by the multi-screen projection can be more preferably realized.

As a result, according to the projection video display apparatus 100 of this embodiment, it is possible to make a joint between videos less noticeable and simultaneously acquire a high dynamic range of the video.

In the foregoing, the invention made by the inventors of the present invention has been concretely described based on the embodiments. However, it is needless to say that the present invention is not limited to the foregoing embodiments and various modifications and alterations can be made within the scope of the present invention.

Also, the embodiments above have been described in detail so as to make the present invention easily understood, and the present invention is not always limited to the embodiment having all of the described constituent elements. Furthermore, another configuration may be added to a part of the configuration of each embodiment, and a part of the configuration of each embodiment may be eliminated or replaced with another configuration (basic example, respective modification examples).

REFERENCE SIGNS LIST 100 (100-1 to 100-n): projection video display apparatus, 101: projection optical system, 102: display element, 103: display element driving unit, 104: illumination optical system, 105: light source, 106: power source, 107: operation input unit, 108: non-volatile memory, 109: memory, 110: control unit, 115: cooling unit, 120: variable iris, 131: video signal input unit/output unit, 132: communication unit, 133: audio signal input unit/output unit, 140: speaker, 160: image adjusting unit, 170: storage unit, 190: interface

The invention claimed is:

1. A projection video display apparatus with variable light adjustment for multi-screen projection mode, comprising:
a video input interface configured to input an input video;
a light source;
a display panel configured to allow incidence of light generated by the light source thereon and to make the light pass therethrough or reflect thereon;
a projection optical system configured to project the light from the display panel as a display video;
a communication interface configured to communicate with another projection video display apparatus; and
a controller configured to execute at least two types of variable light adjusting controls, the two types of variable light adjusting controls including a first variable light adjusting control to adjust brightness of the light source, and a second variable light adjusting control to adjust a light amount of the optical system mechanically, the light amount being varied by moving or rotating a mechanism in the projection video display apparatus in the second variable light adjusting control,
wherein a plurality of display modes controlled by the controller are prepared and one display mode of the plurality of display modes can be selected based on a menu screen operation,
wherein the plurality of display modes of the display video controlled by the controller include:
a first display mode which corresponds to the multi-screen projection mode, in the multi-screen projection mode where a plurality of projection video display apparatuses, including the projection video display apparatus and the another projection video display apparatus, projects display videos to be combined as one video, the controller is configured to execute the first variable light adjusting control based on first control information which is transmitted from the another projection video display apparatus and received by the communication interface, so as to make the first variable light adjusting control in the projection video display apparatus inter-locked with variable light adjusting control of adjusting brightness of a light source of the another projection video display apparatus, and the controller is configured to execute the second variable light adjusting control based on second control information which is transmitted from the another projection video display apparatus and received by the communication interface, so as to make the second variable light adjusting control in the projection video display apparatus inter-locked with variable light adjusting control of adjusting a light amount of an optical system mechanically by moving or rotating a mechanism in the another projection video display apparatus; and
a second display mode where the controller is configured to make neither the first variable light adjusting control nor the second variable light adjusting control inter-locked with any one of variable light adjusting controls of the another projection video display apparatus.

2. The projection video display apparatus according to claim 1,
wherein the plurality of display modes controlled by the controller further include a display mode where the controller turns off the variable light adjusting controls.

3. The projection video display apparatus according to claim 1, further comprising:
an image quality adjusting processor capable of performing first image quality adjustment processing which uniformly affects the entire input video and second image quality adjustment processing in which image quality adjustment to the input video locally differs, the second image quality adjustment processing is partial contrast control processing or Retinex processing which is different from brightness control for blending overlapping portion of multi-screen projection,
wherein, in the first display mode, there is a state where execution of the first image quality adjustment processing is permitted and execution of the second image quality adjustment processing is prohibited.

4. The projection video display apparatus according to claim 3,
wherein, in the second display mode, there is a state where both the execution of the first image quality adjustment processing and the execution of the second Image quality adjustment processing are permitted.

5. The projection video display apparatus according to claim 1, further comprising:
a memory stores programs for the first variable light adjusting control and the second variable light adjusting control.

6. The projection video display apparatus, according to claim 1,
wherein the first control information and the second control information which are received by the communication interface, are transmitted via daisy chain connection among the plurality of the projection video display apparatuses.

7. A projection video display apparatus with variable light adjustment for multi-screen projection mode, comprising:
a video input interface configured to input an input video;
a light source;
a display panel configured to allow incidence of light generated by the light source thereon and to make the light pass therethrough or reflect thereon;
a projection optical system configured to project the light from the display panel as a display video;
a communication interface configured to communicate with another projection video display apparatus; and a controller configured to execute at least two types of variable light adjusting controls, the two types of variable light adjusting controls including a first variable light adjusting control to adjust brightness of the light source, and a second variable light adjusting control to adjust a light amount of the optical system mechanically, the light amount being varied by moving or rotating a mechanism in the projection video display apparatus in the second variable light adjusting control, wherein a plurality of display modes controlled by the controller are prepared and one display mode of the plurality of display modes can be selected based on a menu screen operation, wherein the plurality of display modes of the display video controlled by the controller include a display mode, which corresponds to the multi-screen projection mode, in the multi-screen projection mode where a plurality of projection video display apparatuses, including the projection video display apparatus and the another projection video display apparatus, projects display videos to be combined as one video, the communication interface is configured to transmit first control information to the another projection video display apparatus, for making variable light adjusting control of adjusting brightness of a light source of the another projection video display apparatus inter-locked with the first variable light adjusting control in the projection video display apparatus, and the communication interface is configured to transmit second control information to the another projection video display apparatus, for making variable light adjusting control of adjusting a light amount of an optical system mechanically by moving or rotating a mechanism in the another projection video display apparatus, interlocked with the second variable light adjusting control in the projection video display apparatus.

8. The projection video display apparatus according to claim 7, wherein the plurality of display modes controlled by the controller further include a display mode where the controller turns off the variable light adjusting controls.

9. The projection video display apparatus according to claim 7, further comprising:

an image quality adjusting processor configured to perform first image quality adjustment processing which uniformly affects the entire input video and second image quality adjustment processing in which image quality adjustment to the input video locally differs, the second image quality adjustment processing is partial contrast control processing or Retinex processing which is different from brightness control for blending overlapping portion of multi-screen projection, wherein, in the display mode, there is a state where execution of the first image quality adjustment processing is permitted and execution of the second image quality adjustment processing is prohibited.

10. The projection video display apparatus according to claim 8, further comprising:

an image quality adjusting processor configured to perform first image quality adjustment processing which uniformly affects the entire input video and second image quality adjustment processing in which image quality adjustment to the input video locally differs, the second image quality adjustment processing is partial contrast control processing or Retinex processing which is different from brightness control for blending overlapping portion of multi-screen projection, wherein, in said another display mode, there is a state where both the execution of the first image quality adjustment processing and the execution of the second image quality adjustment processing are permitted.

11. The projection video display apparatus according to claim 7, further comprising:

a memory stores programs for the first variable light adjusting control and the second variable light adjusting control.

12. The projection video display apparatus, according to claim 7, wherein the first control information and the second control information are to be transmitted via daisy chain connection among the plurality of projection video display apparatuses.

* * * * *